US005095197A

United States Patent [19]

Chadima, Jr. et al.

[11] Patent Number: 5,095,197

[45] Date of Patent: * Mar. 10, 1992

[54] INSTANT PORTABLE BAR CODE READER

[75] Inventors: George E. Chadima, Jr., Cedar Rapids, Iowa; Vadim Laser, Cincinnati, Ohio

[73] Assignee: Norand Corporation, Cedar Rapids, Iowa

[ * ] Notice: The portion of the term of this patent subsequent to Feb. 11, 2003 has been disclaimed.

[21] Appl. No.: 424,769

[22] Filed: Oct. 20, 1989

Related U.S. Application Data

[60] Division of Ser. No. 339,953, Apr. 18, 1989, Pat. No. 4,894,523, which is a continuation of Ser. No. 234,880, Aug. 19, 1988, abandoned, said Ser. No. 234,880, is a division of Ser. No. 827,286, Feb. 7, 1986, Pat. No. 4,766,300, said Ser. No. 827,286, is a division of Ser. No. 637,693, Aug. 6, 1984, Pat. No. 4,570,057, said Ser. No. 637,693, is a continuation of Ser. No. 334,811, Dec. 28, 1981, abandoned.

[51] Int. Cl.$^5$ .............. G06K 9/10

[52] U.S. Cl. .............. 235/472; 235/455; 235/462; 250/566

[58] Field of Search .............. 235/472, 462, 454, 455; 250/555, 566, 568

[56] References Cited

U.S. PATENT DOCUMENTS

| | | | |
|---|---|---|---|
| 3,991,299 | 11/1976 | Chadima, Jr. et al. . | |
| 4,072,859 | 2/1978 | McWaters | 250/214 R |
| 4,096,992 | 6/1978 | Nojiri et al. . | |
| 4,114,030 | 9/1978 | Nojiri et al. | 235/464 |
| 4,115,703 | 9/1978 | Dobras . | |
| 4,140,271 | 2/1979 | Nojiri et al. | 235/440 |
| 4,143,809 | 3/1979 | Uebbing et al. . | |
| 4,158,194 | 6/1979 | McWaters | 235/472 X |
| 4,210,802 | 7/1980 | Sakai | 235/483 |
| 4,250,526 | 2/1981 | Fuwa et al. . | |
| 4,251,798 | 2/1981 | Swartz et al. . | |
| 4,282,425 | 8/1981 | Chadima, Jr. et al. . | |
| 4,387,297 | 6/1983 | Swartz et al. . | |
| 4,408,120 | 10/1983 | Hara et al. . | |
| 4,570,057 | 2/1986 | Chadima, Jr. et al. | 235/472 |
| 4,593,186 | 6/1986 | Swartz et al. | 235/472 |
| 4,652,750 | 3/1987 | Eastman et al. . | |
| 4,766,300 | 8/1988 | Chadima, Jr. et al. | 235/472 |
| 4,818,856 | 4/1989 | Matsushima et al. . | |
| 4,841,129 | 6/1989 | Tawara et al. . | |
| 4,894,523 | 1/1990 | Chadima, Jr. et al. | 235/472 |
| 5,021,642 | 6/1991 | Chadima, Jr. et al. . | |
| 5,038,024 | 8/1991 | Chadima, Jr. et al. . | |

*Primary Examiner*—Harold Pitts
*Attorney, Agent, or Firm*—Neuman, Williams, Anderson & Olson

[57] ABSTRACT

In an exemplary embodiment, a hand-held bar code reader has an elongated hand grip portion and a reader head portion which may be substantially spaced from a bar code data carrier during a reading operation. Light energy is directed outwardly through a window so as to illuminate a bar code sensing region in front of the window having a depth dimension of at least about ten millimeters. An optical system may focus bar code patterns in the sensing region onto an image photodetector in the reader unit with a resolution so as to read e.g. a bar code format with minimum bar or space width of about 0.0075 inch, or even less. Preferably the lens system provides a depth of focus for such bar code patterns of at least ten millimeters, so that a bar code pattern of marked curvature can be read in its entirety by means of an instnt reading operation. Preferably the light source is of an electronically triggerred essentially instant response type. A total bar code reader system including an operatively associated data terminal component may be conveniently carried by the user during bar code reading operations, and the light source may be triggered non-manually upon detecting object proximity.

89 Claims, 7 Drawing Sheets

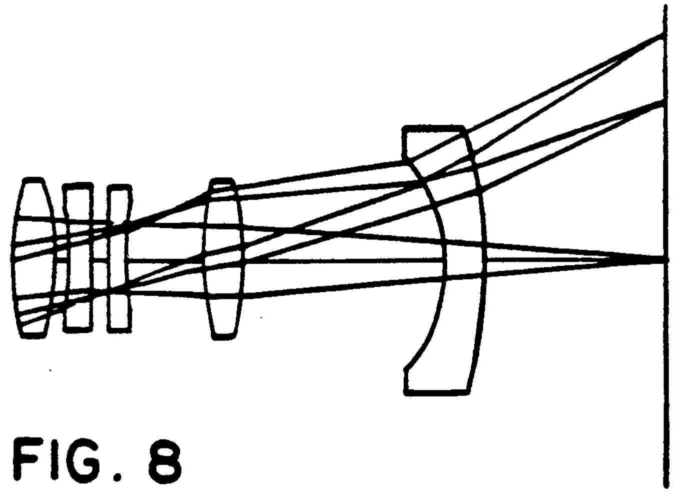
FIG. 8
FIG. 9
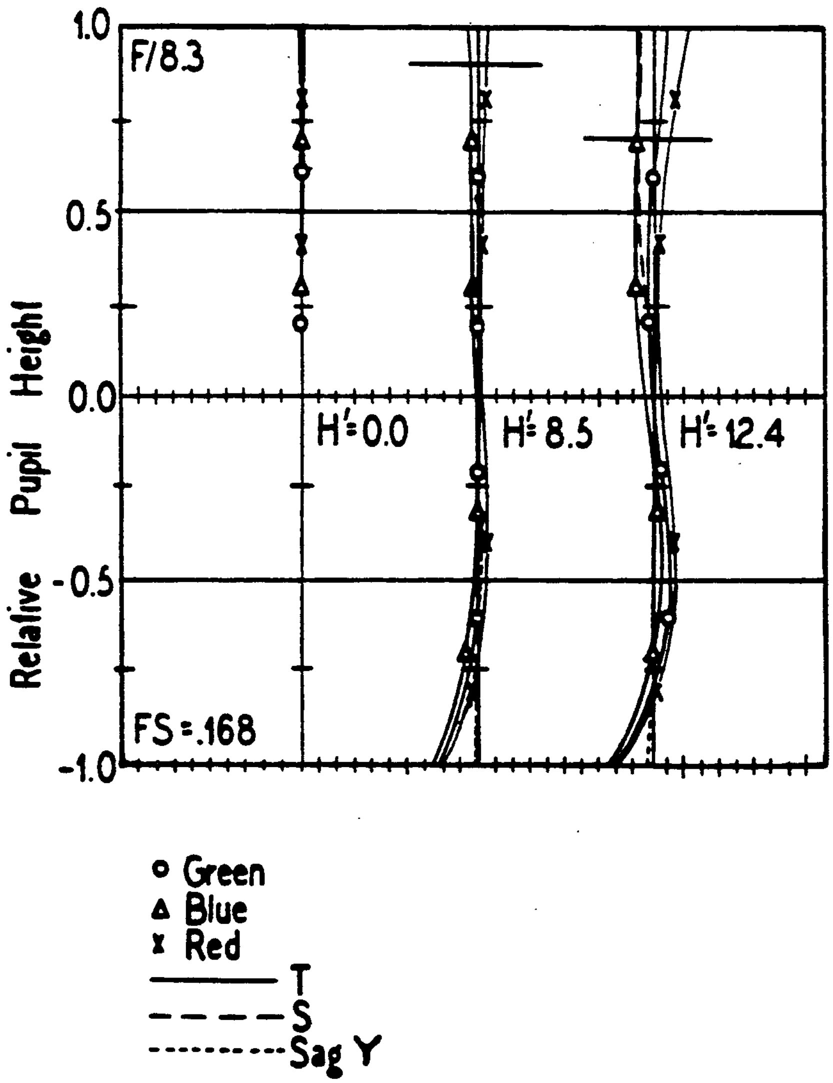

INSTANT PORTABLE BAR CODE READER

CROSS-REFERENCE TO RELATED APPLICATIONS

This is a division of our pending application Ser. No. 07/339,953 filed Apr. 18, 1989, now U.S. Pat. No. 4,894,523 issued Jan. 16, 1990, which in turn is a continuation of our application Ser. No. 07/234,880 filed Aug. 19, 1988 (now abandoned in favor of Ser. No. 07/339,953.). Said application Ser. No. 07/234,880 is in turn a division of our application Ser. No. 06/827,286 filed Feb. 7, 1986, now U.S. Pat. No. 4,766,300 issued Aug. 23, 1988. Said application Ser. No. 06/827,286 is a division of our prior application U.S. Ser. No. 06/637,693 filed Aug. 6, 1984, now U.S. Pat. No. 4,570,057 issued Feb. 11, 1986. Said application Ser. No. 06/637,693 is in turn a continuation of our earlier application Ser. No. 06/334,811 filed Dec. 28, 1981, now abandoned.

BACKGROUND OF THE INVENTION

The present application is particularly directed to improvements in the invention of our U.S. Pat. No. 4,282,425 issued Aug. 4, 1981. The disclosure of said patent is incorporated herein by reference, particularly for purposes of background information.

SUMMARY OF THE INVENTION

The present invention, in one important aspect, is directed to the provision of a particularly facile and effective hand held reader unit for the instantaneous reading of complete bar code patterns of curved or irregular configuration, and comprising an optical system which accommodates itself to a compact and rugged, yet lightweight construction capable of economical manufacture.

In another aspect, the invention provides a high speed bar code reader system and method which is capable of reading a complete bar code pattern as an entity for computer processing without requiring the reader unit to be moved during the read-in operation; such system and method being further optimized by the provision of a flash illuminator of special configuration for providing a particularly uniform obliquely directed light output over the full depth of the optical field of the reader lens system, and by the provision of a lens system which is adjusted in its spectral response and stop aperture characteristics so as to achieve a high resolution and accuracy over a sufficient depth of field to read high density bar patterns with marked curvature or surface irregularity.

It is therefore an important object of the invention to provide a portable instant bar code reader and method providing improved optical characteristics.

Another object resides in the provision of a bar code reader system and method exhibiting an improved flash type illuminator.

It is also an object of the invention to provide a portable instant bar code reader system and method wherein the optical and electronic construction are interrelated so as to provide for quick-repeat, more accurately focussed reading where an initial reading is ineffective because of marginal reading conditions or the like.

Still another object resides in the provision of a hand held bar code scanner having novel electronic, optical and structural features adapted to the implementation of the various objects set forth above.

Features of the invention include the provision of a reader unit with a wide field of view and substantial focal depth, which yet has a narrow hand grip configuration, and a compact optical system; an optics system which accommodates a single unitary circuit board configuration, a rigid lens mounting arrangement which furthers the achievement of a precise and reliable optical system with a dust and moisture proof enclosure and substantial impact resistance; and an optical system providing an optical field of extended depth coupled with an optimum focus at a selected close up position and electronics for signalling an inaccurate reading and automatically repeating the read operation if necessary as the operator adjusts the unit toward the optimum reading position until a valid reading is achieved.

These and other features, objects and advantages of the present invention will be understood in greater detail from the drawings and the following description wherein reference numerals illustrate a preferred embodiment.

BRIEF DESCRIPTION OF THE DRAWINGS

FIG. 8 is a somewhat diagrammatic view illustrating the basic optics of the illustrated embodiment and showing the lens arrangement generally in the plane of FIG. 3;

FIG. 9 is a plot illustrating lateral aberrations for the system of FIGS. 1 through 8;

DETAILED DESCRIPTION

Figure 1:
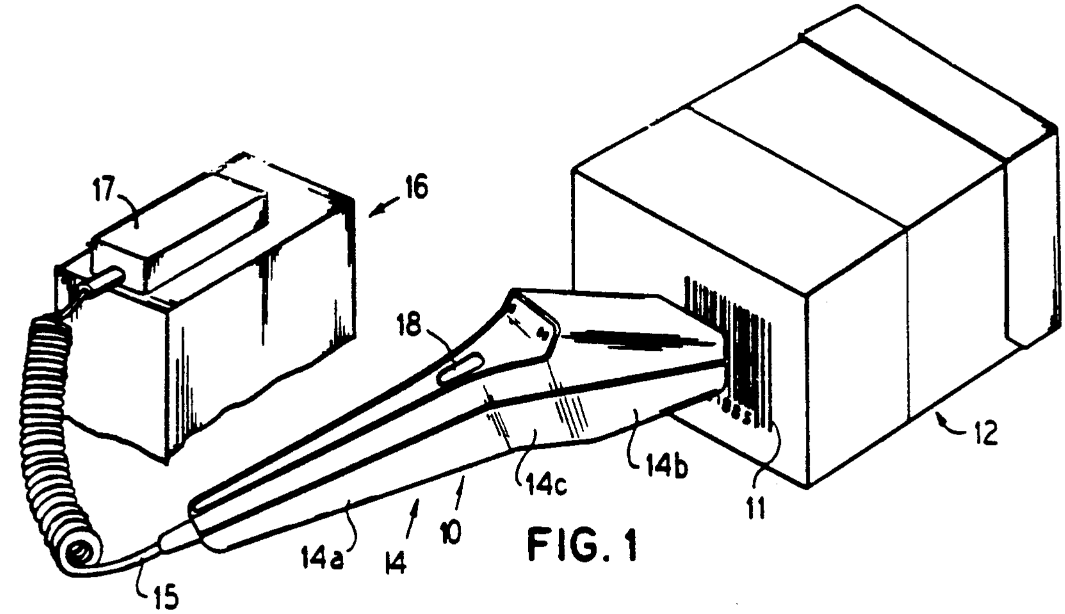
FIG. 1 is a somewhat diagrammatic perspective view illustrating a hand-held reader unit and associated components in operative reading association with a bar code pattern on a container.

Referring to FIG. 1 there is illustrated an overall bar code reader system in accordance with the present invention, and showing a hand-held reader unit 10 in scanning relation to a bar code pattern 11 associated with a product container 12. By way of example, the bar pattern 11 may be formed in accordance with the universal product code and may have a length of 65 millimeters. Various other bar code types are known in the art, such as EAN, CODBAR, CODE 39, INTERLEAVED 2/5, etc.

The hand-held unit is shown as comprising a case 14 including a portion 14*a* of a size to be gripped by the user, a head portion 14*b* for containing the reading optics and a connecting portion 14*c* integrally connecting the hand-grip portion 14*a* with the optical reading head portion 14*b*. The head portion 14*b* has a width so as to be operative to receive a sufficient portion of the bar pattern 11 so as to completely read the same while the head portion 14*b* is in essentially stationary relationship to the bar pattern 11. Thus, the head portion 14*b* may have an overall width of 3.0 inches and may have an overall height dimension of one inch. On the other hand, the hand grip portion 14*a* may taper from an overall width of about one and one-half inches adjacent the intermediate portion 14*c* to a width of about 0.828 inch at its rear end. The height dimension of the hand grip portion 14*a* may likewise taper slightly from the intermediate portion toward the rear end portion, from a height dimension of about one and one-quarter inches to about three-quarter inches. The lower margins such as 14*d* of the hand grip portion 14*a* are smoothly rounded for example with a radius of curvature of 0.46 inch, the bottom wall of the hand grip portion 14*a* being formed on a radius of 5.00 inch in the transverse direction so as to enhance the comfort with which the hand grip portion can be grasped. The forward portion of the hand grip portion 14*a* has a perimeter such that the thumb and first finger of the hand are normally overlapping or touching during handling of the reader unit 10.

With the reader unit 10 resting on a horizontal surface, the intermediate portion 14*c* will have a separation of approximately three-eighth inch above the horizontal surface, while the top surface 14*e* of the head portion 14*b* will extend at a pronounced acute angle to the horizontal which facilitates observation of the bar code pattern as the unit 10 is placed in scanning relation thereto by the user. For example, with the unit 10 resting on a horizontal surface, the upper surface 14*e* of the head portion 14*b* may be inclined at an angle of 25° to the horizontal.

The length of the hand grip portion 14*a* may be about four inches so as to be comparable to the width of the hand when placed in comfortable gripping relation to the unit 10. The overall length of the head portion 14*b* with the unit 10 resting on a horizontal surface may be about two and one quarter inches measured in a horizontal direction.

A cable 15 is indicated as connecting the unit 10 with host equipment 16 via a suitable link or interface 17. For the case of portable equipment, unit 16 may include a battery, and link 17 may include a battery operated high voltage power supply as well as suitable signal interface circuitry. In this way the complete system of FIG. 1 may be completely portable, without requiring any connecting wires to stationary equipment.

The reader unit 10 may have a weight of eight ounces, an overall length of 7.38 inches, an overall width of 2.63 inches, and a thickness generally of one inch except at a raised section 14*f* at the rear end of the head portion 14*b*.

An important feature of the unit 10 of FIG. 1 relates to the provision of a hand-held reader configuration whereby the unit can be readily manipulated in all degrees of freedom and be held at a desired angular relationship to a product container or the like with the four fingers and palm of the hand while the thumb of the user is utilized to depress an operating button 18 located centrally of the top surface of the unit and at the forward end of the hand grip portion 14*a*. While with the illustrated embodiment a complete reading of the bar pattern 11 takes place in an extremely brief instant, a stable gripping of the hand-held unit during operation is still desirable for the sake of comfort and to minimize fatigue over an extended period of use.

While the bar code pattern 11 is shown on a flat planar surface, it is significant that the reader unit 10 is also effective with curved or irregularly shaped labels. Thus, the bar code pattern 11 may be read even though it extends along a curved surface having a radius of curvature of 1.25 inches, for example. Such a label with a 1.25 inch radius of curvature and with a length dimension of 1.8 inches requires reading of a field with a depth of about 0.4 inch, for example. Thus, certain portions of the bar code pattern 11 may be in direct contact with the operative end of the unit 10 while other portions of the bar code pattern may be spaced by distances of up to 0.4 inch. The illustrated unit is thus effective in reading bar code patterns applied about the curved perimeter of cylindrical containers such as cans, as well as bar code patterns applied to flexible bag type containers and the like.

DESCRIPTION OF FIGS. 2 AND 3

Figure 2:
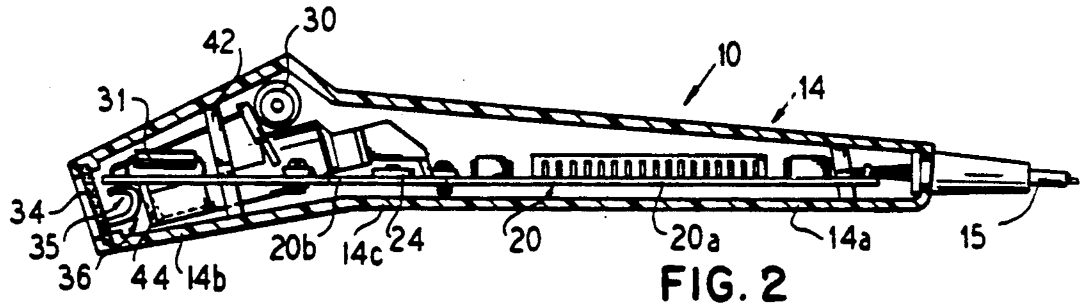
FIG. 2 is a somewhat diagrammatic longitudinal sectional view showing the general layout and configuration of the reader unit of FIG. 1.
Figure 3:
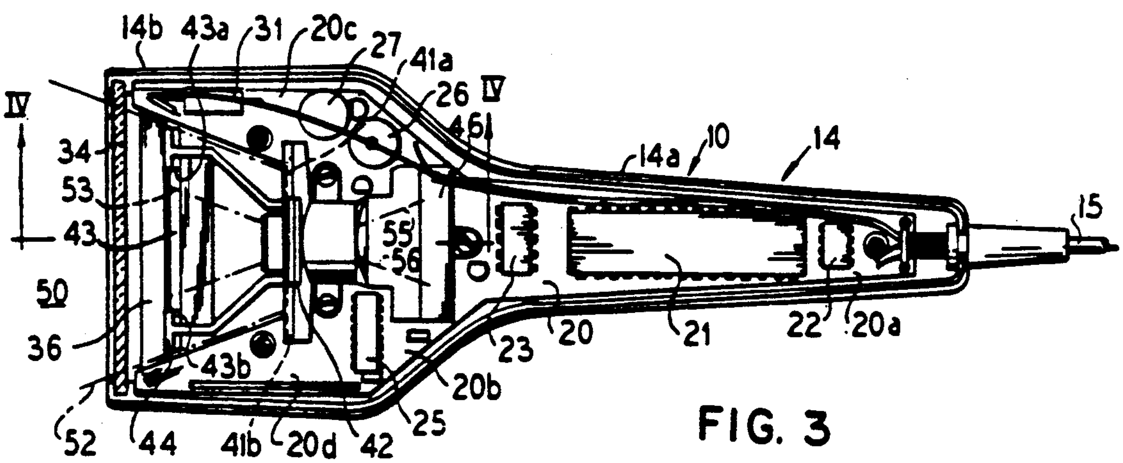
FIG. 3 is a somewhat diagrammatic plan view of the reader unit of FIG. 2 with a top casing part removed and internal components diagrammatically indicated.

FIG. 2 is a longitudinal sectional view of the hand-held reader unit 10 of FIG. 1 illustrating the arrangement of parts therein; and FIG. 3 is a plan view of the reader unit 10 with an upper section of the case 14 removed to show the layout of parts internally of the unit. These views show a printed circuit board 20 having a rear section 20*a* with a microcomputer integrated circuit pack 21, a bidirectional line driver integrated circuit pack 22, and an analog switch integrated circuit pack 23, for example. Referring to FIG. 2, an intermediate portion 20*b* of the circuit board 20 carries centrally thereof a photodetector integrated circuit pack 24. As seen in FIG. 3, the intermediate portion 20*b* of the circuit board carries other components such as an operational amplifier pack 25, a "beeper" component 26 and a transformer 27. In FIG. 2 at a forward portion of the casing 14, a flash energy storage capacitor assembly is physically designated by reference numeral 30, and a triggering capacitor is indicated physically by reference numeral 31. As seen in FIG. 3, the forward portion of the circuit board 20 is separated into two finger portions 20*c* and 20*d* arranged at the lateral margins of the case portion 14*b*.

At the extreme forward end of the casing 14 is an optical window 34 which serves for the optical coupling of the unit 10 with a bar code pattern such as indicated at 11 in FIG. 1. Adjacent a lower portion of window 34 is a flash reflector 35 forming a part of a reading light source assembly 36, shown in further detail in FIG. 4. The light source 36 serves to project a sheet of light through the window 34 for flooding a sensing region of substantial depth in front of the window 34, in which region the bar code pattern 11, FIG. 1, is to be located. The light reflected by a bar code pattern in the sensing region is reflected back through the window 34 so as to impinge on a first mirror 41 of a mirror assembly 42. Light incident upon the mirror 41 is reflected forwardly toward a second mirror 43 of a second mirror assembly 44. From the second mirror 43, light from the sensing region is directed rearwardly into an optical housing 46. The optical housing 46 together with the mirror mounts 42 and 44 are parts of a unitary optical framework which rigidly mounts all of the optical parts including mirrors 41 and 43 and the other optical components including an infrared rejecting filter 47. Further details of the optical system will be apparent from the following description of FIGS. 4–6.

Referring to FIGS. 2 and 3, the width dimension of the reflector 35 of light source 36 may be approximately 2.29 inches, so as to effectively illuminate a sensing region in front of the optical window 34 which may have an extent of about 2.5 inches directly in front of the optical window 34 and an extent of about 2.7 inches at a depth of one inch in front of the window 34. Thus, the total width of the image field may be taken as approximately 65 millimeters at a distance of approximately four millimeters from the center line of the optical window 34. Thus, as viewed in FIG. 3, the marginal rays of the light image entering the unit 10 through the window 34 from the sensing region and converging on the first mirror 41 may each form an angle of convergence relative to a central longitudinal axis of the optical system having a value in the range from about ten degrees to about twenty degrees. Thus, as viewed in FIG. 3, a sensing region 50 in front of the optical window 34 may be defined by marginal light rays such as indicated at 51 and 52 which are directed through the optical window 34 and converge toward the respective lateral margins of the first mirror 41. The width of the sensing region 50 may be at least fifty millimeters, and the depth of the sensing region 50 may be at least about three millimeters, and preferably at least about ten millimeters. The optical system should be effective to focus the bar code pattern 11, FIG. 1, onto the photodetector 24 for positions within the sensing field 50 with a resolution of at least about forty line pairs per millimeter for an angle of convergence of each marginal ray 51, 52 of about fifteen degrees relative to the central longitudinal axis of the optics as viewed in FIG. 3. This corresponds to resolving bars having a width dimension in the direction of high resolution of about 125 microns (five mils, one mil equals 0.001 inch).

The first mirror 41 may have a length dimension of about 1.6 inches, while the second mirror 43 may have a length dimension of about 1.2 inches, for example. The lateral margins of the first mirror 41 are indicated at **41*a* and 41*b* in FIG. 3, while the lateral margins of the mirror 43 are indicated at 43*a* and 43*b* in FIG. 3. The marginal light rays as reflected from the mirror 43 toward the filter 47 are indicated at 53 and 54 in FIG. 3. The further margins of the light energy from the sensing region as it passes through the lenses of the optical system are indicated by the dash lines 55 and 56 in FIG. 3. As will be described particularly with reference to FIG. 6 hereafter, the light energy transmitted by the optical system is converged so as to pass through an aperture with a width in the high resolution direction of the bar code pattern 11 with a dimension of about two millimeters, for example. For the illustrated embodiment, the light energy from the sensing region 50 after passing through the narrow optical aperture within the housing 46, diverges over a substantial distance and comes to a focus at a light sensing region of the photodetector 24 having a dimension in the high resolution direction of 26 millimeters, for example, the image from the bar code region 50 being focused in inverted relation onto the light sensitive region of the photodetector 24**.

The infrared filter 47 may serve to essentially block infrared radiation having a wave length greater than about 700 nanometers. It is considered that better contrast is obtained by filtering the infrared portion of the light spectrum entering the window 34 from the sensing region 50. Further, it is considered that improved resolution is obtained over the desired depth of the sensing region 50 because of the presence of the infrared filter 47.

The optical window 34 may have a thickness of about 2.5 millimeters and be of a tempered glass material so as to be readily cleaned while resisting breakage. The image of the bar code pattern may be focused onto the light sensitive region of the photodetector 24 through a quartz window having a thickness of 0.5 millimeter and across an air gap of 1.14 millimeter, for example. Thus, the ratio of the length of the image at the bar code sensing region 50 to the length of the focussed image at the light sensitive region of the photodetector 24 may be about 2.5, for example.

DESCRIPTION OF FIGS. 4, 5 AND 6

Figures 4, 5, 6:
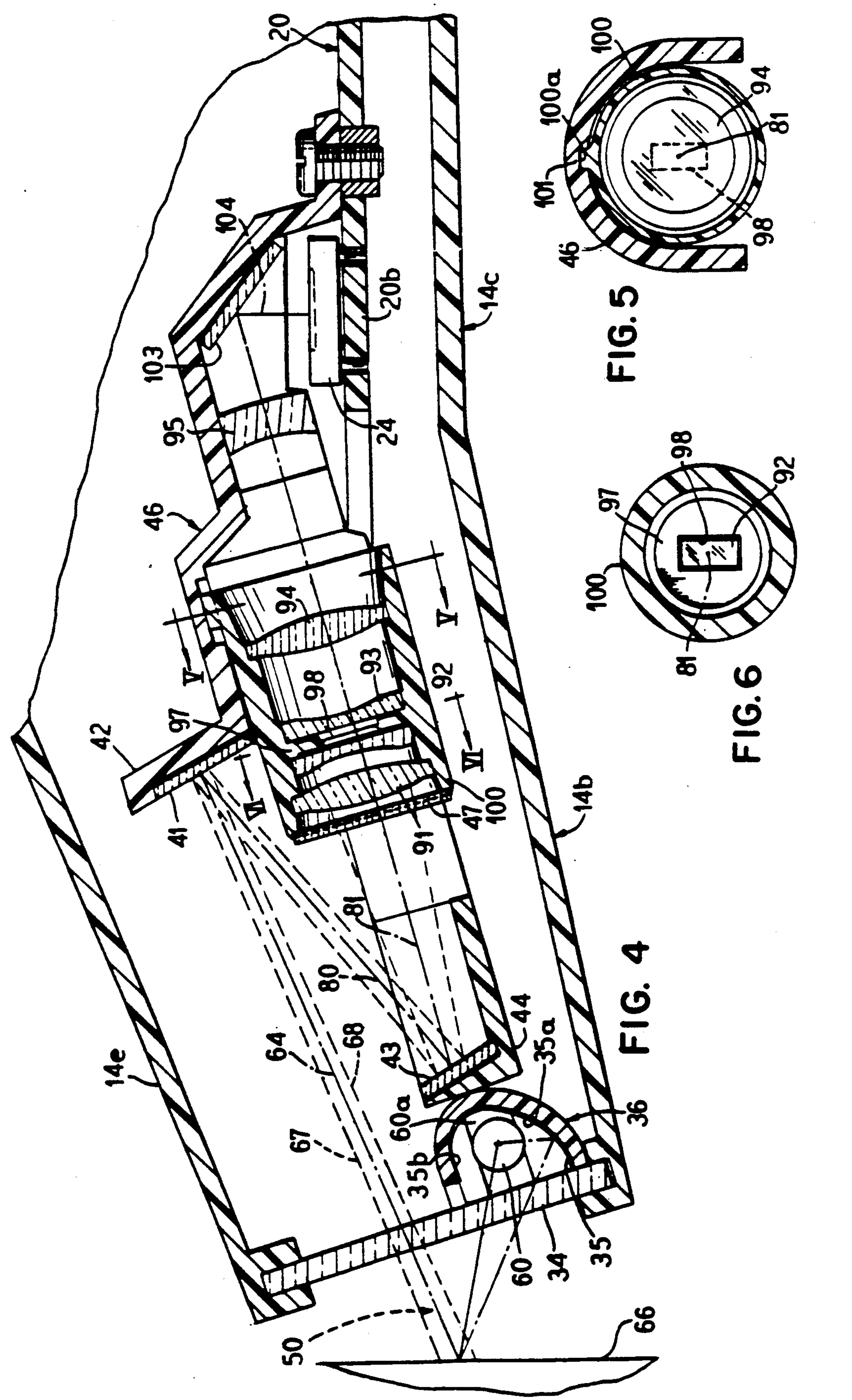
FIG. 4 is an enlarged partial somewhat diagrammatic view of the reader unit of FIG. 3, the section of FIG. 4 being taken along the lines IV—IV of FIG. 3.
FIG. 5 is a somewhat diagrammatic, cross-sectional view taken along the line V—V of FIG. 4.
FIG. 6 is a somewhat diagrammatic, cross-sectional view taken along the line VI—VI in FIG. 4.

FIG. 4 is a partial enlarged longitudinal sectional view of the reader unit 10, taken along the lines IV—IV of FIG. 3.

From FIG. 4 it will be seen that light source 36 includes a flash tube 60 which extends for the length of the light source assembly 36. For example, flash tube 60 may have an overall length of 68 millimeters, and may have right angle end portions such as indicated at **60*a* extending rearwardly from the assembly 36 through slots such as indicated at 61. The tube 60 may have a diameter of four millimeters and may have its center located at a focus of an eliptical portion 35*a* of reflector 35. Thus, a light ray such as indicated at 62 emitted from the center of the tube 60 will be reflected at the eliptical portion 35*a* and impinge in the bar code sensing region 50 at a point 63 representing a second focal point with respect to the eliptical configuration of reflector portion 35*a*. Point 63 is illustrated as lying on an optical axis 64 which intersects the first mirror 41 at a central point. Line 66 in FIG. 4 may represent a surface of a container such as 12 containing a bar code pattern such as indicated at 11 in FIG. 1. Marginal rays of light reflected from the surface 66 in the plane of FIG. 4 are indicated at 67 and 68**, for example.

The eliptical portion **35*a* has an axis such as indicated at 70 which is inclined relative to a normal to the surface of window 34 by an accute angle such as 21°. Thus, light reflected from the eliptical portion 35*a* is generally directed upwardly and obliquely to the central optical axis 64**.

Light directed away from the eliptical portion **35*a* from the center of tube 60 impinges on a segmental cylindrical portion 35*b* which serves to redirect the light onto the eliptical portion 35*a*, again for further reflection in a generally upward direction and obliquely to the central axis 64**.

The direct light from tube 60 which penetrates the sensing region 50 is also directed generally upwardly and obliquely to the central optical axis 64.

The resultant direct and reflected light from tube 60 floods the sensing region 50 and defines a sheet of light directed into region 50 obliquely to the central optical axis 64.

As illustrated by dot dash line 80, mirror 41 reflects incoming light energy along an axis 80 from its front surface, and mirror 43 reflects light impinging thereon along a central axis 81 from its front surface.

The light energy directed along the axis 81 impinges on the infrared filter 47 in a substantially nor or perpendicular direction, and the transmitted light energy then traverses a lens system including lenses 91-95. Between lenses 92 and 93 there is provided a light stop member 97 providing a rectangular optical aperture 98. The aperture 98 has a width dimension extending in the high resolution direction of the optical image being transmitted which is substantially less than the vertical dimension corresponding to the direction of low resolution (parallel to the bars of the bar code pattern 11). By way of example, the horizontal dimension of the aperture 98 may be about two millimeters while the vertical dimension may be about four millimeters.

The lenses 91-94 are rigidly mounted by means of a lens barrel 100 having a key 100*a* fitting into a slot 101 of the optical housing 46. The light stop member 97 may be integral with this light barrel 100. Each of the lenses 91-94 may be symmetrical with respect to the central longitudinal axis 81 passing through the center of the rectangular aperture 98.

As seen at the right in FIG. 4, the optical axis 81 intersects a reflecting mirror 103 whose front surface is reflective so as to direct the light energy along an axis 104 normal or perpendicular to the light sensitive surface of the photodetector 24 which is mounted on the printed circuit board 20 at the intermediate region 20*b*.

DESCRIPTION OF FIG. 7

Figure 7:
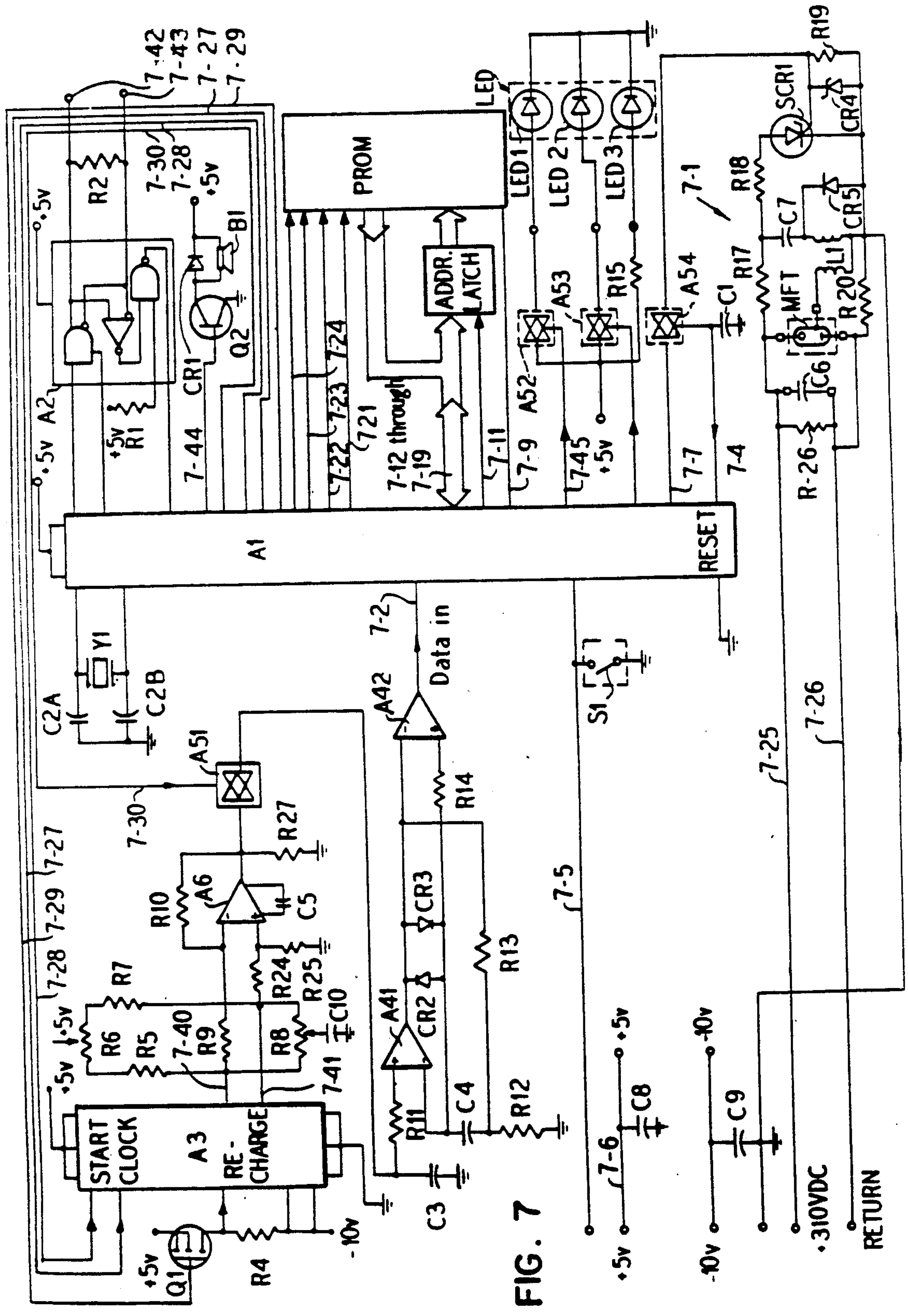
FIG. 7 is a diagrammatic illustration showing exemplary details of a suitable electric circuit configuration for the system of FIGS. 1 through 6.

FIG. 7 is an overall diagrammatic view showing the electric circuitry which is housed within the portable hand-held unit itself. The following description applies to the operation of this circuitry whether it is associated with a portable battery operated terminal or with a fixed installation such as a cash register, computer port or the like.

The hand-held unit is placed near the bar code pattern to be read and the trigger switch actuator associated with switch S1, FIG. 7 is momentarily depressed. In response to such signal from switch S1 or a comparable proximity sensor, microprocessor A1 outputs a signal to the flash tube section indicated at 7-1 in the lower right portion of FIG. 7. The tube MFT flashes and the bar code image is reflected through an optical system to a 1024 element diode array line scanner indicated at A3 in the upper left of FIG. 7. This image is rapidly shifted out, filtered, amplified and squared up before passing to the "Data In" input 7-2 of the microprocessor A1.

The microprocessor A1 processes this input data, calculates bar spacing and widths and derives the bar code number. If the number is not valid, the microprocessor retriggers the flash tube MFT and repeats the reading process. The final valid number is serially shifted out of the microprocessor A1 and into the data device such as a Norand model 101 terminal, a cash register, a computer port or the like.

In point of sale (POS) applications, the microprocessor A1 is left on continuously. When first turned on, input 7-4 of microprocessor A1 (RESET) is held low by capacitor C1. The capacitor C1 charges and when input line 7-4 exceeds 2.5 volts, the microprocessor is ready to begin program execution.

In a portable application utilizing battery power, the reader unit operates from a battery pack, and to prolong its life, the microprocessor is powered down when not needed. With such portable operation, when trigger switch S1 is closed, a scan proximity line 7-5 goes low, this line being connected with a model 101 terminal. Such terminal then applies 5 volts at input line 7-6 so as to supply power to the microprocessor A1. With power applied, capacitor C1 charges and when its voltage value is above 2.5 volts, the microprocessor is placed in operational condition. In addition, output line 7-7 from microprocessor A1 is isolated from the flash tube circuit 7-1 by means of a bilateral switch A54. During power up and down, the potential on output line 7-7 changes unpredictably and could flash the lamp MFT; to prevent this, bilateral switch A54 is opened during this interval.

The microprocessor A1 controls all functions within the hand-held unit. For the illustrated embodiment, the application program may reside in an external programmable read only memory PROM. To access the PROM, the microprocessor outputs the address as two data groups. The low address bits are placed onto the data bus 7-12 through 7-19 and are latched by a data latch associated with the PROM circuit when output 7-11 goes high then low again. The microprocessor then outputs the remaining address on output lines 7-21 through 7-24. The PROM retrieves the data byte from the location chosen by the address bus. When output line 7-9 from the microprocessor goes low, the PROM outputs are enabled and output the data byte onto the data bus for transfer to microprocessor A1. In another embodiment of the invention, the microprocessor A1 will include up to four kilobytes (4K) of internal factory masked program read only memory.

The flash tube section 7-1 is powered via lines 7-25 and 7-26 from an external power source. A voltage of 310 volts is supplied from a user supplied source of power. A voltage of 400 volts may be supplied from the model 101 previously mentioned. The applied power charges a charge storage capacitor C6 connected across the miniature flash tube MFT. The flash tube contains two electrodes with Xenon gas separating them. A fine wire is wound around the cathode end of the tube. When a high voltage is applied to this wire, the Xenon gas is ionized, lowering the resistance between the end electrodes. The gas breaks down, releasing light energy in the process. The capacitor is rapidly discharged as a very high current spike creating the intense light output. When the current and voltage fall below the gas sustaining potential, the flash is extinguished and the gas again becomes non-conductive. The actual flash is of very short duration.

To create the trigger voltage, the 310 volts is stepped up by a trigger transformer L1 and capacitor C7. In the quiescent state, a silicon controlled rectifier SCR1 is non-conducting and the trigger circuit is open. The capacitor C7 in series with the primary of transformer L1 is charged to 310 volts peak through a current limiting resistor R17.

When the microprocessor is ready for a flash it drives output line 7-7 high so as to cause the silicon controlled rectifier SCR1 to conduct and to complete the trigger circuit. Current flows from the capacitor C6 through SCR1 to the other side of the trigger transformer L1. The 310 volt capacitor pulse is stepped up through transformer action to over 4,000 volts (4 KV) and is sent to the flash tube MFT, triggering a flash. The capacitor C6 is discharged, and the loop current decays toward zero. Output line 7-7 returns to a low potential condition and when the current through SCR1 is less than its latch-up value, SCR1 returns to the non-conducting state and the capacitor C6 begins recharging.

For point of sale applications, capacitor C6 is a low leakage electrolytic and is constantly across the power supply. This allows rapid recharge and flash rates to occur.

For the case of a portable power supply, power for capacitor C6 is generated by a small step-up converter that is located in the portable interface module. There is also a sense circuit that monitors the voltage on the charged storage capacitor C6 and turns off the converter when the capacitor is charged, and turns it back on again after a flash or when the capacitor charge has leaked down to approximately 375 volts (375 VDC). Because this unit is operating off of battery power, it takes much longer to recharge the capacitor than in the case of a point of sale unit. Recharge time takes from 300 to 500 milliseconds (300 to 500 MSEC), depending on the state of the batteries.

Component A3 in FIG. 7 is a 1024 element line scanner, for example, Reticon RL 1024 G integrated circuit pack. The scanner component A3 comprises a row of silicon photodiodes, each with an associated storage capacitor on which to integrate photocurrent, and a multiplex switch for periodic readout via an integrated shift register scanning circuit. Each photo diode capacitor is charged to a known level; then the array is exposed to the bar code. Light areas cause the photodiodes to discharge their associated capacitors while dark area photodiode capacitors retain full charges. The shift register scanner is stepped from element to element and the capacitor voltage level is read out to the microprocessor until all 1024 elements have been read.

Within the scanner are two photodiode arrays. Both arrays contain photodiodes and capacitors. The video array produces the actual bar code image while the dummy array is masked from the light source. Scanner switching noises are induced capacitively into both arrays and interfere with the video signal. As the scanner is stepped, the video and dummy outputs are presented to an external differential operational amplifier A6. The common mode noise on the lines is effectively cancelled, leaving only the video differential signal for further processing.

The microprocessor A1 controls all signals that cause the scanner A3 to operate. Before the flash tube is fired, the scanner capacitors are charged to +5 volts (+5 V). Microprocessor output 7-28 goes high then low at the START input of scanner A3 to reset the scanner internal shift register to the first element. Processor output line 7-29 goes low turning on the transistor Q1 and thus bringing the scanner recharge input to plus five volts. Internally the first scanner element capacitors are charged in the dummy and video arrays through their respective MOS transistors. Processor output line 7-27 sends one pulse to the scanner CLOCK input and the scanner shift register turns off the first element, then turns on the second element MOS transistor, and the second set of capacitors in the dummy and video arrays are recharged. Processor output 7-27 continues pulsing the clock input of scanner A3 until all 1024 capacitor elements have been charged. In addition, the integrating charge capacitor is charged to plus five volts.

The processor initiates the signal at 7-7 that fires the flash tube, and the bar code pattern is reflected through optics onto the scanner photodiode video array. Where light falls, the photodiode capacitors discharge.

Processor output 7-28 leading to the START input of the scanner goes high then low, resetting the scanner shift register to the first element position.

The MOS transistor is turned on and the charge from the integrating charge capacitor discharges into the photodiode's associated capacitor. If the element was exposed to white light, i.e. a white bar, the capacitor is discharged. The integrating charge capacitor equalizes with the photodiode capacitor. If the element was dark, the capacitor would not discharge and the integrating charge capacitor would discharge very little. A MOS buffer amplifier senses the capacitor charge and places the voltage level on scanner output line 7-40 of component A3. The dummy array element capacitor also is charged by the integrating charge capacitor associated with this array. A second MOS amplifier places the capacitor voltage level on scanner output line 7-14.

Scanner output lines 7-40 and 7-41 change simultaneously in potential as a result of switching noises coupled into the arrays but only output 7-40 contains valid video information. The small capacitor size limits the charge that can be held and it begins dissipating rapidly. This factor plus various circuit losses limits the output voltage swings at output lines 7-40 and 7-41 between zero and four millivolts (4 mV).

Processor output lines 7-29 returns low and the transistor Q1 turns on and biases the scanner RECHARGE input to five volts so that the photodiode's capacitor and integrating charge capacitor recharge to plus five volts in both arrays.

Processor output 7-27 pulses high then low to the scanner CLOCK input, stepping the internal shift register to the second element in both the video and dummy arrays. The above sequence repeats and the second element capacitor is read out to the processor via output lines 7-40 and 7-41.

Scanner outputs 7-40 and 7-41 contain noise impulses from various switching circuits. These outputs are presented to a balanced differential input operational amplifier A6. The operational amplifier A6 cancels the noise of equal amplitude and phase.

The video output 7-40 of scanner component A3 contains valid data not present on output 7-41 so that this valid data is not cancelled and instead is amplified to a usable level for the following circuits. The amplifier provides a voltage input to output gain of approximately 68 times. Across the scanner output is a DC balancing network R6 through R9 and a simple noise filter to permit the differential amplifier A6 to produce a cleaner output.

Before the processor steps the scanner to the next element, it samples the differential output from amplifier A6. For this purpose output line 7-30 goes high to the bilateral switch A51 enabling it to pass the signal output from operational amplifier A6 to charge capacitor C3 of a sample and hold circuit. After a preset period processor line 7-30 returns low and capacitor C3 holds the output of operational amplifier A6.

A zero crossing detector is associated with the output of capacitor C3 and comprises an operational amplifier A41, two diodes CR2 and CR3, resistors R12, R13 and R14 and capacitor C4. The signal from the scanner is a sine wave signal and this signal is squared by means of the zero crossing detector. The operational amplifier gain is set at four and amplifies the incoming wave form. Capacitor C4 is also charged but at a slower rate and its voltage remains lower. When the incoming wave form rises to within 0.7 volt of the capacitor peak voltage the second operational amplifier A42 senses the voltage change and its output snaps to the opposite state. The diode CR2 is forward biased and discharges capacitor C4 while the input falls. When the input begins to rise and comes within 0.7 volt, the other diode CR3 is turned on and the second operational amplifier A42 senses this difference and the output changes to the opposite state.

The processor A1 samples input 7-2 (DATA IN) for a signal level. After opening the sample gate A51 by means of line 7-30 the program waits for several milliseconds to allow the operational amplifiers to stabilize. The processor A1 checks the input port 7-2 at a time when the operational amplifier output will be a valid high or low level.

The processor shifts the scanner to look at the next element then samples if the level is high (corresponding to a white bar area) or low (corresponding to a dark bar area). The processor keeps track of the number of elements that are high (white) and when the black area starts, stores the number of white elements in memory and begins counting the dark elements. When the white area begins, the dark element count is stored and the processor begins counting the white elements. After all 1024 elements have been read, the processor has a pattern of white and dark element counts corresponding to the dark and white widths of the code pattern. The processor program algorithm uses these counts to derive the bar code number.

If the final number does not match its check number or the number of bars is incorrect, the processor repeats the read process again until a correct number is produced. For a point of sale unit, the processor will retry for twenty times, then turns off. Releasing the switch S1 resets the processor for the next read cycle. For a portable unit, because it runs at a slower rate, the processor will continue flashing of the light source MFT until the pattern number is recognized or the unit switch S1 is opened.

When a valid pattern number is derived, the processor converts the number to an ASCII character string and outputs these to a bidirectional line driver A2 shown at the upper right in FIG. 7. The TTL (transistor transistor logic) level data is converted to a differential signal and is sent to a suitable receiver via output lines 7-42 and 7-43.

On a portable unit, the processor output port is tied directly to the portable interface module. The portable interface module then gates the data signal to the model 101 unit previously mentioned. The portable interface module also converts the EIA level signals from the model 101 unit to the TTL level required by the circuitry of FIG. 7.

For use with a point of sale unit, the processor will provide an output at line 7-44 to beep the small on board speaker B1 when there is a good scan, as well as supplying an enabling signal to output line 7-45 so as to light a green LED indicated at LED1 at the lower right of FIG. 7. The diode LED2 emits red light so as to indicate an error condition. The portable unit does not require a speaker and relies upon the model 101 to sound its internal beeper element for a valid number.

FIG. 8 is a plot of a specific exemplary optical system embodying lenses 91-95, stop aperture member 97 with aperture 98, and showing optical surfaces S1-S4 and S6-S11 of the lenses 91-95 in a plane through the respective vertices at axis 81.

The system of FIGS. 8-14 has essentially the characteristics previously described including a resolution at ±fifteen degree converging marginal rays 51, 52, FIG. 3, of forty line pairs per millimeter, and a depth of focus of about twenty-five millimeters, and a close-in optimum focal plane located about six millimeters in front of the front surface of window 34. The system can resolve the previously described high density bar code with five mil code intervals and a 1.8 inch length on a surface with a radius of curvature of about 1.25 inch. Thus the depth of field for sensing sharply curved bar code patterns extends to at least ten millimeters in front of the front surface of window 34.

In FIGS. 8-14, the focal length of the system is 24.23 millimeters and the magnification is −0.3300. The f-number is f/8.3.

FIG. 9 is a plot showing lateral aberrations of the lens system for green, blue and red wavelengths of light. The ordinate shows relative pupil height, and the abscissa is plotted for image heights H' in millimeters. In each of FIGS. 8-14, the solid lines T refer to the tangential plane while the dash lines refer to the sagittal plane. In FIG. 9, the dotted lines refer to the "SAG Y" or Y component of the sagittal ray fan.

Figure 10:
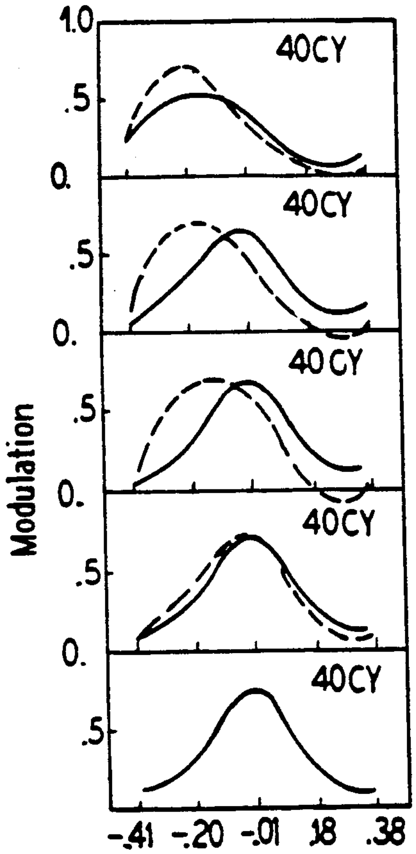
FIGS. 10 and 11 show optical transfer functions for the system of FIGS. 1 through 9, FIG. 10 being for the "Through Focus" condition and FIG. 11 being for the "Best Focus" condition.
Figure 11:
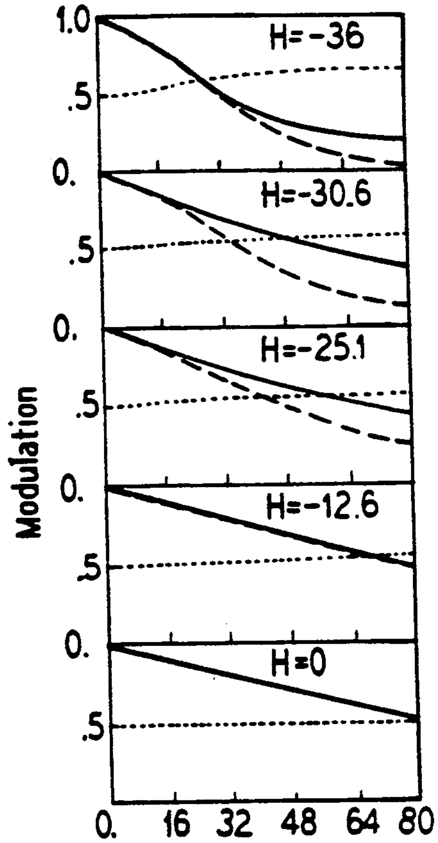

FIGS. 10 and 11 show plots of the optical transfer function with ordinate scales of relative values from zero to one for modulation, and with abscissa values in millimeters. FIG. 10 is taken for the "Through Focus" condition and FIG. 11 refers to the "Best Focus" condition of −0.01 millimeter as shown in FIG. 10, the lowermost plot.

FIG. 10 and 11 show the desired resolution of forty cycles per millimeter. Again the solid lines are for the T or tangential plane and the dash lines are for the S or sagittal plane. The dotted lines in FIG. 11 show the phase variation of the optical transfer function.

The five plots in each of FIGS. 10 and 11 are for respective object heights H in millimeters, namely H= −36 mm, H= −30.6 mm, H= −25.1 mm, H= −12.6 mm, and H=0 mm.

Figure 12:
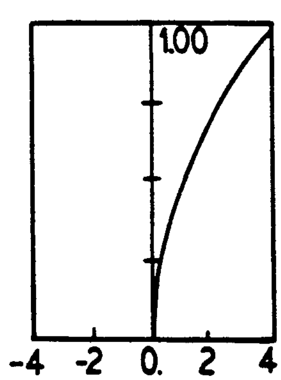
FIGS. 12, 13 and 14 illustrate radial distortion, geometrical astigmatism, and MTF astigmatism, respectively, for the system of FIGS. 1 through 11.
Figure 13:
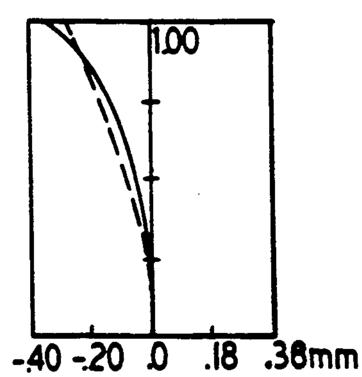
Figure 14:
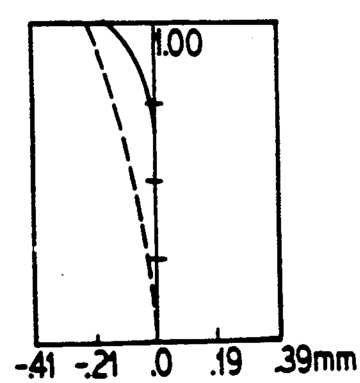

FIGS. 12-14 are plots showing radial distortion, geometrical (classical) astigmatism, and MTF astigmatism. The ordinate scale shows relative values between zero and one, while the abscissa scale is in millimeters relative to the focus position.

An exemplary set of specifications of the lens system which gave the results of FIGS. 8 through 14, is as follows, (the optical surfaces being indicated in parenthesis for the respective lenses):

Exemplary Lens System Specification

| Lens Ref. Number (and Lens Surface) | Radius (millimeters) | Thickness (millimeters) | Clear Aperture (diameter) millimeters) |
|---|---|---|---|
| 91(S1) | 13.5153 | 2.40000 | 6.98 |
| 91(S2) | −17.1251 | 1.10247 | 6.04 |
| 92(S3) | −10.8715 | 1.40000 | 4.75 |
| 92(S4) | −37.7869 | .50000 | 4.03 |
| 97(S5) | plano | .50000 | 3.69 |
| 93(S6) | 37.7869 | 1.40000 | 3.83 |
| 93(S7) | 10.8715 | 4.31965 | 4.31 |
| 94(S8) | 17.1251 | 2.40000 | 8.50 |
| 94(S9) | −13.5153 | 12.00000 | 8.91 |
| 95(S10) | −7.9373 | 2.00000 | 11.08 |
| 95(S11) | −37.4635 | 12.04436 | 13.68 |

Lenses 91, 94 and 95 are of an acrylic lens material known as type 493 572, and lenses 92 and 93 are of a polystyrene lens material, type 592 307.

In FIG. 8, the following dimensions apply as system first order properties:

f/9.00, H= −30.000 mm
magnification −0.4000
OBD= −92.9562 mm (object plane 0 to 51)
BRL=28.0221 mm (S1 to S11 along axis 81)
IMD=12.0444 mm (S11 to image plane I)
OVL=133.023 mm (object plane 0 to image plane I).

In FIG. 4, the axis of the elliptical reflector portion 35a may intersect axis 64 at ten millimeters in front of the front surface of window 34.

The details of a lens system which is effective to transmit an optical image of a bar code pattern from a sensing field 50 with a depth of about one inch and a width of about 2.5 inches to a flat photodetector surface twenty-five microns wide and about one inch in length, is as follows:

- mirror 41 at an angle of 57.5 degrees to axis 81, plus or minus fifteen minutes of arc;
- distance along axis 64 from bar code sensing region 50 to the front reflective surface of mirror 41, about 46.5 millimeters;
- distance along axis 80 from the front reflective surface of mirror 41 to the front reflective surface of mirror 43, about 20.5 millimeters;
- mirror 43 at an angle of 75 degrees plus or minus ten minutes of arc, relative to axis 81;
- distance along axis 81 from front reflective surface of mirror 43 to first lens surface (S1) of lens 91, about 19.5 millimeters;
- distance along axis 81 from first lens surface (S1) of lens 91 to back lens surface (S9) of lens 94, about fourteen millimeters;
- distance along axis 81 from the back lens surface (S9) of lens 94 to the vertex of the concave front surface (S10) of lens 95, about twelve millimeters;
- distance along axis 81 from the back convex surface (S11) of lens 95 to the front reflective surface of mirror 103, about 7.5 millimeters plus or minus 0.1 millimeter;
- distance along axis 104 from the front surfave of mirror 103 to the image plane of photodetector 24, about 3.5 millimeters plus or minus 1 millimeter;
- mirror 103 at an angle of about 37.5 degrees plus or minus ten minutes of arc, relative to axis 81;
- angle between axis 81 and the plane of the printed circuit board 20, about fifteen degrees.

Thus, the total optical distance along axes 64, 80, 81 and 104 is about 125 millimeters. This optical path occupies a physical length of the casing 14 of about seventy-five millimeters, so that a substantial reduction in the length of the forward portion of unit 10 is achieved.

Figure 15:
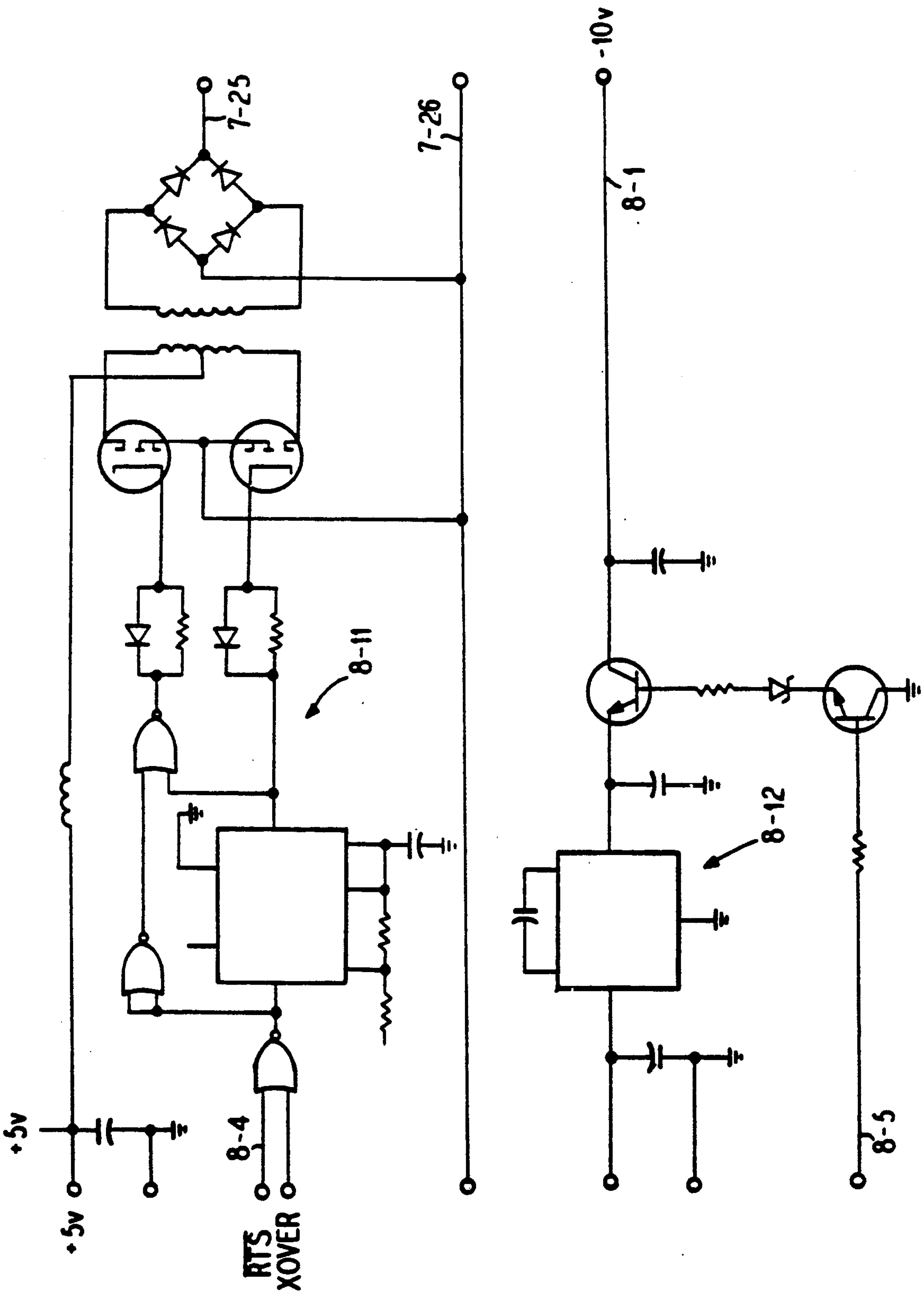
FIGS. 15 and 16 together provide a diagrammatic showing of the electric circuitry for the interface component 17, FIG. 1, where the unit 16 is itself battery operated and portable.
Figure 16:
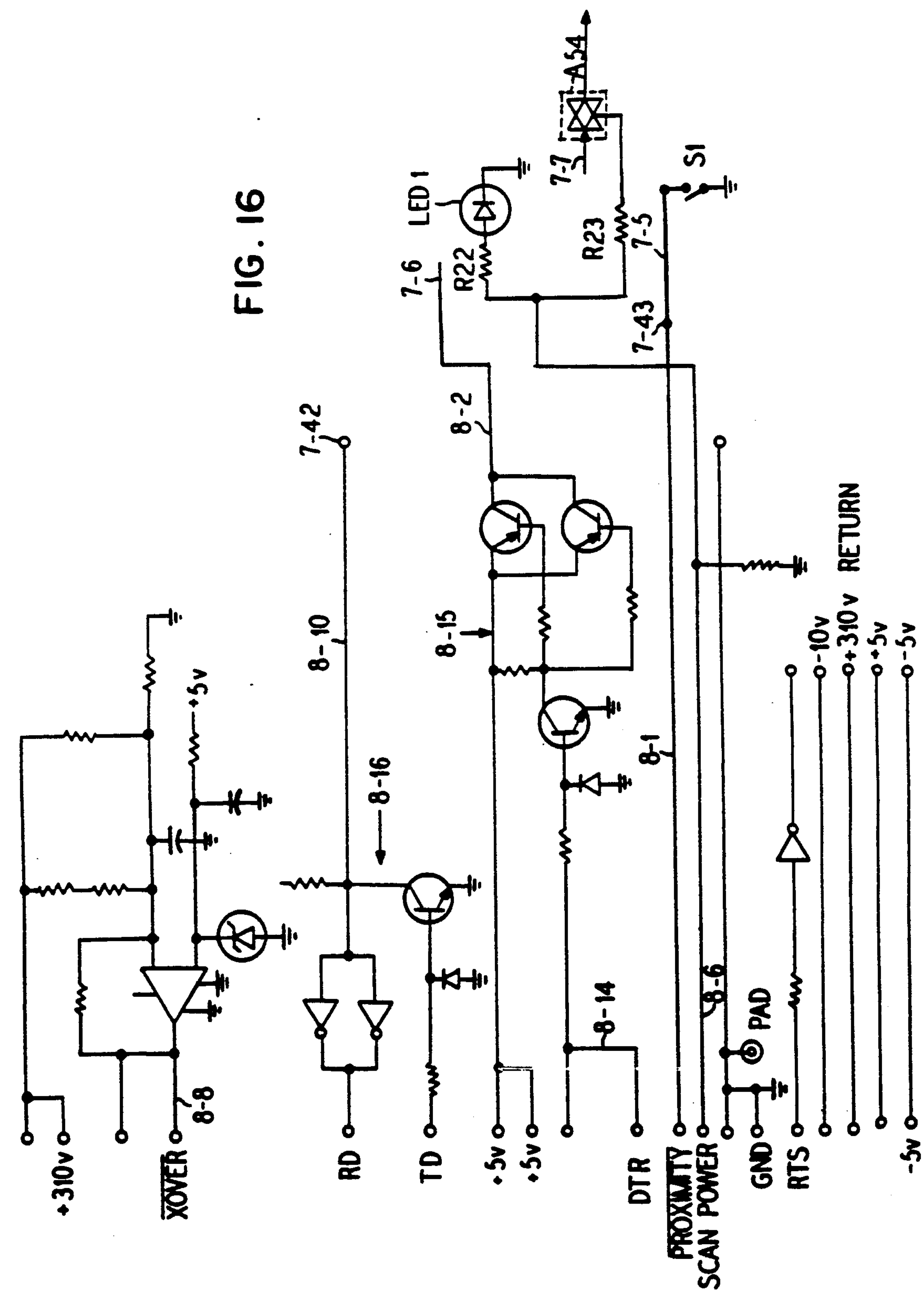

FIGS. 15 and 16 show the circuitry for interface 17 when it is associated with a Model 101 portable system corresponding to component 16 in FIG. 1.

For the case where the circuitry of FIGS. 15 and 16 is associated with the reader circuit of FIG. 7, switch S1 will be decoupled from processor A1, and actuation of button 18 to close switch S1 will be transmitted via conductors 7-5, FIG. 7 to point 7-43 shown at the upper right of FIG. 7, and from this point via conductor 8-1, FIG. 16, to the "$\overline{\text{PROXIMITY}}$". The interface module 17 of FIGS. 15 and 16 plugs into the model 101 unit 16 and provides any required level conversion between the model 101 and the reader unit of FIG. 7. The interface module of FIG. 16 generates plus 400 volts for the flash tube and the minus ten volts for the scanner module A3. Both of these supplies and the plus five volts from output 8-2 of FIG. 16 are switched at the interface module under Model 101 control.

A scan is initiated when the trigger switch S1, FIG. 7, is depressed. This gives a "$\overline{\text{PROXIMITY}}$" signal to the model 101 via conductor 8-1 in the same manner as a prior art scanning wand. After receiving $\overline{\text{PROXIMITY}}$, the model 101 checks $\overline{\text{XOVER}}$ to verify that the high voltage is charged to an acceptable level. If not, the model 101 circuit raises RTS at 8-4, FIG. 15 to enable the high voltage charge circuit. The model 101 then waits for $\overline{\text{XOVER}}$ to go low, or up to 750 milliseconds, whichever comes first. If the $\overline{\text{XOVER}}$ signal does not indicate a valid high voltage within the 750 millisecond time out, a charge error is indicated. If $\overline{\text{XOVER}}$ goes valid within the 750 millisecond time-out then the model 101 drops RTS and raises DTR at 8-5, FIG. 15, The DTR signal is used by the interface module to switch the low voltage supplies to the reader unit of FIG. 7.

After raising DTR, the model 101 waits for a Bell (07 HEX) from the reader circuit of FIG. 7. The time-out for this is also 750 milliseconds. If the Bell is not received, a bad scan is assumed. After receiving the Bell, the model 101 sends a three character control word to the reader of FIG. 7. The first character is the minimum length expected, added to an ASCII 0 (30 HEX), the second character is the maximum length expected, added to an ASCII 0 and third character is an ASCII ACK (06 HEX). The minimum and maximum are sent in this fashion to reduce communication overhead and still maintain an ASCII protocol.

After the control word is sent, the model 101 turns on SCAN POWER at 8-6, FIG. 16 to enable the strobe. The model 101 monitors $\overline{\text{XOVER}}$ to detect a flash and waits up to 100 milliseconds before assuming a bad scan. After $\overline{\text{XOVER}}$ at 8—8, FIG. 16, goes low, the model 101 waits up to 750 milliseconds for the reader to send the decoded bar code data. If no data is received at line 8-10, FIG. 16, within 750 milliseconds or if the reader sends an ASCII "*", a bad scan is indicated and a retry will be attempted if $\overline{\text{PROXIMITY}}$ at line 8-1 is still present.

If valid data is received from the reader, then the first character indicates which type of label was scanned. The decoded label then follows with a modulus ten hash digit, and ASCII carriage return, and an ASCII line feed added onto the end.

If the data meets the model 101 requirements for a good scan, then the model 101 drops DTR at conductor 8-5 and powers off the reader unit. If not, then an ASCII NAK is sent to the reader, and a retransmission is requested. If the data was good, then the model 101, under application control, can indicate a good scan on the reader by turning on SCAN POWER at 8-6, FIG. 16.

FIG. 15 shows the circuitry at 8-11 for the flash tube firing. When the RTS input 8-4 is active, the 300 volt direct current generator charges its output capacitor to the maximum voltage $V_M$ and is shut off by the signal XOVER until the output voltage reaches a fixed lower voltage $V_L$ at which point the 300 volt generator is started until the output reaches $V_M$. If RTS is inactive, the 300 volt generator is off.

Section 8-12 in FIG. 15, supplies minus ten volts to output 8-1, which in turn supplies component A3, the diode array chip A3 of FIG. 7. When DTR at 8-5 is active, conductor 8-14, FIG. 16 is also active so as to switch plus five volts from the model 101 to output line 8-2 via circuit block 8-15, so that the processor A1 is powered up.

A data link circuit is indicated at 8-16 in FIG. 16 which interfaces the READ (RD) signal and the TRANSMIT DATA (TD) signals from the model 101 over a single line 8-10 to the reader processor A1 via terminal 7-42 at the upper right in FIG. 7.

The proximity line 8-1 of FIG. 16 is an input to the model 101 indicating that the operator has depressed the reader button 18 requesting a read operation.

The SCAN POWER line 8-6 is an output from the model 101 allowing the flash tube to be fired by the reader processor A1 (via output 7-7).

In operation, the model 101 receives a request to scan (PROXIMITY) signal via conductor 8-1 FIG. 16 from the reader circuit of FIG. 17. The model 101 raises DTR at 8-14 which turns on the reader processor A1. The reader processor sends a "Bell" signal to the model 101 via terminal 7-42 and conductor 8-10, FIG. 16. The model 101 checks XOVER at 8-8 for full charge. When 300 volts is charged (XOVER) the model 101 sends the reader a go ahead character via conductor 8-10, FIG. 16, and terminal 7-42, and enables the flash via SCAN POWER at 8-6, FIG. 16. The reader decodes the data from the scanner A3, FIG. 7, and sends a character or characters back to the model 101 via terminal 7-42 and conductor 8-10, FIG. 16. If a valid character is read, it is passed to the model 101. The cycle is complete and will not start again until the button 18 is released and depressed again by the operator. If the reader gets an invalid code a character (*) is sent to the model 101 indicating no read and the cycle starts again.

In the portable application, the reader unit operates from the battery pack of the model 101 and to prolong its life, the central processing unit A1, FIG. 7, is powered down when not needed.

When the trigger switch S1 is closed, the model 101 proximity line, 7-5, FIG. 7, 8-1, FIG. 16, goes low. The model 101 applies five volts to the central processing unit A1. The capacitor charges and above 2.5 volts at C1, FIG. 7, releases the central processing unit A1 to operate. In this mode, however, conductor 7-4 and the upper plate of capacitor C1 are disconnected from the gate of switch A54, switch A54 instead being controlled via line 7-6 as shown in FIG. 16. In addition, output line 7-7 from processor A1, FIG. 7, is isolated from the flash tube circuit by the bilateral switch A54. During power-up and down, conductor 7-7 from the processing unit A1 changes unpredictably and could flash the lamp, so that the bilateral switch A54 is opened. Because the bilateral switch A54 is controlled by the same signal that drives the green LED 1 (good scan), FIG. 16, the switch A54 is only turned on for a short time. It is timed to coincide with the reader flash signal from conductor 7-7 at the output of processor A1. The switch A54 is also turned on during the time the green LED 1 is on to indicate a good scan.

In the commercial equipment, fixed base, versus portable components 16 were implemented by a circuit arrangement which eliminated the need for jumpers by going to a cut-only arrangement.

To correct a band width problem, the op-amp A6 was changed to a type CA3130E. This part has a much higher gainband width product than the amplifier previously used. It is also more stable over the temperature range and voltage range. The second and third stages use an LM358N, (A41 and A42, FIG. 7) which was comparable to a previous part.

The recharge control transistor Q1 was changed from a 2N3906 to a VP0106 to eliminate the need for two resistors. The existing circuit was stabilized over temperature by the addition of a 2.2 kilohm resistor, but it became apparent that there was no room for the extra resistor. The VP0106 also eliminated a further resistor allowing other parts to be moved around.

In checking the alternating current noise adjustment at R8, FIG. 7, it became apparent that there was an unknown noise element. This was found to be caused by the lack of output load on amplifier A6. By adding R27, a ten thousand ohm pull-down resistor to the output of the CA3130E operational amplifier, the noise was eliminated. After adding R27, the adjustment of R8 was easy to complete.

The circuits as shown herein were deemed ready for release to production. The changes indicated were considered to accomplish some significant improvements.

Exemplary product specifications for a commercial reader unit in accordance with the present invention are as follows:

Using a standard UPC-A label, the read rate design goals are:

First Read Rate: 95%

Second Read Rate: 98%

Third Read Rate: 99.5%.

Not more than 7.3 errors in ten thousand accepted reads (per "The Effect of the Design of the IBM Proposed UPC Symbol and Code on Scanner Decoding Reliability").

Depth of field: Up to 0.4 inch (ten millimeters).

The reader will read bar codes with a minimum bar/space width of 7.5 mils (0.0075 inch) at a contrast ratio of 50% or greater. Each bar or space must be within plus ten percent of its nominal size, and the maximum width of a bar code is 1.8 inches from first start bar to last stop bar, including add on, if any. A quiet zone of not less than five times the narrowest element of the start or stop bars is required on each end.

Minimum label radius must be greater than 1.25 inches for a 1.8 inch label.

The reader will currently support the following codes: UPC-A, UPC-E, EAN-13, and EAN-8 with or without add-on 2 or 5.

The scanning modules are encoded in ROM and can be modified to support other bar codes at the factory.

Pursuant to 37 CFR 1.96 (a) (2) (ii), a computer printout (in continuous web form) is found in an accompanying protective cover and is designated "COMPUTER PRINTOUT APPENDIX PURSUANT TO 37 CFR 1.96(a) (2) (ii)". For the sake of identification of this material, it may be noted that the printout sheets are numbered beginning with the third sheet as "PAGE 1" through "PAGE 57". PAGE 57 begins a "CROSS REFERENCE" listing which continues for five sheets without page numbers.

The first page (without apage number) of the listing includes the following notation:

"JOB=RDXIL PRINTED ON 17-DEC-81 at 03:09 PM FOR USER [1, 160]"

It will be apparent that many modifications and variations may be effected without departing from the scope of the novel concepts and teachings of the present invention.

IN THE UNITED STATES PATENT AND TRADEMARK OFFICE
APPLICANTS: George E. Chadima, Jr., Vadim Laser
TITLE: "Instant Portable Bar Code Reader" (Attorney's Case No. P-81,663)
COMPUTER PRINTOUT
APPENDIX
PURSUANT TO 37 CFR 1.96(a)(2)(ii)
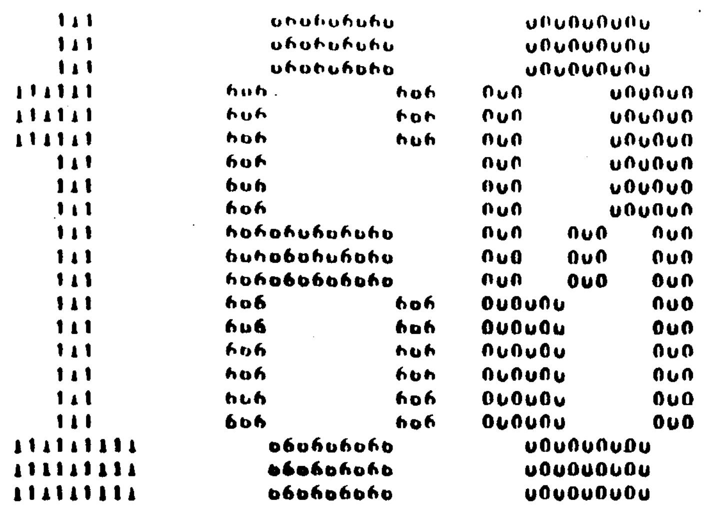

```
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]

JOB = RDXIL     PRINTED ON 17-DEC-81 AT 03:09 PM FOR USER [1,160]
QUEUED ON 17-DEC-81 AT 02:59 PM FOR LPI/UNTIL
SYSTEM NAME: RSTS V7.0-07 MURANO 11/70
FORM: NORMAL  /LENGTH: 66  /WIDTH: 132
JOB COPY: 1 OF 1

[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]

RHRHRHRHRHR    DUDUDUDUDUDU       XAX          XAX        111         LLL
RHRHRHRHRHR    DUDUDUDUDUDU       XAX          XAX        111         LLL
RHRHRHRHRHR    DUDUDUDUDUDU       XAX          XAX        111         LLL
RHR      RHR   DUD         DUD    XAX          XAX     111111         LLL
RHR      RHR   DUD         DUD    XAX          XAX     111111         LLL
RHR      RHR   DUD         DUD    XAX          XAX     111111         LLL
RHR      RHR   DUD         DUD       XXA    XXA           111         LLL
RHR      RHR   DUD         DUD       XXA    XXA           111         LLL
RHR      RHR   DUD         DUD       XXA    XXA           111         LLL
RHRHRHRHRHR    DUD         DUD          XAX               111         LLL
RHRHRHRHRHR    DUD         DUD          XAX               111         LLL
RHRHRHRHRHR    DUD         DUD          XAX               111         LLL
RHR   RHR      DUD         DUD       XXA    XXA           111         LLL
RHR   RHR      DUD         DUD       XXA    XXA           111         LLL
RHR   RHR      DUD         DUD       XXA    XXA           111         LLL
RHR      RHR   DUD         DUD    XAX          XAX        111         LLL
RHR      RHR   DUD         DUD    XAX          XAX        111         LLL
RHR      RHR   DUD         DUD    XAX          XAX        111         LLL
RHR         RHR DUDUDUDUDUDU      XAX          XAX     111111111      LLLLLLLLLLLLLLL
RHR         RHR DUDUDUDUDUDU      XAX          XAX     111111111      LLLLLLLLLLLLLLL
RHR         RHR DUDUDUDUDUDU      XAX          XAX     111111111      LLLLLLLLLLLLLLL

[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
[[[<<<<<<<<<<<&&&&&&&&&&:!!!!!!!!!!##########(?(?(?(?(?==========U0U0U0U0U0**********&&&&&&&&&&++++++++++%%%%%%%%%%>>>>>>>>>>]]]
```

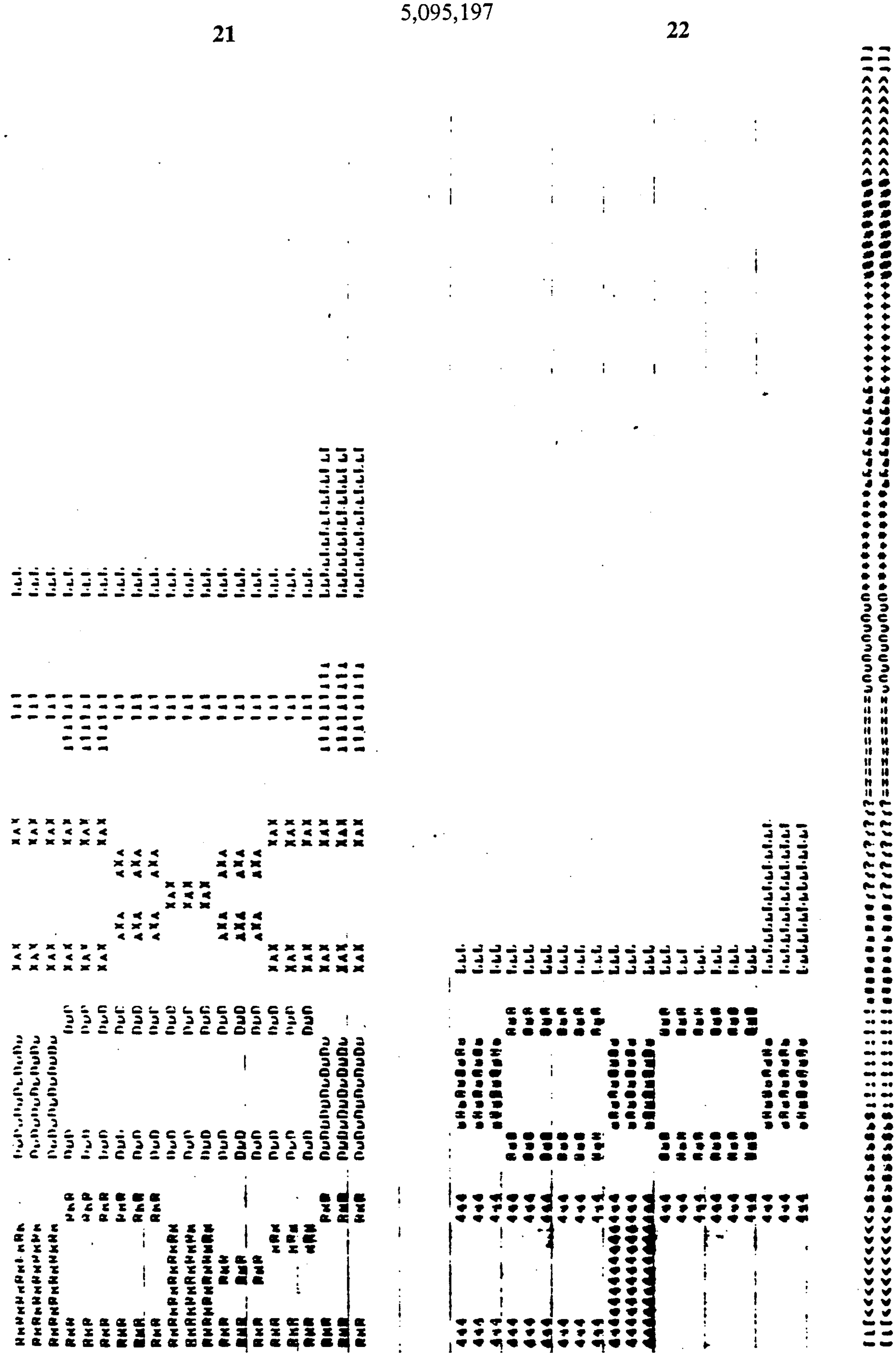

```
JOB = RDXIL     PRINTED ON 17-DEC-81 AT 03:09 PM FOR USER [1,160]
COPY    1 OF    2    /DELETE: NO   FILE = LN1   :[50,52]RDXIL .4RL
RECORD TYPE: STREAM     FORMAT TYPE: FORTRAN

[[[<<<<<<<<<<<&&&&&&&&&&&::::::::::@@@@@@@@@@((?(?(?(?(?==========UUUUUUUUUU**************&&&&&&&&&&++++++++++++$$$$$$$$$$>>>>>>>>>>]]]
[[[<<<<<<<<<<<&&&&&&&&&&&::::::::::@@@@@@@@@@((?(?(?(?(?==========UUUUUUUUUU**************&&&&&&&&&&++++++++++++$$$$$$$$$$>>>>>>>>>>]]]

LINE  ADDR  B1 B2 B3 B4 ERROR   RDXIL.4RP,PORT,OPC-A,E(0,1),FAN-R,13,ADDON 2,5                PAGE   1

                    TITLE   'RDXIL.4RP,PORT,OPC-A,F(0,1),EAR-B,13,ADDON 2,5
                 * CONDITIONAL ASSEMBLY SWITCHES
      0000       DEBUG   EQU     0        SWITCH FOR CONDITIONALLY INCLUDING DEBUG CODE
                 *
                 * AUTHOR JIM WAITE
                 *
                 * HISTORY
                 *
                 * RDXIL
                 * VER 1.0        12-10-81        CREATED FROM RDXIC VER 1.4
                 *                                CHANGED RED LITE TO WHAT GREEN LITE MEANT.
                 *                                 CHANGED GREEN LITE TO MEAN GOOD READ,
                 *                                 OPPOSITE OF WHAT RED LITE MEANS.
                 *
                 * RDXIC
                 * VER 1.4        08-21-81        DELETED THE 1,2,7,8 258 TEST ADDED
                 *                                 IN VERSION 1.2. LEFT IN THE '#'
                 *                                 TEST.
                 *                                ADDED DL2 MUST READ COMMAND.
                 *                                CHANGED 'OUTCHAR' TO WAIT 1 BIT TIME
                 *                                 BEFORE SENDING A CHARACTER SO THAT
                 *                                 THE OTHER END HAS TIME TO FINISH
                 *                                 SENDING THE STOP BIT BEFORE THIS
                 *                                 END MIGHT SEND A RESPONSE.
                 *
                 * VER 1.3        08-14-81        MODIFIED 'INIT' AND 'READ' TO HANDLE
                 *                                 HELICON AND DIGITIZER BETTER.
                 *                                 DOUBLES ANALOG SIGNAL STRENGTH.
                 *
                 * VER 1.2        08-19-81        MODIFIED 'CHAR' AND ADDED 'R4VSR7'
                 *                                 SO THAT C1/C2, C3/C4 COMPARISON FOR
                 *                                 DETERMINATION OF 1/7, 2/8 CHARACTERS
                 *                                 THE LARGER COUNT MUST BE LARGER
                 *                                 THAN THE SMALLER COUNT PLUS 25%.
                 *                                 THIS WILL HELP REDUCE SUBSTITUTIONS.
                 *
                 * VER 1.1        08-18-81        MODIFIED 'READER' TO:
                 *                                 DELAY INPUTTING THE DATA AND SHIFT
```

```
                  *                             THE INPUT TO A TIME WHEN CIRCUIT
                  *                             NOISE FROM THE INPUT WOULD BE LESS
                  *                             HARMFUL.
                  *                            MODIFIED 'GUARD' TO:
                  *                             CHANGE THE GUARD REQUIREMENT FROM
                  *                             +/-25%+1 TO 50%.
                  *
                  * VER 1.0      06-16-81       RELEASED
LINE ADDR B1 B2 B3 B4 ERROR  PDX11.ASP,PDR1,OPC-A,E(0,1),FAP-R,13,ADDDR 2,3    PAGE 2

                  *
                  * MACROS
                  *
                  ERR     MACRO
                          CLR     F0
                          CPL     F0
                          ENDM
                  *
                  JERR    MACRO   ADDR
                          JF0     ADDR
                          ENDM
                  *
                  JOK     MACRO   ADDR
                          LOCAL   LAB1
                          JF0     LAB1
                          JMP     ADDR
                  LAB1    SET     $
                          ENDM
                  *
                  JOEN    MACRO   ADDR
                          JT0     ADDR
                          ENDM
                  *
                  JRDNT   MACRO   ADDR
                          JNT0    ADDR
                          ENDM
                  *
                  PAGE    MACRO   SIZE
                          ORG     (($+SIZE-1)/SIZE)*SIZE
                          ENDM
                  *
                  OK      MACRO
                          CLR     F0
                          ENDM
                  *
                  RETERR  MACRO
                          CLR     F0
                          CPL     F0
                          RET
                          ENDM
                  *
```

```
                                BATOK  MACRO
                                       CLR     F0
                                       RET
                                       ENDM
LINE  ADDR  B1 B2 B3 B4 ERROR   RUXIL,48P,PURT,UPC-A,E(U,1),EAN-8,13,ADDON 2,5          PAGE    3

                                *
                                * TESTABLE FLAGS AND INPUT DEFINITIONS
                                *
                                * F0     ERROR FLAG
                                * F1     NOT USED
                                * T0     LOW = PORTABLE MODE
                                * T1     NOT USED
                                * INT    RECEIVE DATA
                                *
                                * EQUATES
                                *
                                * PORT 1 BITS
      0080                      REFFER   EQU    128     REFFER CONTROL
      0040                      GREEN    EQU    64      GREEN LITE - LAST READ WAS GOOD
      0020                      RED      EQU    32      RED LITE - ENABLED
      0010                      FLASH    EQU    16      IMAGE ARRAY CONTROL SIGNAL
      0008                      SAMPLE   EQU    8       IMAGE ARRAY CONTROL SIGNAL
      0004                      RECHARG  EQU    4       IMAGE ARRAY CONTROL SIGNAL
      0002                      START    EQU    2       IMAGE ARRAY CONTROL SIGNAL
      0001                      CLOCK    EQU    1       IMAGE ARRAY CONTROL SIGNAL
                                *
                                * PORT 2 BITS
      0080                      TXD      EQU    128     TRANSMIT DATA OUTPUT BIT
      0040                      TXEN     EQU    64      TRANSMIT ENABLE - RECEIVE ALWAYS ENABLED
      0020                      TRIGR    EQU    32      TRIGGER SWITCH BIT - LOW EQUALS TRUE
      0010                      BARBIT   EQU    16      BAR DATA INPUT BIT
                                *
                                * HOST COMMUNICATION CONTROL CHARACTERS
      0006                      ACK      EQU    6       FROM HOST TO INDICATE LAST DATA WAS OK
                                                         HANDLED IN 'SEND'
                                *
      0015                      NAK      EQU    21      FROM HOST TO INDICATE LAST DATA WAS BAD
                                                         HANDLED IN 'SEND'
                                *
      0011                      DC1      EQU    17      FROM HOST TO ENABLE DATA TRANSFER
                                                         TRAPPED IN 'GETCHAR'
                                *
      0012                      DC2      EQU    18      FROM HOST TO INITIATE A READ CYCLE
                                                         TRAPPED IN 'WAITON'
                                *
      0013                      DC3      EQU    19      FROM HOST TO DISABLE DATA TRANSFER
                                                         TRAPPED IN 'GETCHAR'
                                *
      0007                      BEL      EQU    7       TO HOST AS POWER-UP SIGNAL
      0005                      ENQ      EQU    5       FROM HOST TO REQUEST ID MESSAGE
                                                         TRAPPED IN 'GETCHAR'
                                *
      0003                      ETX      EQU    3       FROM HOST TO RESTART THIS PROCESSOR
                                                         TRAPPED IN 'INT'
                                *
      0000                      NULL     EQU    0       USED TO INDICATE EMPTY RECEIVE BUFFER
                                *
```

```
                                        * ASCII CHARACTER EQUATES
       000D                             CR       EQU   13        CARRIAGE RETURN
       000A                             LF       EQU   10        LINE FEED
       0020                             SP       EQU   32        SPACE
       0000                             EOD      EQU   0         INDICATES END-OF-DATA WITHIN A BUFFER
                                        *
                                        * BARCODE TYPE EQUATES
       0000                             UPC      EQU   0         UPC - MUTUALLY EXCLUSIVE WITH EAN
       0001                             EAN      EQU   1         EAN - MUTUALLY EXCLUSIVE WITH UPC
       0000                             SHORT    EQU   0         SHORT - MUTUALLY EXCLUSIVE WITH LONG
       0002                             LONG     EQU   2         LONG - MUTUALLY EXCLUSIVE WITH SHORT
LINE   ADDR   B1 B2 B3 B4 ERROR         MDX11.46P,PUR1,UPC-A,E(0,1),EAN-8,13,ADDON 2,5          PAGE   [illegible]

       0004                             ADDON2   EQU   4         MUTUALLY EXCLUSIVE WITH ADDON5
       0008                             ADDON5   EQU   8         MUTUALLY EXCLUSIVE WITH ADDON2
                                        *
       0080                             BACKCHR  EQU   128       DECODED CHARACTER BACKWARD BIT FLAG
                                        *
                                        * ADDRESS EQUATES
       0000                             ROMBEG   EQU   0
       0003                             VECTOR3  EQU   3         EXTERNAL INTERRUPT VECTOR
       0007                             VECTOR7  EQU   7         TIMER INTERRUPT VECTOR
       0020                             RAMBEG   EQU   32
       0100                             RAMEND   EQU   256
LINE   ADDR   B1 B2 B3 B4 ERROR         MDX11.46P,PUR1,UPC-A,E(0,1),EAN-8,13,ADDON 2,5          PAGE   5

                                        *
                                        * RAM STORAGE AREA DEFINITIONS
                                        *
       0008                             STACK    EQU   8
                                                 ORG   RAMBEG
       0020                             INCHAR   DS    1                RECEIVE DATA BUFFER - INTERRUPT LOADED
       0021                             TRYS     DS    1                BAD SCAN RETRY COUNTER
                                        *
       0022                             FRAMPTR  DS    1                PTR TO COUNT'S FRAMING DBCT
       0023                             CHARPTR  DS    1                PTR TO LOCATION OF NEXT DECODED CHARACTER
       0024                             ADDPTR   DS    1                PTR TO RIGHT END OF COUNTS AFTER DECODE
       0025                             EODPTR   DS    1                POINTER TO END OF COUNTS
       0026                             BACKSW   DS    1                BACKWARDS SWITCH, <>0 = BACKWARDS
                                        *
       0027                             CHARS    EQU   $
       0027                             CHARTYP  DS    1                DECODED BARCODE TYPE - 1ST BYTE OF CHARS
       0028                             CHARF1   DS    1                DECODED BARCODE F1 CHARACTER FOR EAN-13
       0029                             CHARBEG  DS    14               DECODED BARCODE CHARACTERS
       0035                                      DS    1                PLUS 1 FOR EOD
                                        *
       0036                             CHARADD  DS    5                DECODED BARCODE ADDON CHARACTERS
       003B                                      DS    1                PLUS 1 FOR EOD
                                        *
       003C                             CNTBEG   DS    RAMEND-$         BAR COUNTS OCCUPY REST OF RAM LESS 1 FOR EOD
       0100                             CNTEND   EQU   $
```

```
ADDR  B1 B2 B3 B4 ERROR   ROXII.46P,PUPI,UPC-A,E(0,1),EAN-8,13,ADDON 2,5          PAGE    6

                          *
                          * ROM CODE
                          *
                                   ORG      ROMBEG
0000                      BEGIN
0000  04 05                        JMP      BEGIN2
                                   ORG      VECTR3
0003  A4 05                        JMP      INT
                          * INIT PROGRAM VARIABLES AND I/O
0005  F4 7F               BEGIN2   CALL     INIT           INITIALIZE VARIABLES AND I/O
                          *
                          * MAIN SCAN LOOP STARTS HERE
                          *
0007                      SCAN
                           IF DEBUG
                           ENDIF
0007                               JPORT    SCAN2          IF PORTABLE THEN SKIP TRIGGER WAIT
0009  E4 AE                        CALL     WAIT           WAIT FOR ENABLE AND SCAN TRIGGER
000B  B9 21               SCAN2    MOV      R1,#TRYS       INIT BAD SCAN RETRY COUNTER
000D  B1 EC                        MOV      @R1,#-20       (UPCOUNTER)
000F  99 9F                        ANL      P1,#-1-GREEN-RED       TURN OFF GOOD READ, READY LITES
0011  14 3B               SCANLP2  CALL     READ     READ BARCODE BIT ARRAY INTO MEMORY AS BARCODE COUNTS
0013  14 B0                        CALL     FILTER         FILTER OUT INVALID COUNTS
0015  14 B6                        CALL     ADJUST         ADJUST COUNT VALUES BY A FACTOR
                           IF DEBUG
                           ENDIF
0017  34 00                        CALL     DECODE         DECODE BARCODE COUNTS INTO CHARACTERS
0019                               JPORT    SCAN4          IF PORTABLE THEN SEND THE DATA
001B                               JERR     SCNERR2
001D  54 00               SCAN4    CALL     SEND           SEND DECODED BAR CODE TO HOST
001F                               JERR     SCNERR2        DATA NOT ACCEPTED
0021                               JPORT    $              LOOP HERE IF PORTABLE - WE GET POWERED DOWN
0023  89 40                        ORL      P1,#GREEN      TURN ON GOOD READ LITE
0025  94 00                        CALL     BEEP           SHORT BEEP MEANS GOOD
0027  04 07                        JMP      SCAN           GOTO WAIT FOR NEXT TRIGGER
0029  F4 CB               SCNERR2  CALL     TRIGGER        IF NO TRIGGER
002B  C6 37                        JZ       SCNERR4        THEN EXIT WITH ERROR
002D  B9 21                        MOV      R1,#TRYS       ELSE CHECK FOR LAST TRY
002F  11                           INC      @R1
0030  F1                           MOV      A,@R1
0031  C6 37                        JZ       SCNERR4        LAST RETRY - EXIT WITH ERROR
0033  94 16                        CALL     DELAY          WAIT 60MS BEFORE RE-FLASHING
0035  04 11                        JMP      SCANLP2
0037  99 BF               SCNERR4  ANL      P1,#-1-GREEN   TURN OFF GOOD READ LITE
0039  04 07                        JMP      SCAN
                          *
                          * CLEAR DIODE BIT ARRAY AND FLASH
                          * READ 1024 BIT ARRAY
                          * COUNT EACH SERIES OF 1 OR 0 BITS AND STORE THE COUNTS IN RAM
                          * ONE BIT REPRESENTS 0.0025"; 255 BITS REPRESENTS 0.6375"
                          * BIT COUNTS ARE LIMITED AT 255 - THEY ARE NOT ALLOWED TO WRAP.
```

```
                          *
                          READ
                          * INIT READ VARIABLES
003B  27                           CLR    A                    INITIALIZE REGISTERS
003C  AA                           MOV    R2,A                 0/1 COUNT SWITCH
003D  AB                           MOV    R3,A                 COUNT
003E  BC 04                        MOV    R4,#4                LOOP COUNTER - 1024
0040  AD                           MOV    R5,A                 LOOP COUNTER - 1024
0041  B8 3C                        MOV    R0,#CNTDEG           PTR TO COUNTS
                          * CLEAR BIT ARRAY
0043  89 06                        ORL    P1,#START+RECHARG         INITIATE ARRAY RECHARGE CYCLE
0045  99 FE                        ANL    P1,#-1-CLOCK
0047  99 FD                        ANL    P1,#-1-START
0049  89 01               RDCLRB   ORL    P1,#CLOCK
004B  99 FE                        ANL    P1,#-1-CLOCK        CLEAR REMAINING BITS
004D  ED 49                        DJNZ   R5,RDCLRB
004F  EC 49                        DJNZ   R4,RDCLRB
                          * FLASH
0051  89 13                        ORL    P1,#FLASH+START+CLOCK     INITIATE ARRAY READ-OUT CYCLE
0053  ED 53                        DJNZ   R5,$                 DELAY FOR FLASH TUBE TO FINISH FLASHING
0055  99 EF                        ANL    P1,#-1-FLASH-CLOCK
0057  99 FD                        ANL    P1,#-1-START
0059  BC 04                        MOV    R4,#4                RE-INIT HIGH BYTE OF BIT COUNTER
                          * READ ARRAY
005B  0A                  READLP   IN     A,P2                 DATA FROM SAMPLE OF PREV LOOP CYCLE
005C  89 08                        ORL    P1,#SAMPLE           DATA FROM CLOCK OF PREV LOOP CYCLE
005E  99 F7                        ANL    P1,#-1-SAMPLE
0060  89 05                        ORL    P1,#CLOCK+RECHARG         4US CIRCUIT DELAY AND POSITIONS
0062  00                           NOP
0063  00                           NOP
0064  99 FB                        ANL    P1,#-1-RECHARG            THE 'IN' TO CAUSE MINIMUM NOISE.
0066  99 FE                        ANL    P1,#-1-CLOCK
0068  1B                           INC    R3                   BUMP BAR COUNT
0069  2B                           XCH    A,R3                 IF BAR BIT COUNT
006A  96 6D                        JNZ    READ2                ZERO
006C  07                           DEC    A                    THEN SET BAR/SPACE COUNT BACK TO 255
006D  2B                  READ2    XCH    A,R3
006E  53 10                        ANL    A,#BARBIT            MASK BAR BIT
0070  2A                           XCH    A,R2                 SAVE NEW BIT LEVEL
0071  DA                           XRL    A,R2                 IF BIT LEVEL
0072  C6 7D                        JZ     READ6                CHANGED
0074  27                           CLR    A                    THEN CLEAR NEW COUNT
0075  2B                           XCH    A,R3                 AND
0076  A0                           MOV    @R0,A                STORE OLD COUNT.
0077  18                           INC    R0                   ADJUST COUNT PTR
0078  F8                           MOV    A,R0
0079  D3 FF                        XRL    A,#CNTEND-1
007B  C6 84                        JZ     READFA               FAIL - COUNT AREA FULL
007D  ED 5B               READ6    DJNZ   R5,READLP            LOOP 256 X 4 TIMES
007F  EC 5B                        DJNZ   R4,READLP
0081  FB                           MOV    A,R3                 WRITE LAST COUNT
0082  A0                           MOV    @R0,A
```

```
0093 18                INC   R0
0094 43 D5   READEX    ORL   PSW,#RECHARC+CLOCK
0096 C1 E9             JMP   CNTECD          GOTO EOD COUNT BUFFER

        *
        * FILTER ELIMINATES AN INVALID COUNT BY ADDING IT INTO THOSE COUNTS
        * ON EACH SIDE. THIS ASSUMES THAT A BAD ARRAY BIT(S) CAUSED AN
        * INVALID TRANSITION. THIS INVALID TRANSITION OR COUNT SHOULD
        * REALLY BE PART OF THE COUNTS ON EACH SIDE OF IT. WITH PRESENT
        * 2.5/1 OPTICS THE NARROWEST UPC BAR COULD BE AS LOW AS 2.
        * THEREFORE INVALID COUNTS ARE 0 < BAL COUNT < 2.
        *
        *
        * COUNT      : 0   1   2   3   4   5   6
        *            :---     ---     ---     ---
        * VALUE      :   :   :   :   :   :   :   :
        * BEFORE     : 1 : 3 : 5 : 1 : 6 : 1 : 3 : EOD
        *            :   :---:   :---:   :---:   :---- . . .
        *            :
        *            :---   ---
        * VALUE      :   :   :   :
        * AFTER      : 9 : 13: 3 : EOD
        *            :   :---:   :---- . . .
        *            :
        *            :
        *
0098 B8 3C   FILTER    MOV   R0,#CNTBEG      INIT COUNT PTRS
009A F0                MOV   A,@R0
009B C6 B3             JZ    FILTEX          NO COUNTS
009D B9 3D             MOV   R1,#CNTBEG+1    NEXT COUNT PTR
009F 03 FE             ADD   A,#-2           INVALID COUNT?
0091 F0                MOV   A,@R0
0092 E6 A0             JNC   FIL12           (YES)
0094 F1      FILTLP    MOV   A,@R1           IS NEXT COUNT PTR AT EOD?
0095 C6 B2             JZ    FILTEOD         (YES)
0097 03 FE             ADD   A,#-2           IS NEXT COUNT < MINIMUM COUNT?
0099 F6 AC             JC    FILINAT         (NO)
009B F1                MOV   A,@R1           THEN NEXT COUNT
009C 60                ADD   A,@R0           PLUS FIRST COUNT
009D 19                INC   R1
009E F6 A3             JC    FIL14
00A0 61      FIL12     ADD   A,@R1           PLUS COUNT AFTER NEXT COUNT
00A1 E6 A5             JNC   FIL16
00A3 23 FF   FIL14     MOV   A,#255          (COUNT OVERFLOW - SET TO COUNT LIMIT)
00A5 A0      FIL16     MOV   @R0,A           TO FIRST COUNT
00A6 F1                MOV   A,@R1           IS NEXT COUNT PTR AT EOD?
00A7 C6 B2             JZ    FILTEOD         YES
00A9 19                INC   R1
00AA 04 94             JMP   FILTLP
00AC 18      FILINAT   INC   R0              NOT BAD COUNT - BUMP FIRST COUNT PTR
00AD F1                MOV   A,@R1           MOVE NEXT COUNT
00AE A0                MOV   @R0,A           TO FIRST COUNT
```

```
                                          BUMP NEXT COUNT PTR
                     INC    R1
0UAF 19              JMP    FILLIF
0UB0 04 94  FILIFUD  INC    R0
0UB2 1B     FILIFA   JMP    CNTEND        GOTO END COUNT BUFFER
0UB3 C4 E9  *
            * ADJUST COUNTS R1 4 TIMES.
            * BIGGEST COUNT SHOULD BE LESS THAN 64 BEFORE ADJUSTMENT.
            * MULTIPLY COUNTS BY 4 LIMITING RESULT TO 255.
            * THIS ALLOWS MORE ACCURACY IN BINARY APPROXIMATION ALGORITHMS
            * USED IN 'FINDI' AND 'DELTAT'.
            *
0UB5 B8 3C  ADJUST   MOV    R0,#CNTBFG
0UB7 F0     ADJLP    MOV    A,@R0         GET COUNT
0UB8 C6 C8           JZ     ADJEX         END
0UBA F7              RL     A             TIMES 2
0UBB 12 C2           JB0    ADJ2          VALUE OVERFLOW
0UBD F7              RL     A             TIMES 2
0UBE 12 C2           JB0    ADJ2
0UC0 04 C4           JMP    ADJ4          MULTIPLY OVERFLOW - SET COUNT TO MAX VALUE
0UC2 23 FF  ADJ2     MOV    A,#255        PUT BACK COUNT
0UC4 A0     ADJ4     MOV    @R0,A
0UC5 18              INC    R0
0UC6 04 B7           JMP    ADJLP
0UC8 83     ADJEX    RET
            *
            * COMPARE OF R4 TO R7.
            * RETURN ERROR IF = ELSE OK AND CARRY INDICATES WHICH IS LARGER.
            *
0UC9 F0     R4VSR7   MOV    A,@R0         C4
0UCA AC              MOV    R4,A          R4 = C7
0UCB 37              CPL    A
0UCC 17              INC    A
0UCD 6F              ADD    A,R7
0UCE C6 D2           JZ     R4R7ERR       R4 = R7
            *        RRC    A             SAVE CARRY
            *        MOV    R1,A
            *        RLC    A
            ** MAKE SURE SMALLER COUNT IS IN R4
            ** AND LARGER COUNT IS IN R7
            *        MOV    A,R4
            *        JC     R4R72         R7 IS LARGER
            *        XCH    A,R7          R4 IS LARGER SWAP R4/R7
            *        MOV    R4,A
            *R4R72   RR     A             50%
            *        RR     A             25%
            *        ANL    A,#03
            *        JNZ    R4R74
            *        INC    A             MAKE SURE % IS AT LEAST 1
            *R4R74   ADD    A,R4          SMALLER+%
            *        CPL    A
            *
```

```
                      *       ADD    A,R7              PLUS SMALLER
                      *       JNC    RSR7ERR           LARGER <= SMALLER+3; ERROR
                      *       MOV    A,R1              RESTORE CARRY
                      *       RLC    A
0000                          RETURN
0004                  RSR7ERR RETERR
                              PAGE   256               NEXT PAGE
0005
                      *
0100  B8 27           DECODE  MOV    R0,#FLANPTR       INIT FRAMING LOCUS PTR
0102  B0 3D                   MOV    @R0,#LPTMEG+1     (SKIP QUIET ZONE COUNT)
0104                  DECODLP
                       IF DEBUG
                       ENDIF
0104  D4 05                   CALL   FRAME             FRAME COUNTS, RETURN TYPE INDEX IN R1,
0106                          JERR   DECUFRR           RETURN COUNT POINTER IN R0.
0108  23 20                   MOV    A,#' '
010A  F4 DB                   CALL   FISIN             BLANK F1
010C  B4 B0                   CALL   CLRBACK           CLEAR BACKWARDS SWITCH
010E  B4 F4                   CALL   SETCPTR           INIT CHARACTER BUFFER POINTER
                      * INDEX JUMP TABLE VIA R7 FOR DECODE
0110  23 14                   MOV    A,#.LOW.DECIAD
0112  6F                      ADD    A,R7
0113  B3                      JMPP   @A
0114  18              DECIAD  DB     .LOW.UPCEANL      R7=0 UPC-A, EAN-13
0115  53                      DB     .LOW.EAN8         R7=1 EAN-8
0116  90                      DB     .LOW.UPCED        R7=2 UPC-E BACKWARD
0117  64                      DB     .LOW.UPCEF        R7=3 UPC-E FORWARD
                      *
                      * UPC-A OR EAN-13
0118  54 42           UPCEANL CALL   CHAN6TS           DECODE 6 CHARACTERS - LEFT HALF
011A  54 32                   CALL   CHAN6TS           DECODE 6 CHARACTERS - RIGHT HALF
011C                          JERR   DECUDLP
011E  B8 4F                   MOV    R0,#CHANBEG+6     RIGHT HALF INDICATES DIRECTION OF SCAN
0120  94 AE                   CALL   DIRTST
0122                          JERR   UELB              MIXED DIRECTION - MIGHT BE BACKWARDS
0124  E6 38                   JNC    UELF              FORWARD
0126  B9 34           UELB    MOV    R1,#CHANBEG+11
0128  94 CC                   CALL   SWAP              BACKWARDS - SWAP CHARACTERS END-FOR-END
012A  D4 B0                   CALL   SETBACK           SET BACKWARDS SWITCH
012C  B8 29                   MOV    R0,#CHANBEG
012E  94 C2                   CALL   DIRCOMP           COMPLEMENT DIRECTION BITS AFTER SWAP
0130  B8 2F                   MOV    R0,#CHANBEG+6
0132  94 AE                   CALL   DIRTST
0134                          JERR   DECUFRR           DIRECTION SHOULD BE 'ALL SAME'
0136  F6 8C                   JC     DECUFRR           DIRECTION SHOULD BE 'LEFT'
0138  96 87           UELF    CALL   DIRCHKE           GET EAN-13 F1 CHAR PER DIRECTION PATTERN
013A                          JERR   DECUFRR           SHOULD FIND A F1 OF '0' FOR UPC-A
013C  B8 A3                   MOV    R0,#.LOW.CHMA13   13 DIGIT FIELD CHECK MULTIPLIER TABLE
013E  74 82                   CALL   MODCHK            CHECK MOD CHECK CHARACTER
0140                          JERR   DECUFRR
                      * UPC-A OR EAN-13; IF F1 IS 0 THEN EAN ELSE UPC.
```

```
0144 B8 28             MOV   R0,#CHARP1
0146 F0                MOV   A,@R0
0147 D3 30             XRL   A,#'0'         IS B 0?
0147 96 4F             JNZ   UELEANL        NO - EAN LONG
0149 B0 20             MOV   @R0,#' '       UPC LONG - BLANK F1
014B 23 02             MOV   A,#LONG+UPC
014D 04 84             JMP   DECUT
014F 23 03    UELEANL  MOV   A,#LONG+EAN
0151 24 84             JMP   DECUT
              ;
              ; EAN-8
0153 54 36    EAN8     CALL  CHAR4IS        DECODE 4 CHARACTERS - LEFT HALF
0155 54 36             CALL  CHAR4IS        DECODE 4 CHARACTERS - RIGHT HALF
0157                   JERR  DECUFNR
0159 B8 29             MOV   R0,#CHARREG    BOTH HALVES INDICATE DIRECTION
015B 94 AF             CALL  DIRIS1
015D                   JERR  DECUFNR        DIRECTION SHOULD BE 'ALL SAME'
015F F6 07             JNC   FSF            FORWARD
0161 B9 30             MOV   R1,#CHARREG+7
0163 94 CC             CALL  SWAP           BACKWARDS - SWAP CHARACTERS END-FOR-END
0165 D4 00             CALL  SETBACK        SET BACKWARDS SWITCH
0167 BE A1    FSF      MOV   R6,#.LOW.CHAR8 EAN-8 CHECK MULTIPLIER TABLE
0169 74 B2             CALL  MODCHK         CHECK MOD CHECK CHARACTER
016B 23 01             MOV   A,#EAN+SHORT
016D 24 84             JMP   DECUT
              ;
              ; UPC-E(0,1) FORWARDS
016F 54 32    UPCEF    CALL  CHAR6IS        DECODE 6 CHARACTERS - ZERO SUPPRESSED FORWARDS
0171                   JERR  UEF4
0173 94 07             CALL  DIRCHK7        GET #SYS/CHECK CHARS PER DIRECTION PATTERN
0175                   JNC   UECHK          DIRECTION OK, GOTO DO MOD CHECK
0177 B8 42    UEF4     MOV   R0,#FRAMPTR    MIGHT BE A BACKWARDS SCAN CONFUSED
0179 F0                MOV   A,@R0          BY A '6' AS THE 1ST (LEFT) CHARACTER.
017C 03 02             ADD   A,#4           ADJUST FRAMING POINTER AND
017E A0                MOV   @R0,A
017F D4 0F             CALL  FRAME2         TRY TO FRAME A BACKWARDS UPC SHORT.
0181                   JERR  DECUFNR        NO-GO
0183 34 C8             CALL  UPCUB          DECODE UPC-E BACKWARDS
0185                   JERR  DECUFNR
0187 B8 29             MOV   R0,#CHARREG    IF EVERYTHING ELSE WORKED THEN THE
0189 F0                MOV   A,@R0          LEFT CHARACTER SHOULD BE A FORWARD '6'.
018A D3 36             XRL   A,#'6'
018C 96 8C             JNZ   DECUFNR
018E 24 94             JMP   UECHK
              ;
              ; UPC-E(0,1) BACKWARDS
0190 34 C8    UPCEB    CALL  UPCUB          DECODE UPC-E BACKWARDS
0192                   JERR  DECUFNR
0194 B8 2E    UECHK    MOV   R0,#CHARREG+5  PER 6TH CHAR'S VALUE DO MODIO CHECK
0196 F0                MOV   A,@R0
0197 53 7F             ANL   A,#127         MASK OFF DIRECTION BIT
```

```
525  0198  D4 CD            ADD   A,0-'3'
526  019B  EA AF            JNC   DECV12         DIGIT 6 = 0, 1, OR 2
527  019D  C0 A6            JZ    DEC3           DIGIT 6 = 3
528  019F  07               DEC   A
529  01A0  C6 AA            JZ    DEC4           DIGIT 6 = 4
530  01A2  BE A8            MOV   R6,#.LOW.CHAZ59 CHECK MULTIPLIER TABLE
531  01A4  24 B0            JMP   DECC
532  01A6  BE B7   DEC3     MOV   R6,#.LOW.CHAZ3  CHECK MULTIPLIER TABLE
533  01A8  24 B0            JMP   DECC
534  01AA  BE AC   DEC4     MOV   R6,#.LOW.CHAZ4  CHECK MULTIPLIER TABLE
535  01AC  24 B0            JMP   DECC
536  01AE  BE B4   DECU12   MOV   R6,#.LOW.CHAZ012        CHECK MULTIPLIER TABLE
537  01B0  74 B7   DECC     CALL  MODCHK         CHECK MOD CHECK CHARACTER
538  01B2  23 00            MOV   A,#UPC+SHORT   H2=0 UPC-E FORWARD
539  01B4                   JERR  DECUPLP
541  01B6  F4 00   DECUT    CALL  TIMESIR
542  01B8  F4 00            CALL  DECADD         TRY TO DECODE AN ADDON CODE
543  01BA          DECDON
544                 IF DEBUG
545                 ENDIF
548  01BA                   RETUR
549  01BC          DECERR
550                * SET CHARTYP TO INVALID AND EOL THE 2 DATA BUFFERS
551  01BC  B9 27            MOV   R1,#CHARTYP
552  01BE  B1 2A            MOV   @R1,#'*'       '*' INDICATES BAD SCAN
553  01C0  19               INC   R1
554  01C1  B1 00            MOV   @R1,#EOD       EOD WITH NO DATA FOR MAIN BARCODE
555  01C3  94 0C            CALL  CHADEOD        EOD WITH NO DATA FOR ADDON
556                 IF DEBUG
557                 ENDIF
558  01C5                   RETERN
562                *
563                *
564                *
565  01C6  B4 64   UPCDB    CALL  SETCPTR        INIT CHARACTER BUFFER POINTER
566  01C8  54 32            CALL  CHARNTS        DECODE 6 CHARACTERS - ZERO SUPRESSED BACKWARDS
567  01CC                   JERR  UPCDEA
569  01CE  D4 00            CALL  SETBACK
570  01D0  B9 2E            MOV   R1,#CHARBEG+5
571  01D2  94 CC            CALL  SWAP           BACKWARDS - SWAP CHARACTERS END-FOR-END
572  01D4  B8 29            MOV   R0,#CHARBEG
573  01D6  94 C2            CALL  DIRCMP         COMPLEMENT DIRECTION BITS AFTER SWAP
574  01D8  84 B7            JMP   DIRCHK7        GET #SYS/CHECK CHARS PER DIRECTION PATTERN
575  01DA  83      UPCDEA   RET
577  01DB                   PAGE  256            NEXT PAGE
579                *
580                * TRANSMIT FORMATTED BARCODE TO TERMINAL, SKIP BLANKS,
581                * APPEND ASCII AND 10 HASH CHARACTER, AND WAIT FOR RESPONSE.
582                *
583  0200          SEND
584                 IF DEBUG
585                 ENDIF
```

```
0200  FB 00          MOV   R2,#0          CLEAR HASH TOTAL
0202  B8 27          MOV   R0,#CHARS      SEND DECODED BARCODE
0204  14 9F          CALL  SENDBUF
0206  B8 36          MOV   R0,#CHARADD    SEND DECODED ADDON BARCODE
0208  14 9F          CALL  SENDBUF
020A  FA             MOV   A,R2           SEND ASCII HASH TOTAL
020B  53 0F          ANL   A,#15
020D  43 30          ORL   A,#'0'         ADJUST TO ASCII
020F  B4 5B          CALL  OUTCHAR
0211  B4 35          CALL  OUTLINE
                   * 0.5 SEC TIMEOUT TO RECEIVE RESPONSE
0213  BC 18          MOV   R4,#24         TIME LIMIT FOR RESPONSE TO DATA
0215  14 35  SENDPLP CALL  GETCHAR        IF RECEIVE CHAR
0217  D3 06          XRL   A,#ACK         IS 'GOOD'
0219  C6 30          JZ    SENDOK         THEN EXIT OK
021B  D3 06          XRL   A,#ACK         (RASK ACCUM BACK TO WHAT IT WAS)
021D  D3 15          XRL   A,#NAK         IF 'BAD'
021F  96 27          JNZ   SENDR4
0221                 JUFA  SENDFHR        AND NOT PORTABLE THEN ERROR
0223  94 1A          CALL  DELAY1         ELSE DELAY 10MS THEN RE-SEND DATA
0225  44 00          JMP   SEND
0227         SENDR4  JPORT SENDPLP        DON'T TIMEOUT IN PORTABLE
0229  FD 15          DJNZ  R5,SENDPLP     OUT OF TIME?
022B  EC 15          DJNZ  R4,SENDPLP     OUT OF TIME?
022D         SENDFHR RETERR               EXIT WITH ERROR
0230         SENDOK  RETOK                EXIT WITH NO ERROR
                   *
                   * DECODE THE COUNTS INTO CHARACTERS
                   *
                   *
                   *      :-------- T1 --------->:
                   *      :                      :
                   *      ------------------------------------------------
                   *      :    C1    :    C2    :    C3    :    C4    :
                   *      ------------------------------------------------
                   *                 :                     :
                   *                 :<-------- T2 -------->:
                   *
                   *
0232  54 49  CHAN61S CALL  CHAN           DECODE 6 CHARACTERS
0234  54 49          CALL  CHAN
0236  54 49  CHAN41S CALL  CHAN           DECODE 4 CHARACTERS
0238  54 49          CALL  CHAN
023A  54 49          CALL  CHAN
023C  54 49          CALL  CHAN
023E  F8             MOV   A,R0
023F  03 05          ADD   A,#5           BUMP COUNT PTR 5 COUNTS
0241  A8             MOV   R0,A           TO SKIP CENTER GUARD BARS.
0242  83             RET
                   *
0243  54 47  CHAN31S CALL  CHAN1
```

```
0245  5E 47             CHAD2:8  CALL   CHAR1
0247  1B                CHAR1    INC    R0
0248  18                         INC    R0
0249                    CHAR     JERR   CHARFX
024A  34 48                      CALL   FINDT
024D  C8                         DEC    R0
024E  C8                         DEC    R0
024F                             JERR   CHARERR    INVALID COUNT IN CHARACTER
0251  C8                         DEC    R0
0252  C8                         DEC    R0
0253  94 4A                      CALL   DELTA1
0255                             JERR   CHARER1
0257  FE                         MOV    A,R6
0258  AD                         MOV    R5,A       R5 = 11
0259  94 4A                      CALL   DELTA1
025B                             JERR   CHARERR
025C  FE                         MOV    A,R6       R6 = 12
025D  D3 05                      XRL    A,#5
025F  C6 82                      JZ     C1FU1      T2 = 5
0262  FD                         MOV    A,R5
0263  D3 02                      XRL    A,#2
0265  C6 82                      JZ     C1FU1      T1 = 2
0267  FD                         MOV    A,R5
0268  D3 05                      XRL    A,#5
026A  C6 A5                      JZ     C3FU1      T1 = 5
026C  FE                         MOV    A,R6
026D  D3 02                      XRL    A,#2
026F  C6 A5                      JZ     C3FU1      T2 = 2
0271  FD                         MOV    A,R5
0272  D3 03                      XRL    A,#3
0274  96 99                      JNZ    CHAR2      T1 = 4
0276  C8                         DEC    R0         T1 = 3, COMPARE C1 VS. C2, 12 OR 21, 10 TELL
0277  C8                         DEC    R0         THE RIGHT 1/7'S AND LEFT 2/8'S APART
0278  F0                         MOV    A,@R0      C1
0279  AF                         MOV    R7,A       R7 = C1
027A  18                         INC    R0         C2
027B  14 E9                      CALL   RSVSR7     COMPARE LARGER-256 VS SMALLER
027D  18                         INC    R0         (LEAVE R0 POINTING AT C3)
027E                             JERR   CHARERR
0280  F6 8F                      JC     C2FU1
0282  B9 01             C1EU1    MOV    R1,#1      C1 = 1
0284  FD                         MOV    A,R5
0285  07                         DEC    A
0286  AA                         MOV    R2,A       C2 = 11-C1
0287  37                         CPL    A
0288  17                         INC    A
0289  6E                         ADD    A,R6
028A  AB                         MOV    R3,A       C3 = 12-C2
028B  6D                         ADD    A,R5       C4 = 7-11-C3
028C  44 B1                      JMP    CHAR4
028E  BA 01             C2EU1    MOV    R2,#1      C2 = 1
0290  FD                         MOV    A,R5
```

```
0291  07                  DEC   A
0292  A9                  MOV   R1,A          C1 = 11-C2
0293  F8                  MOV   A,R0
0294  07                  DEC   A
0295  AB                  MOV   R3,A          C3 = 12-C4
0296  6D                  ADD   A,R5          C4 = 7-11-C3
0297  44 B1               JMP   CHAR4
0299  18        CHAR2     INC   R0            T1 = 4, COMPARE C3 VS. C4, 12 OR 21, TO TELL
029A  F8                  MOV   A,R0          THE LEFT 1/2'S AND RIGHT 2/1'S APART
029B  AF                  MOV   R7,A          R7 = C4
029C  C8                  DEC   R0            C3
029D  14 C9               CALL  R4VSR7        COMPARE LARGER-25% VS SMALLER
029F                      JERR  CHARERR       ?SLARGER < SMALLER = ERROR
02A1  BB 02               MOV   R3,#2         C3 = 2 UNLESS
02A3  E6 A7               JNC   C3EQ2         C3 > C4 THEN C3 = 2
02A5  BB 01     C3EQ1     MOV   R3,#1         C3 = 1
02A7  FB        C3EQ2     MOV   A,R3
02A8  37                  CPL   A
02A9  17                  INC   A
02AA  68                  ADD   A,R0
02AB  AA                  MOV   R2,A          C2 = 12-C3
02AC  37                  CPL   A
02AD  17                  INC   A
02AE  6D                  ADD   A,R5
02AF  A9                  MOV   R1,A          C1 = 11-C2
02B0  68                  ADD   A,R0          C4 = 7-C1-T2
02B1  37        CHAR4     CPL   A
02B2  03 07               ADD   A,#7
02B4  AC                  MOV   R4,A          BACK OF 'INC A' ZERO JUSTIFIES MODULE SIZE
02B5  C9                  DEC   R1            ZERO JUSTIFY MODULE SIZE
02B6  CA                  DEC   R2            ZERO JUSTIFY MODULE SIZE
02B7  CB                  DEC   R3            ZERO JUSTIFY MODULE SIZE
                *
                * CREATE TABLE LOOKUP MASK FROM 2-BIT VALUE OF C1, C2, C3, AND C4
                * MASK IS B7-B0  C1C1 C2C2 C3C3 C4C4
                * WHERE CNCN HAS A VALUE OF 0 TO 3 WHICH REPRESENTS A TRUE COUNT WIDTH
                * OF 1-4 MODULES.
                *
02B8  F9                  MOV   A,R1          C1 VALUE OF 0-3
02B9  E7                  RL    A             SHIFT C1 LEFT 2 BITS
02BA  E7                  RL    A
02BB  4A                  ORL   A,R2          C2
02BC  E7                  RL    A
02BD  E7                  RL    A
02BE  4B                  ORL   A,R3          C3
02BF  E7                  RL    A
02C0  E7                  RL    A
02C1  4C                  ORL   A,R4          C4
02C2  AD                  MOV   R5,A          LOOK-UP MASK TO R5
02C3  B8 48               MOV   R0,#LOW.CHRTABF        SEARCH FOR FORWARD CHARACTER
02C5  74 32               CALL  TABSRCH
02C7                      JMP   CHAR6
```

```
02C8  8E 55               MOV   R0,#LOW.CHRTABB       SEARCH FOR BACKWARD CHARACTER
02CA  74 12               CALL  TABSRCH
02CF  43 80               ORL   A,#BACKCHR      TURN ON BACKWARDS BIT IN CHARACTER
02D1  44 D6               JMP   CHAR6
02D3  18        CHARER1   INC   R0
02D4  23 2A     CHARERR   MOV   A,#'*'          BAD CHARACTER VALUE
                  IF DEBUG
                  ENDIF
02D6  AA        CHAR6     MOV   R2,A            SAVE CHARACTER
02D7  B9 23               MOV   R1,#CHARPTR     POINT TO CHARACTER BUFFER PTR
02D9  F1                  MOV   A,@R1           GET PTR
02DA  11                  INC   @R1             BUMP CHARACTER PTR
02DB  A9                  MOV   R1,A
02DC  FA                  MOV   A,R2
02DD  A1                  MOV   @R1,A           STORE CHARACTER
02DE  19                  INC   R1              APPEND NEW END
02DF  B1 00               MOV   @R1,#EOD
                  IF DEBUG
                  ENDIF
02E1  18                  INC   R0
02E2  18                  INC   R0              LEAVE R0 POINTING AT C1 OF NEXT CHARACTER
02E3  83        CHARFX    RET
02F4                      PAGE  256
                *
                *
                * CONVERT 4 CHARACTER COUNTS TO:
                *
                *     R7 = T = C1+C2+C3+C4 = 7 MODULE CHARACTER COUNT
                *     R2 = 2.5T/7 = .35T = 1/4+1/16+T/32+1/64 = 2 MODULE COUNT REFERENCE
                *     R3 = 3.5T/7 = .50T = 1/2 = 3 MODULE COUNT REFERENCE
                *     R4 = 4.5T/7 = .64T = 1/2+1/8+1/64 = 4 MODULE COUNT REFERENCE
                *
0300  BF 00     FINDT     MOV   R7,#0
0302  BE 04               MOV   R6,#4
0304  F0        FINDTLP   MOV   A,@R0           ADD 4 COUNTS TOGETHER TO CREATE T
0305  6F                  ADD   A,R7
0306  F6 2F               JC    FINDERR         ADD OVERFLOW
0308  AF                  MOV   R7,A
0309  18                  INC   R0
030A  EE 04               DJNZ  R6,FINDTLP
030C  97                  CLR   C
030D  67                  RRC   A        T/2
030E  AB                  MOV   R3,A            R3 = T/2
030F  AC                  MOV   R4,A            R4 = T/2
0310  97                  CLR   C
0311  67                  RRC   A        T/4
0312  AA                  MOV   R2,A            R2 = T/4
0313  97                  CLR   C
0314  67                  RRC   A        T/8
0315  A8                  MOV   R0,A
0316  6C                  ADD   A,R4
0317  AC                  MOV   R4,A            R4 = R4 + T/8
```

```
0318  FE                MOV   A,R6
0319  97                CLR   C
031A  67                RRC   A        T/16
031B  AE                MOV   R6,A
031C  6A                ADD   A,R2
031D  AA                MOV   R2,A              R2 = R2 + T/16
031E  FE                MOV   A,R6
031F  97                CLR   C
0320  67                RRC   A        T/32
0321  AE                MOV   R6,A
0322  6A                ADD   A,R2
0323  AA                MOV   R2,A              R2 = R2 + T/32
0324  FE                MOV   A,R6
0325  97                CLR   C
0326  67                RRC   A        T/64
0327  AE                MOV   R6,A
0328  6A                ADD   A,R2
0329  AA                MOV   R2,A              R2 = R2 + T/64
032A  FE                MOV   A,R6
032B  6C                ADD   A,R4
032C  AC                MOV   R4,A              R4 = R4 + T/64
032D                    RETURN
032F         FINDFRM RETERM
             *
             * SEARCH TABLE AT R0 FOR MATCH ON MASK IN R5.
             * EACH TABLE IS 10 1-BYTE SEARCH ARGUMENTS.
             * THE RETURNED VALUE IS THE TABLE INDEX AS AN ASCII '0' TO '9'.
             *
0332  BF 0A  TABSRCH MOV  R7,#10                TABLE LENGTH
0334  FE             MOV  A,R6                  SAVE TABLE ADDR FOR RETURN VALUE CALC
0335  AC             MOV  R4,A
0336  FE     TABSLP2 MOV  A,R0
0337  A3             MOVP A,@A                  GET TABLE MASK
0338  DD             XRL  A,R5                  COMPARE TO BAR CODE CHARACTER MASK
0339  C6 43          JZ   TABSFND
033B  1E             INC  R6                    NOT EQUAL - BUMP TABLE INDEX TO NEXT MASK
033C  EF 36          DJNZ R7,TABSLP2            LOOP THRU N TABLE ENTRIES
033E  23 2A          MOV  A,#'*'
              IF DEBUG
              ENDIF
                     RETERM
0343  FC     TABSFND MOV  A,R4                  SUBTRACT TABLE BEGIN ADDR
0344  37             CPL  A
0345  17             INC  A
0346  6E             ADD  A,R6                  FROM MATCH ADDR
0347  43 30          ORL  A,#'0'                AND MAKE IT ASCII
              IF DEBUG
              ENDIF
0349                 RETURN
             *
             * MASK IS THE COUNT'S WIDTH IN MODULES ZERO NORMALIZED WITH
             * B7,6=C1, B5,4=C2, B4,3=C3, B1,0=C4.
```

```
                    *
                    * TABLE OF LEFT SCANNED CHARACTERS          C1234   1123
034B   90           CHRTABF DB     10010000B        0           3211    532
034C   54                   DB     01010100B        1           2221    443
034D   45                   DB     01000101B        2           2122    334
034E   30                   DB     00110000B        3           1411    552
034F   09                   DB     00001001B        4           1132    245
0350   18                   DB     00011000B        5           1231    354
0351   03                   DB     00000011B        6           1114    225
0352   21                   DB     00100001B        7           1312    443
0353   12                   DB     00010010B        8           1213    334
0354   81                   DB     10000001B        9           3112    423
                    *
                    * TABLE OF RIGHT SCANNED CHARACTERS
0355   06           CHRTABR DB     00000110B        0           1123    235
0356   15                   DB     00010101B        1           1222    344
0357   51                   DB     01010001B        2           2212    433
0358   0C                   DB     00001100B        3           1141    255
0359   60                   DB     01100000B        4           2311    542
035A   24                   DB     00100100B        5           1321    453
035B   C0                   DB     11000000B        6           4111    522
035C   48                   DB     01001000B        7           2131    344
035D   84                   DB     10000100B        8           3121    433
035E   42                   DB     01000010B        9           2113    324
                    *
                    * DIRECTION BIT PATTERN FOR UPC-E
035F   38           DIRTABZ DB     111000B          0
0360   34                   DB     110100B          1
0361   32                   DB     110010B          2
0362   31                   DB     110001B          3
0363   2C                   DB     101100B          4
0364   26                   DB     100110B          5
0365   23                   DB     100011B          6
0366   2A                   DB     101010B          7
0367   29                   DB     101001B          8
0368   25                   DB     100101B          9
                    *
                    * DIRECTION BIT PATTERN FOR EAN
0369   00           DIRTABE DB     000000B          0
036A   0B                   DB     001011B          1
036B   0D                   DB     001101B          2
036C   0E                   DB     001110B          3
036D   13                   DB     010011B          4
036E   19                   DB     011001B          5
036F   1C                   DB     011100B          6
0370   15                   DB     010101B          7
0371   16                   DB     010110B          8
0372   1A                   DB     011010B          9
                    *
                    * DIRECTION BIT PATTERN FOR ADDON-5
0373   18           DIRTAB5 DB     11000B           0
0374   14                   DB     10100B           1
```

```
0375 12                 DB      10010B          2
0376 11                 DB      10001B          3
0377 0C                 DB      01100B          4
0378 06                 DB      00110B          5
0379 03                 DB      00011B          6
037A 0A                 DB      01010B          7
037B 09                 DB      01001B          8
037C 05                 DB      00101B          9
                *
                * CALCULATES UPC MOD 10 CHECK AND COMPARES RESULT WITH DECODED
                * CHECK DIGIT.  WAITING FACTOR IS IN TABLE MOD ON THIS PAGE
                *
                * ON ENTRY:
                * R1 POINTS TO BUFFER AREA CONTAINING, FROM LEFT TO RIGHT, DATA
                * DIGITS, CHECK DIGIT, EOD.
                * R0 POINTS TO A TABLE OF WAITING FACTORS.
                *
                * ON EXIT:
                * IF CHECKS MATCH THEN NO ERROR SET ELSE ERROR SET.
                *
037D  B9 36     MCHKADS MOV     R1,#CHARADD     DO CHECK ON ADDON CODE AREA
037F  AD                MOV     R5,A            CHECK SEED PASSED IN ACCUMALATOR
0380  64 86             JMP     MCHKLP2
0382  B9 28     MODCHK  MOV     R1,#CHARF1
0384  BD 00             MOV     R5,#0           CLEAR CHECK BUCKET
0386  F8        MCHKLP2 MOV     A,R0            GET WAITING FACTOR FOR THIS CHARACTER
0387  A3                MOVP    A,@A
0388  C6 91             JZ      MCHK2           SKIP IF FACTOR IS ZERO
038A  AF                MOV     R7,A            USE FACTOR AS ADD-LOOP COUNTER
038B  FD                MOV     A,R5            GET CHARACTER
038C  61        MCHKLP4 ADD     A,@R1           ACCRUE CHARACTER N TIMES
038D  57                DA      A
038E  EF 8C             DJNZ    R7,MCHKLP4
0390  AD                MOV     R5,A            SAVE CHECK RESULT
0391  F1        MCHK2   MOV     A,@R1
0392  C6 98             JZ      MCHK4           EOD
0394  18                INC     R0              BUMP TABLE PTR
0395  19                INC     R1              BUMP CHARACTER STRING PTR
0396  64 86             JMP     MCHKLP2
0398  FD        MCHK4   MOV     A,R5            CHECK SHOULD BE ZERO
0399  53 0F             ANL     A,#15           MASK OFF ZONE
039B                    DA
039C  C6 A0             JZ      MCHKEX
039E                    ERR
03A0            MCHKEX
                 IF DEBUG
                 ENDIF
03A0  83                RET
                *
                * CHECK MULTIPLIER TABLES ON SAME PAGE AS 'MODCHK'
                *
```

```
03A1  00 03              CHKEN   DB     0,3               ; 0,3,1,3,1,3,1,3,1
03A3  01 03 01 03        CHK813  DB     1,3,1,3,1         ; 1,3,1,3,1,3,1,3,1,3,1,3,1
03A7  01
03A8  03 01 03 01        CHK259  DB     3,1,3,1           ; 3,1,3,1,3,1,3,1
03AC  03 01 03 01        CHK24   DB     3,1,3,1,3,3,0,1   ; 3,1,3,1,3,3,0,1
03B0  03 03 00 01
03B4  03 01 03           CHK2012 DB     3,1,3             ; 3,1,3,3,1,3,1,1
03B7  03 01 03 01        CHK23   DB     3,1,3,1,1,3,0,1   ; 3,1,3,1,1,3,0,1
03BB  01 03 00 01
                         *
03BF  03 09 03 09        CHKAD5  DB     3,9,3,9,3         ADDON-5 CHECK WEIGHTING FACTORS
03C3  03
                         *
                         * THIS ROUTINE DOES THE MOD CHECK ON ADDON-2 CODE
                         * THE BINARY RESULT OF A MOD4 FUNCTION ON THE 2 ADDON-2 DIGITS
                         * SHOULD MATCH THE DIRECTION BIT PATTERN OF THE 2 DIGITS.
                         *
03C4  94 9D              MCHKAD2 CALL   DIRMK2            GET DIRECTION MASK (R5)
                         * CONVERT 2 ASCII BCD DIGITS OF ADDON-2 CODE TO 1-BYTE BINARY
03C6  B9 36                      MOV    R1,#CHKADD
03C8  F1                         MOV    A,@R1             GET 10'S DIGIT
03C9  53 0F                      ANL    A,#15
03CB  F7                         RL     A
03CC  AA                         MOV    R2,A              R2 = 2(10'S DIGIT)
03CD  F7                         RL     A
03CE  F7                         RL     A
03CF  6A                         ADD    A,R2              2(10'S DIGIT) + 8(10'S DIGIT)
03D0  19                         INC    R1
03D1  61                         ADD    A,@R1             10(10'S DIGIT) + 1'S DIGIT
03D2  53 03                      ANL    A,#3              MOD4
03D4  DD                         XRL    A,R5              COMPARE TO DIRECTION BIT PATTERN
03D5  96 D9                      JNZ    MAD2ERR
03D7                             RETURN
03D9                     MAD2ERR RETERR
                         *
                         * SEND DATA IN ROM TABLE POINTED TO BY R1
                         * DATA MUST BE ON SAME PAGE AS THIS ROUTINE
                         *
03DC  F9                 OUTTAB  MOV    A,R1              R1 IS POINTER TO ROM DATA TO SEND
03DD  A3                         MOVP   A,@A              GET CHAR @R1 ON THIS ROM PAGE
03DE  C6 E5                      JZ     OUTAREX           UNTIL END
03E0  B4 5B                      CALL   OUTCHAR           SEND IT
03E2  19                         INC    R1
03E3  64 DC                      JMP    OUTTAB
03E5  83                 OUTAREX RET
                         *
03E6  AC 31 30 00        IDMESG  DB     'L10',END
03EA                             PAGE   256               NEXT PAGE
                         *
                         * UTILITY ROUTINES
                         *
0400  BE CB              BEEP    MOV    R6,#203           BEEP ON/OFF FOR 100MS
```

```
0402  B9 B0     BEEPIT  ORL    P1,#BEEPEN          BEEP ON FOR 100US
0404  BF 12             MOV    R7,#18
0406  EF 06             DJNZ   R7,$
0408  99 7F             ANL    P1,#-1-BEEPER       BEEP OFF FOR 380US
040A  00                NOP
040B  BF 4B             MOV    R7,#75
040D  EF 0D             DJNZ   R7,$
040F  EE 02             DJNZ   R6,BEEPLP           BEEPED FOR 10MS?
0411  83                RET
*
*
*
0412  23 32     DELAY50 MOV    A,#50
0414  84 1C             JMP    DELAY
0416  23 04     DELAY4  MOV    A,#4
0418  84 1C             JMP    DELAY
041A  23 01     DELAY1  MOV    A,#1
041C  AD        DELAY   MOV    R5,A                PASSED COUNT OF 10MS DELAYS
041D  BE 0A     DELP2   MOV    R6,#10              10 TIMES
041F  BF C8     DELP4   MOV    R7,#200             1000US
0421  EF 21             DJNZ   R7,$                EQUALS 10MS
0423  EE 1F             DJNZ   R6,DELP4
0425  ED 1D             DJNZ   R5,DELP2
0427  83                RET
*
* OUTPUT IN ASCII-HEX THE COUNTS IN MEMORY
*
0428  BC 04     DUMPC4  MOV    R4,#4
042A  04 30             JMP    DMPLP2
                DUMPCNTS
042C  B9 3C             MOV    R1,#CNTBEG          COUNT ADDR
042E  BC FF             MOV    R4,#255
0430  BB 08     DMPLP2  MOV    R3,#8               GROUPS PER LINE
0432  BA 04     DMPLP4  MOV    R2,#4               COUNTS PER GROUP
0434  F1        DMPLP6  MOV    A,@R1
0435  94 12             CALL   OUTHEX
0437  C6 48             JZ     DUMPEX              '0' CHAR IS END-OF-COUNTS
0439  19                INC    R1
043A  FC 3E             DJNZ   R4,DUMP6
043C  A4 0A             JMP    OUTSP
043E  EA 34     DUMP6   DJNZ   R2,DMPLP6
0440  94 0A             CALL   OUTSP
0442  EB 32             DJNZ   R3,DMPLP4
0444  94 55             CALL   OUTLINE
0446  04 30             JMP    DMPLP2
0448  A4 55     DUMPEX  JMP    OUTLINE
*
* ADDS COUNTS WHO ARE POINT CALLED 'T'.
* COMPARES THIS RESULT TO THE MODULE REFERENCES CALCULATED BY 'FINDT'.
* THEN RETURNS THE WIDTH OF THE 2 COUNTS AS 2, 3, 4, OR 5 MODULES.
*
044A  BE 02     DECIAT  MOV    R6,#2               INIT 1 VALUE
```

```
0440  F0                    MOV     A,@R0
044D  AF                    MOV     R7,A
044E  18                    INC     R0
044F  F0                    MOV     A,@R0
0450  6F                    ADD     A,R7
0451  F0 86                 JC      DELIERR         T TOO LARGE - FAIL WITH ERROR
0453  37                    CPL     A
0454  17                    INC     A
0455  AF                    MOV     R7,A
0456  6A                    ADD     A,R2
0457  F6 64                 JC      DELION          T <= 2.5T/7 THEREFORE T = 2
0459  18                    INC     R0
045A  FF                    MOV     A,R7
045B  6B                    ADD     A,R3
045C  F6 64                 JC      DELION          T <= 3.5T/7 THEREFORE T = 3
045E  18                    INC     R0
045F  FF                    MOV     A,R7
0460  6C                    ADD     A,R4
0461  F6 64                 JC      DELION          T <= 4.5T/7 THEREFORE T = 4
0463  18                    INC     R0              T >  4.5T/7 THEREFORE T = 5
0464              DELION    RETUR
0466  83          DELIERR   RET
                  *
                  * USE THE DIRECTION PATTERN OF THE 6 CHARACTERS AT R0 TO LOOK-UP
                  * A CHARACTER; FOR EAN-13 IT IS THE F1 CHARACTER, FOR UPC-E IT IS
                  * THE CHECK CHARACTER.
                  *
0467  B8 29       DIRCHK2   MOV     R0,#CHARREG           ADDR
0469  23 06                 MOV     A,#6                  LENGTH
046B  94 A1                 CALL    DIRCHK                GET DIRECTION MASK
046D  BE 5F                 MOV     R6,#.LOW.DIRTAB2             UPC-E
046F  74 32                 CALL    TABSRCH
0471                        JERR    DIRC12                       NOT FOUND - TRY UPC-E(1)
0473  F4 DF                 CALL    CHK2STR               STORE CHECK DIGIT
0475  23 30                 MOV     A,#'0'
0477  F4 DA                 JMP     F1STR                 STORE NUMBER SYSTEM NUMBER IN F1
0479  FD          DIRC12    MOV     A,R5                  COMPLEMENT MASK AND TRY AGAIN
047A  D3 3F                 XRL     A,#63                 LOW 6 BITS ONLY
047C  AD                    MOV     R5,A
047D  BE 5F                 MOV     R6,#.LOW.DIRTAB2
047F  74 32                 CALL    TABSRCH
0481  F4 DF                 CALL    CHK2STR               STORE CHECK DIGIT
0483  23 31                 MOV     A,#'1'
0485  E4 DA                 JMP     F1STR                 STORE NUMBER SYSTEM NUMBER IN F1
                  *
                  *
                  *
0487  B8 29       DIRCHKF   MOV     R0,#CHARREG           ADDR
0489  23 06                 MOV     A,#6                  LENGTH
048B  94 A1                 CALL    DIRCHK                GET DIRECTION MASK
048D  BE 69                 MOV     R6,#.LOW.DIRTABE             EAN-13
048F  74 32                 CALL    TABSRCH
```

```
0491  E4 UN              JMP     FISIR
                  *
                  *
                  *
0493  B8 36      DIRAD5  MOV     R0,#CHARADD        ADDR
0495  2A 05              MOV     A,#5               LENGTH
0497  94 A1              CALL    DIRCHK             GET DIRECTION MASK
0499  AE 73              MOV     R0,#.LOW.DIRTAB5          ADDON-5
049B  64 42              JMP     TABSRCH
                  *
                  * PUT DIRECTION BITS OF N CHARACTERS AT R0 INTO R5 -
                  *
049D  B8 36      DIRAD2  MOV     R0,#CHARADD        ADDR
049F  23 02              MOV     A,#2               LENGTH
04A1             DIRCHK
                  IF DEBUG
                  ENDIF
04A1  AF                 MOV     R7,A               LENGTH PASSED IN ACCUMULATOR
04A2  BD 00              MOV     R5,#0              CLEAR DIR BIT BUCKET
04A4  F0         DCHKLP2 MOV     A,@R0
04A5  53 80              ANL     A,#120             GET CHAR'S DIR BIT
04A7  4D                 ORL     A,R5               .OR. IT WITH PREVIOUS BUCKET VALUE
04A8  F7                 RL      A                  SHIFT BUCKET LEFT 1 BIT
04A9  AD                 MOV     R5,A
04AA  18                 INC     R0
04AB  EF A4              DJNZ    R7,DCHKLP2
04AD  83                 RET
                  *
                  * SCAN DIRECTION BITS OF CHARACTERS FROM @R0 TO EOD.
                  * IF DIRECTION BITS ARE MIXED THEN RETURN ERROR.
                  * IF ALL LEFT THEN NO ERROR, NO CARRY.
                  * IF ALL 'RIGHT' THEN NO ERROR, CARRY.
                  *
04AE             DIRISI
                  IF DEBUG
                  ENDIF
04AE  F0                 MOV     A,@R0
04AF  C6 BD              JZ      DIRERR             EOD - FAIL ERROR
04B1  F7                 RLC     A                  1ST CHARACTER'S DIRECTION BIT TO CARRY
04B2  18         DIRISLP INC     R0
04B3  F0                 MOV     A,@R0              COMPARE DIRECTION BITS OF REST OF CHARACTERS
04B4  C6 C0              JZ      DIRISEX            EOD - FAIL OK
04B6  F2 BA              JB7     DIRIS4
04B8  E6 B2              JNC     DIRISLP            'LEFT' SCANNED - FORWARDS
04BA  A7                 CPL     C                  CAUSE DROP-THRU TO 'DIRERR'
04BB  F6 B2      DIRIS4  JC      DIRISLP            'RIGHT' SCANNED - BACKWARDS
04BD             DIRERR
                  IF DEBUG
                  ENDIF
04BD                     RETERR
04C0             DIRISEX
                  IF DEBUG
```

```
                              ENDIF
                                      RETUR
                              *
                              * COMPLEMENT DIRECTION BITS FROM @R0 TO EOD
                              *
                              DIRCOMP
04C2                          DIRCLP   MOV     A,@R0           GET CHARACTER
04C2    F0                             JZ      DIRCEX          EOD
04C4    C6 CB                          XRL     A,#12H          COMPLEMENT DIRECTION BIT
04C5    B3 80                          MOV     @R0,A           PUT CHARACTER
04C7    A0                             INC     R0
04C8    18                             JMP     DIRCLP
04C9    B4 C2                 DIRCEX   RET
04CB    83
                              *
                              * SWAP BYTES AT R0 END-FOR-END WITH THOSE AT R1
                              *
04CC                          SWAP
                               IF DEBUG
                               ENDIF
04CC    B8 49                          MOV     R0,#CHARBEG
04CE    F9                    SWAPLP   MOV     A,R1
04CF    37                             CPL     A
04D0    17                             INC     A
04D1    68                             ADD     A,R0
04D2    F6 DB                          JC      SWAPEX          EXIT WHEN R1 <= R0
04D4    F0                             MOV     A,@R0           (R0) --> A
04D5    21                             XCH     A,@R1           A <--> (R1)
04D6    A0                             MOV     @R0,A           A --> (R0)
04D7    18                             INC     R0
04D8    C9                             DEC     R1
04D9    84 CE                          JMP     SWAPLP
04DB    83                    SWAPEX   RET
                              *
                              *
                              *
04DC    B9 36                 CHADFUD  MOV     R1,#CHARADD     NULL ADDON CHARACTER BUFFER WITH AN 'EOD'
04DE    B1 00                          MOV     @R1,#EOD
04E0    83                             RET
04E1                                   PAGE    256             NEXT PAGE
                              *
0500    A0                    OUTERR   MOV     R5,A
0501    B4 0A                          CALL    OUTSP
0503    FD                             MOV     A,R5
0504    B4 5B                 OUTCRAS  CALL    OUTCHAR
0506    23 2D                 OUTDASH  MOV     A,#'-'
0508    A4 5B                          JMP     OUTCHAR
                              *
                              *
                              *
050A    23 20                 OUTSP    MOV     A,#SP
050C    A4 5B                          JMP     OUTCHAR
                              *
```

```
                           *
                           *
0500  A4 5A              OUTCLIN CALL   OUTCHAR
0510  A4 55                      JMP    OUTCINF
                           *
                           *
                           *
0512  AD                 OUTHEX  MOV    R5,A             SAVE ACC.
0513  47                         SWAP   A                CONVERT LOW NIBBLE TO ASCII-HEX
0514  53 0F                      ANL    A,#15
0516  03 25                      ADD    A,#.LOW.HEXTAB
0518  A3                         MOVP   A,@A             GET ASCII-HEX FROM TABLE
0519  A4 5B                      CALL   OUTCHAR
051B  FD                         MOV    A,R5             DISPLAY LSB NIBBLE OF ACCUMALATOR
051C  53 0F                      ANL    A,#15
051E  03 25                      ADD    A,#.LOW.HEXTAB
0520  A3                         MOVP   A,@A
0521  A4 5B                      CALL   OUTCHAR
0523  FD                         MOV    A,R5             RESTORE ACC.
0524  83                         RET
0525  30 31 32 33        HEXTAB  DB     '0123456789ABCDEF'      'TABLE ON SAME PAGE AS 'OUTHEX'
0529  34 35 36 37
052D  38 39 41 42
0531  43 44 45 46
0535                     GETCHAR
                           *
                           * IF DISABLE COMMAND RECEIVED
                           * THEN WAIT FOR ENABLE COMMAND AND RETURN NULL CHARACTER
                           * ELSE IF END THEN SEND ID MESSAGE AND RETURN NULL CHARACTER
                           * ELSE RETURN RECEIVED CHARACTER IN ACCUMALATOR
0535  B9 20                      MOV    R1,#INCHAR
0537  27                         CLR    A                CLEAR RECEIVE BUFFER AT SAME TIME
0538  21                         XCH    A,@R1            AS GETTING RECEIVE CHARACTER
0539  D3 13                      XRL    A,#DC3           DISABLE CHAR?
053B  C6 4A                      JZ     GETCLP2          YES
053D  D3 13                      XRL    A,#DC3           (PUT ACCUM BACK THE WAY IT WAS)
053F  D3 05                      XRL    A,#ENQ
0541  C6 46                      JZ     GETCH2
0543  D3 05                      XRL    A,#ENQ           (PUT ACCUM BACK THE WAY IT WAS)
0545  83                         RET                     RETURN - ACCUMALATOR IS RECEIVED CHARACTER
0546  A4 51              GETCH2  CALL   OUTID            SEND ID MESSAGE
0548  27                         CLR    A                THEN RETURN WITH NULL CHARACTER
0549  83                         RET
054A  27                 GETCLP2 CLR    A                (CLEAR RECEIVE BUFFER)
054B  21                         XCH    A,@R1            THEN WAIT FOR ENABLE CHAR
054C  D3 11                      XRL    A,#DC1
054E  96 4A                      JNZ    GETCLP2
0550  83                         RET                     RETURN - ACCUMALATOR IS NULL
0555  23 0D
                           *
0551  B9 E6              OUTID   MOV    R1,#.LOW.IDMESG
0553  74 0C                      CALL   OUTIAD
                         OUTCINF MOV    A,#CR
```

```
0557  B4 5B                    CALL    OUTCHAR
0559  23 0A                    MOV     A,#LF
                     *
                     * ADD START BIT, PARITY BIT, AND STOP BIT TO 7-BIT DATA
                     * CHARACTER IN ACCUMALATION.
                     * SEND AT 1200 BAUD.
                     * BIT TIME IS 833.3US.
                     *
055B                 OUTCHAR
055B  15                       DIS     I               DISABLE RECEIVE INTERRUPTS
                     * DELAY FOR OTHER END TO FINISH SENDING STOP BIT BEFORE WE
                     * SEND A RESPONSE.
055C  BF A7                    MOV     R7,#162
055E  EF 5E                    DJNZ    R7,$
                     * START BIT
0560  8A 40                    ORL     P2,#TAEN        ENABLE DATA TRANSMIT
0562  97                       CLR     C               CLEAR PARITY
0563  9A 7F                    ANL     P2,#-1-TXD      0 BIT
0565  BE 07                    MOV     R6,#7           BIT COUNTER - 7 DATA, 1 PARITY
0567  BF A2                    MOV     R7,#162
0569  EF 69                    DJNZ    R7,$            (9+(162*2)*2.5) = 832.5US
                     * DATA BITS
056B  77             OUTLP     RR      A
056C  F2 72                    JB7     OUT2
056E  9A 7F                    ANL     P2,#-1-TXD      0 BIT
0570  44 74                    JMP     OUT4
0572  8A 80          OUT2      ORL     P2,#TAD         1 BIT
0574  A7                       CPL     C               COMP CARRY EACH TIME A '1' BIT IS SENT
0575  00                       NOP
0576  BF A2          OUT4      MOV     R7,#162
0578  EF 78                    DJNZ    R7,$            (9+(162*2)*2.5) = 832.5US
057A  EE 6B                    DJNZ    R6,OUTLP
                     * PARITY BIT
057C  77                       RR      A               LEAVE ACCUMALATOR THE WAY WE FOUND IT
057D  F6 83                    JC      OUT6
057F  9A 7F                    ANL     P2,#-1-TXD      PARITY BIT IS A '0'
0581  A4 87                    JMP     OUT8
0583  8A 80          OUT6      ORL     P2,#TAD         PARITY BIT IS A '1'
0585  00                       NOP
0586  00                       NOP
0587  BF A6          OUT8      MOV     R7,#166
0589  EF 89                    DJNZ    R7,$
                     * STOP BIT
058B  8A 80                    ORL     P2,#TAD         1 BIT
058D  BF A8                    MOV     R7,#168
058F  EF 8F                    DJNZ    R7,$            ((168*2)*2.5) = 840.0US
0591  9A BF                    ANL     P2,#-1-TXEN     TRANSMIT DISABLE
0593  05                       EN      I               ENABLE RECEIVE INTERRUPT
0594  83                       RET
                     *
                     *
                     *
```

```
0595  F0            SENDHEX MOV   A,@R0            END-OF-DATA?
0596  C6 9D                 JZ    SENDEX           YES
0598  94 17                 CALL  OUTHEX           SEND HEX
059A  18                    INC   R0
059B  A4 95                 JMP   SENDHEX
059D  83            SENDEX  RET
                    *
                    *
                    *
059E  F0            SENDBUF MOV   A,@R0            END-OF-DATA?
059F  C6 AF                 JZ    SENDBEX          YES
05A1  D3 20                 XRL   A,#' '           SKIP BLANKS
05A3  C6 AC                 JZ    SENDB6
05A5  F0                    MOV   A,@R0
05A6  6A                    ADD   A,R2             ACCRUE HASH TOTAL
05A7  57                    DA    A
05A8  AA                    MOV   R2,A
05A9  F0                    MOV   A,@R0
05AA  94 5B                 CALL  OUTCHAR          SEND CHARACTER
05AC  18            SENDB6  INC   R0
05AD  A5 9F                 JMP   SENDBUF
05AF  83            SENDBEX RET
                    *
                    *
                    *
05B0  B9 26         CLRBACK MOV   R1,#BACKSB
05B2  B1 00                 MOV   @R1,#0
05B4  83                    RET
                    *
                    * INTERRUPT OCCURS ON ZERO LEVEL OF START/STOP ASYNC START BIT
                    * THE ASYNC DATA IS DEMODULATED AS START, 7 DATA, EVEN PARITY.
                    * IT PLACES GOOD CHARACTERS IN THE RECEIVE BUFFER OVERWRITING
                    * ANY OLD CHARACTER.
                    *
                    * THE MAIN PROGRAM POLLS RECEIVE BUFFER FOR DATA - NON-NULL CHARACTER.
                    * IF IT IS NECESSARY TO CLEAR (NULL) THE RECEIVE BUFFER, THEN IT MUST
                    * DONE IN ONE INDIVISIBLE INSTRUCTION OR DISABLE INTERRUPTS FOR THE
                    * TIME REQUIRED. THE FORMER IS PREFERRED USING A 'XCH A@' INSTRUCTION
                    * WITH THE ACCUMULATOR NULL.
                    *
05B5  99 7F         INT     ANL   P1,#-1-BEEPER    TURN OFF IN CASE RECEIVE DATA HANGS US UP
05B7  D5                    SEL   RB1              RB1 RESERVED FOR INTERRUPT
05B8  AA                    MOV   R2,A             SAVE ACCUMULATOR
                    * START BIT CENTER (ALLOW FOR INT,JMP CYCLES)
05B9  BF 4D         INTLP   MOV   R7,#77           WAIT FOR CENTER OF START BIT
05BB  EF BB                 DJNZ  R7,$             (12+(7*2)*2.5)=415.0US
05BD  86 C1                 JNI   INTDAT           START BIT
05BF  A4 E9                 JMP   INTERR           IGNORE BAD CHARACTERS
                    * 1ST DATA BIT CENTER
05C1  97            INTDAT  CLR   C                PARITY FLIP-FLOP
05C2  BE 08                 MOV   R6,#8            7 DATA BITS + 1 PARITY
05C4  BF A3                 MOV   R7,#163          WAIT FOR CENTER OF NEXT BIT
```

```
05C8  E8 C6              DJNZ   R7,$          (7+(1*3+2)*4.5)=832.5US
                 * EACH DATA BIT CENTER
05CA  B6 CF      INTDLP  JNT    INTDA10
05CA  43 01              ORL    A,#1          '1' BIT RECEIVED
05CC  A7                 CPL    C             TOGGLE PARITY
05CD  A4 D4              JMP    INTDA14
05CF  53 FE      INTDA10 ANL    A,#-1-1       '0' BIT RECEIVED
05D1  00                 NOP
05D2  00                 NOP
05D3  00                 NOP
05D4  00         INTDA14 NOP
05D5  77                 RR     A             SHIFT BIT AROUND FOR NEXT
05D6  BF A0              MOV    R7,#160       WAIT FOR CENTER OF NEXT BIT
05D8  EF D8              DJNZ   R7,$          (13+(160*2)*2.5)=832.5US
05DA  EE CA              DJNZ   R6,INTDLP
                 * STOP BIT CENTER (15+(160*2)*2.5)=837.5US
05DC  F6 E9              JC     INTERR   PARITY ERROR - EVEN PARITY WILL DROP THRU ON BREAK
05DE  53 7F              ANL    A,#127        MASK OFF PARITY
05E0  AB                 MOV    R3,A          SAVE RECEIVED CHARACTER
05E1  D3 03              XRL    A,#ETX        IF RESET CHARACTER
05E3  C6 E6              JZ     INTRS1        GOTO RESTART PROGRAM
05E5  B9 20              MOV    R1,#INCHAR    ELSE
05E7  FB                 MOV    A,R3
05E8  A1                 MOV    @R1,A         STORE RECEIVED CHARACTER IN RECEIVE BUFFER
05E9  FA         INTERR  MOV    A,R2          RESTORE ACCUMALATOR
05EA  93                 RETR
                 * SET UP STACK FOR 'RETR' SO RETURNS TO ADDRESS ZERO OF PROGRAM
                 * WITH PSW C, AC, F0, AND BS ALL ZERO.
                 * 'RETR' REQUIRED TO ALLOW ANY MORE INTERRUPTS.
05EB  B9 08      INTRS1  MOV    R1,#STACK     POINT TO RETURN STACK
05ED  27                 CLR    A
05EE  A1                 MOV    @R1,A         SET RETURN PC
05EF  19                 INC    R1
05F0  A1                 MOV    @R1,A         SET RETURN PSW, PC
05F1  17                 INC    A             BUMP STACK POINTER
05F2  D7                 MOV    PSW,A         SET STACK POINTER
05F3  93                 RETR                 (SP)<--(SP-1) PC<--((SP)) (PSW4-7)<--((SP))
                 *
05F4  B9 23      SETCPTR MOV    R1,#CHARPTR   INIT CHARACTER DECODE POINTER
05F6  B1 29              MOV    @R1,#CHARDEC
05F8  83                 RET
                 *
                 *
                 *
05F9  B9 23      SETAPTR MOV    R1,#CHARPTR   INIT CHARACTER DECODE POINTER
05FB  B1 36              MOV    @R1,#CHARADD
05FD  83                 RET
05FE                     PAGE   256
                 *
0600  B9 26      SETBACK MOV    R1,#BACKSW
0602  B1 FF              MOV    @R1,#255
0604  83                 RET
```

```
WHILE NOT ERROR
          IF PTR > END-(3+24+5)
          THEN ERROR ELSE
                            \
                             \
                        G(+24+5+24)T
                       /    \
                      /      \
                     /   G(+24)
                    /   /     \
                   /   /       \          THE TREE LOOKS FOR OUTSIDE FRAMING
                  /   /    G(+26)         OF THE COUNTS WORKING TOWARDS THE
                 /   /    /     \         CENTER, IE., CHECK FOR LEFT GUARD,
                /   /    /       \        RIGHT GUARD, AND THEN CENTER GUARD
               /   /    /         \       OF LARGEST BARCODE 1ST. THEN TRY
          G(+10+5+16)T            UPC-A   NEXT LARGEST BARCODE.
               /   \              EAN-13
              /     \
             /   G(+10)
            /   /     \                   NOTE:
           /   /       \                  THE DIRECTION OF A UPC-E CODE
          /   /         \                 IS AMBIGUOUS WHEN THE 1ST (LEFT-
         /   /       G(+10)               MOST) CHARACTER IS A 4 OR 6. BY
        /   /       /      \              FRAMING A FORWARD CODE 1ST IT IS
       /   /       /        \             POSSIBLE ON A DECODE ERROR TO BE
      /   /       /        EAN-8          FRAME CORRECTLY.
     G(+24+2)1
      /    \
     /   G(+28)                           G = GUARD FUNCTION
    /   /     \                                FINDS 3 GUARD BARS @PT.
   /   /       \                               RETURNS PTR TO RIGHT GUARD
  G(+2)         \                              BAR. RETURNS ERROR IF NOT
  /   \        UPC-E                           GUARD BARS.
 /     \       FORWARD
/       \
PTR+1  UPC-E                              T = TEST FOR THAT MANY COUNTS
       BACKWARD                               BETWEEN PTR AND END.

ENDWHILE

               DECISION TREE FOR DETERMINING BARCODE TYPE
```

```
                   *       Q = (1) QUIET ZONE              G = (3) END GUARD BARS
                   *       A = (3) ADDON GUARD BARS        N = (4) NUMERIC DIGIT
                   *       C = (5) CENTER GUARD BARS       D = (2) ADDON DELINEATOR
                   *       Z = (6) ZERO SUPPRESSED CENTER GUARD BARS
                   * (n) = NUMBER OF COUNTS
                   *
                   * UPC-A/EAN-13          QGNNNNNNCNNNNNNGQ
                   * UPC-E FORWARD         QGNNNNNNZQ
                   * UPC-E BACKWARD        QZNNNNNNGQ
                   * EAN-8                 QGNNNNCNNNNGQ
                   * ADDON-2               QANDNQ
                   * ADDON-5               QANDNDNDNDNQ
                   *
                   * THE BARCODE COUNTS ARE SCANNED TO FIND THE 'G' AND 'C' PATTERN.
                   * FROM THIS PATTERN A PARTICULAR BARCODE FORMAT IS ASSUMED.
                   * THE ABOVE DECISION TREE IS USED TO IDENTIFY THE PATTERN.
                   *
0005  A8 25        FRAME    MOV   R0,#EOCPTR      GET EOCPTR FOR END-OF-COUNTS TESTS
0007  F0                    MOV   A,@R0
0008  AA                    MOV   R2,A
0009  A8 22        FRAMLP4  MOV   R0,#FRAMPTR     PTR IS SAVED TO ALLOW FRAMING RE-SEARCHES
000B  F0                    MOV   A,@R0           FROM POSITION OF LAST FRAME
000C  A9                    MOV   R1,A            CURRENT FRAMING PTR TO R1
                   * ENOUGH COUNTS FOR ANY KIND OF BARCODE?
000D  F9           FRAMLP5  MOV   A,R1
000E  37                    CPL   A               DON'T NEED 'INC A' BECAUSE OF R2, 0 VALUES
000F  6A                    ADD   A,R2            ADD FOR ADDR
0010  E6 8C                 JNC   FRAMERR         CHECK FOR MINIMUM COUNTS (SHORTEST
0012  03 0F                 ADD   A,#-(3+24+6)    CODE) LEFT TO SEARCH
0014  E6 8C                 JNC   FRAMERR
                   * FIND LEFT END OF FRAME
0016  D4 91                 CALL  LEFTGND         CHECK LEFT GUARD AND QUIET ZONE
0018                        JERR  FRAMLP6
001A  F9                    MOV   A,R1
001B  A0                    MOV   @R0,A           SAVE LAST FRAMING PTR
001C  03 02                 ADD   A,#2            BUMP FRAMING PTR TO 1ST COUNT
001E  A8                    MOV   R0,A            R0 PTR TO 1ST COUNT
                   * UPC-A OR EAN-13?
001F  03 35                 ADD   A,#24+5+24      BUMP PTR TO RIGHT SIDE OF CODE COUNTS
0021  A9                    MOV   R1,A
0022  03 03                 ADD   A,#3            6N+C+6N+G+Q
0024  37                    CPL   A               ARE THEIR ENOUGH COUNTS FOR THIS CODE TYPE
0025  6A                    ADD   A,R2
0026  E6 38                 JNC   FR4C4           NOT ENOUGH - TRY NEXT SHORTEST CODE
0028  D4 8A                 CALL  RITEGND         LOOK FOR GUARD AND QUIET ZONE ON RIGHT END
002A                        JERR  FR4C4
002C  F8                    MOV   A,R0
002D  03 18                 ADD   A,#24
002F  A9                    MOV   R1,A
0030  D4 7F                 CALL  CNTRGND         CHECK CENTER GUARD PATTERN
0032                        JERR  FR4C4
0034  BF 00                 MOV   R7,#0           UPC-A OR EAN-13
```

```
0030  C4 0A            JMP   FRAMOK
                 * FAN-RC
0030  F8         FR4C4  MOV   A,R0          BUMP PTR TO RIGHT SIDE OF CODE COUNTS
0031  03 25             ADD   A,#16+5+10
0033  A9                MOV   R1,A          4+C+4+4+G+0
0034  03 03             ADD   A,#3          ARE THEIR ENOUGH COUNTS FOR THIS CODE TYPE
0036  37                CPL   A
0037  6A                ADD   A,R2          NOT ENOUGH - TRY NEXT SHORTEST CODE
0040  F6 52             JNC   FRGC7         LOOK FOR GUARD AND QUIET ZONE ON RIGHT END
0042  D4 8A             CALL  RITEGRD
0044                    JERR  FRGO7
0046  F8                MOV   A,R0
0047  03 10             ADD   A,#16
0049  A9                MOV   R1,A
004A  D4 7F             CALL  CNTRGRD       CHECK CENTER GUARD PATTERN
004C                    JERR  FRGO7
004E  BF 01             MOV   R7,#1         FAN-8
0050  C4 0A             JMP   FRAMOK
                 * UPC-E FORWARD?
0052  F8         FRGDZ  MOV   A,R0          BUMP PTR TO RIGHT SIDE OF CODE COUNTS
0053  03 1B             ADD   A,#24+3       THEIR ARE ENOUGH COUNTS BECAUSE OF MIN TEST
0055  A9                MOV   R1,A          LOOK FOR GUARD AND QUIET ZONE ON RIGHT END
0056  D4 8A             CALL  RATEGRD       CHECK ZERO GUARD - RIGHT 3 COUNTS
0058                    JERR  FRAMER4
005A  F8                MOV   A,R0
005B  03 18             ADD   A,#24
005D  A9                MOV   R1,A
005E  D4 7F             CALL  CNTRGRD       CHECK FOR CENTER GUARD PATTERN ON RIGHT
0060                    JERR  FRZ0G
0062  BF 03             MOV   R7,#3         UPC-E FORWARD
0064  C4 0A             JMP   FRAMOK
                 * UPC-E BACKWARD?
0066  D4 6F      FRZ0G  CALL  FRAMB2
0068                    JERR  FRAMER4
006A             FRAMOK RETUR
006C             FRAMERR RETERR
                 *
                 * TRY TO FRAME A BACKWARD UPC-E
                 *
006F  F8         FRAMB2 MOV   A,R0          LOOK FOR ZERO GUARD ON LEFT END OF COUNTS
0070  03 FF             ADD   A,#-2         LEFT 3 COUNTS ALREADY CHECKED
0072  A9                MOV   R1,A          THEIR ARE ENOUGH COUNTS BECAUSE OF MIN TEST
0073  03 05             ADD   A,#5          ADJUST NO BECAUSE OF ZERO GUARDS ON LEFT
0075  A8                MOV   R0,A
0076  D4 7F             CALL  CNTRGRD       CHECK FOR CENTER GUARD PATTERN ON LEFT
0078                    JERR  FRB2EA
007A  BF 02             MOV   R7,#2         UPC-E BACKWARD
007C                    RETUR
007E  83         FRB2EA RET
                 *
                 * TEST FOR 3 SETS OF GUARD BARS
                 *
```

```
0078  D4 98       CNTRGND CALL     GUARD               CHECK GUARD - LEFT 3 COUNTS
0081                      JERR     ZGRDEX
0083  D4 98               CALL     GUARD               CHECK GUARD - MIDDLE 3 COUNTS
0085                      JERR     ZGRDEX
0087  C4 28               JMP      GUARD               CHECK GUARD - RIGHT 3 COUNTS
0089  83          ZGRDEX  RET
                  *
                  * TEST FOR GUARD BARS AND RIGHT QUIET ZONE
                  *
008A  D4 98       RITEGND CALL     GUARD               CHECK GUARD
008C                      JERR     RITGEX
008E  C4 C6               JMP      QUIETR
0090  83          RITGEX  RET
                  *
                  * CHECK FOR GUARD BARS AND LEFT QUIET ZONE
                  *
0091  D4 98       LEFTGND CALL     GUARD               CHECK LEFT GUARD AND QUIET ZONE
0093                      JERR     LEFGEX
0095  C4 8C               JMP      QUIETL              CHECK FOR LEFT QUIET ZONE
0097  83          LEFGEX  RET
                  *
                  * GUARD RETURNS A POINTER TO THE RIGHT BAR OF 3 GUARD BARS
                  * STARTING AT INITIAL VALUE OF POINTER.
                  *
                  * ON ENTRY:
                  * R1 POINTS TO BEGIN OF GUARD BAR TEST LOCATION
                  *
                  * ON EXIT:
                  * R1 = R1+1
                  * IF NOT GUARD BARS THEN ERROR SET.
                  * IF GUARD BARS THEN ERROR NOT SET.
                  *
                  * GUARD BARS = 3 COUNTS WHERE:
                  *       1ST-8 <= 3RD COUNT <= 1ST+8, 2ND COUNT SKIPPED
                  *       IF 8=0 THEN 8 IS MADE TO BE 1. THIS ENSURES THAT
                  *       COMPARISONS OF SMALL (<4) COUNTS ARE MADE WITH A TOLERANCE OF
                  *       AT LEAST +/-1.
                  *
0098  F1          GUARD   MOV      A,@R1               1ST COUNT
0099  77                  RR       A                   /4
009A  53 3F               ANL      A,#03               MASK OFF HIGH 2 BITS
009C  96 9F               JNZ      GARD2               IF 8 OF COUNT=0
009E  17                  INC      A                   THEN MAKE IT 1
009F  AE          GARD2   MOV      R6,A
00A0  61                  ADD      A,@R1
00A1  AD                  MOV      R5,A                1ST COUNT + 8
00A2  FE                  MOV      A,R6
00A3  37                  CPL      A
00A4  17                  INC      A
00A5  61                  ADD      A,@R1
00A6  AE                  MOV      R6,A                1ST COUNT - 8
00A7  19                  INC      R1                  SKIP 2ND COUNT
```

```
06A8  19              INC     R1
06A9  F1              MOV     A,@R1           3RD COUNT
06AA  C9              DEC     R1              (LEAVE R1 POINTING AT MIDDLE GUARD BAR)
06AB  37              CPL     A
06AC  6E              ADD     A,R6
06AD  F6 B9           JC      GARDERR         ERROR - 3RD COUNT < 1ST-8
06AF  19              INC     R1
06B0  F1              MOV     A,@R1
06B1  C9              DEC     R1
06B2  37              CPL     A
06B3  17              INC     A
06B4  6D              ADD     A,R5
06B5  E6 B9           JNC     GARDERR         ERROR - 3RD COUNT > 1ST+8
06B7                  RETUR
06B9          GARDERR RETERR
              *
              * QUIET COMPARES A GUARD COUNT TO THE COUNT WHERE THE QUIET ZONE SHOULD
              * BE THE COMPARISON IS DONE BY ADDING THE 2 GUARD COUNTS NEXT TO THE
              * QUIET ZONE TO TAKE ADVANTAGE OF DELTA DISTANCE. THIS COUNT IS SHIFTED
              * LEFT TO MAKE IT 4 MODULES WIDE. THE QUIET ZONE COUNT SHOULD BE AT LEAS
              * 4.5 TIMES 1 MODULE. IN THIS CASE, WE ARE COMPARING THE QUIET ZONE COUN
              * TO (4 1-MODULE COUNTS)+1.
              *
06BC  C9      QUIETL  DEC     R1
06BD  C9              DEC     R1
06BE  F1              MOV     A,@R1           LEFT QUIET ZONE COUNT
06BF  AF              MOV     R7,A
06C0  19              INC     R1
06C1  F1              MOV     A,@R1           1ST GUARD COUNT
06C2  19              INC     R1
06C3  61              ADD     A,@R1           PLUS 2ND GUARD COUNT
06C4  C4 D3           JMP     QUIETC
06C6  19      QUIETR  INC     R1
06C7  19              INC     R1
06C8  F9              MOV     A,R1            SAVE RIGHT QUIET ZONE ADDR FOR ADDON
06C9  B9 24           MOV     R1,#ADDPTR
06CB  A1              MOV     @R1,A
06CC  A9              MOV     R1,A
06CD  F1              MOV     A,@R1           RIGHT QUIET ZONE COUNT
06CE  AF              MOV     R7,A
06CF  C9              DEC     R1
06D0  F1              MOV     A,@R1           1ST GUARD COUNT
06D1  C9              DEC     R1
06D2  61              ADD     A,@R1           2ND GUARD COUNT
06D3  F6 DE   QUIETC  JC      QUIETER         OVERFLOW ON SUM OF 2 GUARD COUNTS
06D5  F7              RLC     A               2(ACCUMULATOR) = 4*GUARD COUNT
06D6  F6 DE           JC      QUIETER         OVERFLOW
06D8  37              CPL     A
06D9  6F              ADD     A,R7
06DA  E6 DE           JNC     QUIETER         QUIET COUNT < 4*GUARD COUNT
06DC                  RETUR
06DE          QUIETER RETERR
```

```
                     *
                     * QUIETR COMPARES THE DELINEATOR COUNTS AT R1 TO THE COUNT AT R1+5
                     * WHICH IS WHERE THE QUIET ZONE SHOULD BE. THE 2 DELINEATOR COUNTS
                     * ARE SUMMED AND MULTIPLIED BY 2 TO GIVE A 4 MODULE COUNT. THIS COUNT
                     * IS THEN COMPARED TO THE QUIET ZONE COUNT.
                     *
00E1  E1             QUIETR  MOV   A,@R1          1ST DELINEATOR COUNT
00E2  19                     INC   R1
00E3  61                     ADD   A,@R1          PLUS 2ND DELINEATOR COUNT
00E4  F6 F6                  JC    QUAERR         OVERFLOW
00E6  AF                     MOV   R7,A           SAVE SUM
00E7  F9                     MOV   A,R1
00E8  03 05                  ADD   A,#5
00EA  A9                     MOV   R1,A
00EB  FF                     MOV   A,R7
00EC  97                     CLR   C
00ED  F7                     RLC   A              2(SUM)
00EE  F6 F6                  JC    QUAERR
00F0  37                     CPL   A              NEGATE SUM
00F1  61                     ADD   A,@R1          PLUS QUIET ZONE COUNT
00F2  E6 F6                  JNC   QUAERR
00F4                         RETUR
00F6                 QUAERR  RETERR
                     *
                     * PUT EOD INTO COUNT BUFFER AND SAVE EOD ADDR
                     *
00F9  B0 00          CNTEOD  MOV   @R0,#EOD       WRITE END-OF-COUNTS
00FB  B9 25                  MOV   R1,#EODPTR     SAVE EOD ADDR
00FD  F8                     MOV   A,R0
00FE  A1                     MOV   @R1,A
00FF  83                     RET
0700                         PAGE  256            NEXT PAGE
                     *
                     * TRY TO DECODE AN ADDON CODE OF 2 OR 5 CHARACTERS
                     *
0700  B8 26          DECADD  MOV   R0,#BACKSW     FORWARD OR BACKWARDS
                      IF DEBUG
                      ENDIF
0702  F0                     MOV   A,@R0
0703  96 0D                  JNZ   DECBKAD        BACKWARDS
                     * FORWARD SCAN - SETUP POINTERS AND COUNTS FOR RIGHT, FORWARD ADDON
0705  B8 24                  MOV   R0,#ADDPTR     POINT TO LEFT END OF RIGHT, FORWARD ADDON
0707  F0                     MOV   A,@R0          FRAMPTR = RIGHT QUIET ZONE
0708  B8 22                  MOV   R0,#FRAMPTR    EODPTR = EODPTR
070A  A0                     MOV   @R0,A
070B  E4 1C                  JMP   DECDAL2
                     * BACKWARD SCAN - SETUP POINTERS AND COUNTS FOR LEFT, BACKWARDS ADDON
070D  B9 22          DECBKAD MOV   R1,#FRAMPTR    FRAMPTR = BEGINNING OF COUNTS
070F  23 1C                  MOV   A,#CNTBEG
0711  21                     XCH   A,@R1
0712  07                     DEC   A
0713  B8 25                  MOV   R0,#EODPTR     EODPTR = FRAMPTR-1
```

```
0715 A0              MOV     AR0,A
0716 07              DEC     A
0717 A9              MOV     R1,A          POINT R1 AT RIGHT QUIET ZONE OF ADDON
0718 B8 3C           MOV     R0,#CNTOFG    POINT R0 AT LEFT END OF ADDON
071A 94 CE           CALL    SWAPIP        SWAP COUNTS THAT REPRESENT ADDON END-FOR-END
                   * WHICH TYPE OF ADDON IF ANY?
071C B8 22   DECDAD2 MOV     R0,#FRAMPTR   FRAMPTR POINTS TO LEFT QUIET ZONE OF ADDON
071E B9 25           MOV     R1,#EODPTR    EODPTR POINTS TO RIGHT QUIET ZONE OF ADDON
                    IF DEBUG
                    ENDIF
                   * ENOUGH COUNTS FOR ADDON-2?
0720 F0              MOV     A,AR0
0721 03 0E           ADD     A,#14         ADDON-2 IS 14 COUNTS
0723 F6 7A           JC      DECADER       OVERFLOW OF POINTER
0725 37              CPL     A
0726 61              ADD     A,AR1
0727 F6 7A           JNC     DECADER       NOT ENOUGH COUNTS FOR ADDON-2 OR 5
0729 F0              MOV     A,AR0         SETUP POINTER FOR QUIET ZONE TEST
072A 03 08           ADD     A,#8          POINT TO LAST ADDON-2 DELINEATION PAIR
072C A9              MOV     R1,A
072D 94 E1           CALL    QUIETR
072F                 JERR    DECDAD4
                   * TRY DECODING ADDON-2
0731 94 F9   DECAD2  CALL    SETAPIR       INIT ADDON CHARACTER BUFFER POINTER
0733 B9 27           MOV     R1,#FRAMPTR   ADJUST PTR 2 COUNTS LEFT OF 1ST CHAR
0735 F1              MOV     A,AR1
0736 03 02           ADD     A,#2          INC PTR PAST QUIET ZONE AND 1 GUARD
0738 A8              MOV     R0,A          R0 POINTS TO ADDON COUNTS
0739 54 45           CALL    CHAD2IS
073B                 JERR    DECADER
                   * DO ADDON-2 MOD CHECK
073D 74 C4           CALL    MCHKAD2       DO MOD CHECK ON ADDON-2 CODE
073F                 JERR    DECADER       CHECK ERROR
0741 23 04           MOV     A,#ADDON2
0743 E4 76           JMP     DECDAUT
                   * ENOUGH COUNTS FOR ADDON-5?
0745 B9 25   DECDAD4 MOV     R1,#EODPTR
0747 F0              MOV     A,AR0
0748 03 20           ADD     A,#32         ADDON-5 IS 32 COUNTS
074A F6 7A           JC      DECADER       OVERFLOW OF POINTER
074C 37              CPL     A
074D 61              ADD     A,AR1
074E E6 7A           JNC     DECADER       NOT ENOUGH COUNTS FOR ADDON-2
                   * TEST FOR ADDON-5 QUIET ZONE
0750 F0              MOV     A,AR0
0751 03 1A           ADD     A,#26
0753 A9              MOV     R1,A
0754 D4 E1           CALL    QUIETR
0756                 JERR    DECADER
                   * TRY DECODING ADDON-5
0758 94 F9   DECAD5  CALL    SETAPIR       INIT ADDON CHARACTER BUFFER POINTER
075A B9 22           MOV     R1,#FRAMPTR   ADJUST PTR 2 COUNTS LEFT OF 1ST CHAR
```

```
1888  075C  F1              MOV     A,@R1
1889  075D  03 02           ADD     A,#2         INC PTR PAST QUIET ZONE AND 1 GUARD
1890  075F  A8              MOV     R0,A
1891  0760  54 93           CALL    CHAD31S      R0 POINTS TO ADDON COUNTS
1892  0762  54 45           CALL    CHAD21S
1893  0764                  JERR    DECADER      ERROR ON DECODE OF ADDON-5
1895                * DO ADDON-5 MOD CHECK
1896  0766  94 93           CALL    DIPAD5       GET CHECK CHAR FER DIRECTION BITS
1897  0768                  JERR    DECADER      ERROR, TRY DECODING ADDON-2
1899  076A  37              CPL     A            OR
1900  076B  17              INC     A            ADJUST RETURNED CHECK CHARACTER
1901  076C  03 0A           ADD     A,#10        TO MODULOUS 10
1902  076E  B8 BE           MOV     R0,#LOW.CHKAD5 ADDON-5 CHECK MULTIPLIER TABLE
1903  0770  74 7D           CALL    MCHKAD5      AND PASS IT TO THE MODULO CHECK ROUTINE
1904  0772                  JERR    DECATER      CHECK ERROR, TRY ADDON-2
1906  0774  23 08           MOV     A,#ADDON5
1907  0776  F4 06   DECOADT CALL    TIPEOK       TYPE CHARACTER .OK. ADDON TYPE
1908  0778                  RETUR
1911  077A  [illegible] DECADER CALL CHADEUD
1912  077C                  RETERN
1917                *
1918  077E          INIT
1919                * INIT THOSE THINGS NORMALLY HANDLED BY HARDWARE RESET
1920                * INCASE OF WARM RESET CAUSED BY RECEIPT OF AN ETX CHARACTER.
1921  077E  99 00           ANL     P1,#0        ALL PORT BITS TO '0'
1922  0780  9A 00           ANL     P2,#0        ALL PORT BITS TO '0'
1923  0783  B9 20           MOV     R1,#INCHAR   NULL-OUT COMMUNICATION BUFFER
1924  0785  B1 00           MOV     @R1,#NULL
1925  0787  89 65           ORL     P1,#RECHARG+CLOCK+GREEN+RED     BOTH LITES ON
1926                * TRANSMIT DATA TO WAND
1927                * ENABLE WAN AND TRIGGER INPUT BIAS BY OUTPUTTING A '1'
1928                * ENABLE TRANSMIT DATA - RECEIVE DATA ALWAYS ENABLED
1929  0789  8A 80           ORL     P2,#TAD+HAROLI+IRIGH
1930                * 3 LONG BEEPS (IF NOT PORTABLE)
1931  078B                  JPORT   INIT2
1933  078D  94 00           CALL    BEEP         BEEP 100MS
1934  078F  94 12           CALL    DELAY50      WAIT 50MS
1935  0791  94 00           CALL    BEEP
1936  0793  94 12           CALL    DELAY50
1937  0795  94 00           CALL    BEEP
1938  0797  99 BF           ANL     P1,#-1-GREEN   TURN OFF GOOD READ LITE TILL ACK RECEIVED
1939  0799          INIT2
1940                * SEND HELLO TO HOST
1941  079B  23 07   INITLP2 MOV     A,#DEL
1942  079D  B4 5B           CALL    OUTCHAR
1943                * TILL GOOD RESPONSE
1944  079F  BD 1E           MOV     R5,#30       LOOP TIMER - 0.5 SEC
1945  07A1  B4 35   INITLP4 CALL    GETCHAR      GET RECEIVED CHARACTER
1946  07A1  D3 06           XRL     A,#ACK
1947  07A3  C6 AB           JZ      INIT4        EXIT WHEN ACK RECEIVED
1948  07A5  ED 9F           DJNZ    R5,INITLP4
```

```
07A7  EC 9F              DJNZ    R4,INITLP4         RE-SEND 'HELLO'
07A9  E1 99              JMP     INITLP2
07AB            INIT4
07AB  89 40              ORL     P1,#GREEN          TURN ON GOOD READ LITE
07AD  83                 RET
                *
                * IF NOT PORTABLE THEN WAIT FOR TRIGGER SWITCH TO BE RELEASED FOR 100MS.
                * RETURN WHEN TRIGGER SWITCH IS DEPRESSED.
                *
07AE            WAIT
                * WAIT FOR TRIGGER TO BE RELEASED
07AE  BE 0C     WAITLP   MOV     R6,#12             100MS COUNTER
07B0  F4 C8     WAITLP2  CALL    TRIGGER            GET TRIGGER SWITCH
07B2  96 AE              JNZ     WAITLP             TRIGGER SWITCH ON - START 100MS OVER
07B4  EF B0              DJNZ    R7,WAITLP2
07B6  EE B0              DJNZ    R6,WAITLP2
                * WAIT FOR TRIGGER OR DC2 (HANDLE DISABLE CHARACTER)
07B8  99 DF     WAITON   ANL     P1,#-1-RED         IF DISABLE RECEIVED THEN
07BA  94 35              CALL    GETCHAR            WAIT AT 'GETCHAR' WITH READY LITE OFF
07BC  89 20              ORL     P1,#RED            UNTIL ENABLE IS RECEIVED.
07BE  D3 12              XRL     A,#DC2             EXIT IF DC2 RECEIVED
07C0  C6 CA              JZ      WAITRET
07C2  BF 00              MOV     R7,#0              DELAY SO THAT DUTY CYCLE OF LOOP
07C4  EF C4              DJNZ    R7,$               HAS LITE ON MOST OF TIME.
07C6  F4 C8              CALL    TRIGGER            OFF FOR 100MS - WAIT FOR ON
07C8  C6 B8              JZ      WAITON
07CA  83        WAITRET  RET
                *
                * READ TRIGGER SWITCH - RETURN TRUE/FALSE IN ACCUMULATOR
                *
07CB  0A        TRIGGER  IN      A,P2               TRIGGER SWITCH PORT
07CC  37                 CPL     A                  TRIGGER SWITCH IS NEGATIVE LOGIC
07CD  53 20              ANL     A,#TRIGR           MASK OFF ALL BUT TRIGGER SWITCH BIT
07CF  83                 RET
                *
                *
                *
07D0  B9 27     TIPESTR  MOV     R1,#CHARTYP
07D2  43 30              ORL     A,#'0'             MAKE ASCII NUMERIC
07D4  A1                 MOV     @R1,A
07D5  83                 RET
                *
                *
                *
07D6  B9 27     TYPEOR   MOV     R1,#CHARTYP        .OR. TYPE CHARACTER WITH ADDON CODE IN ACCUM
07D8  41                 ORL     A,@R1
07D9  A1                 MOV     @R1,A
07DA  83                 RET
                *
                *
                *
07DB  B9 28     FISIR    MOV     R1,#CHARF1         STORE FAN-13 F1 CHARACTER
```

```
07D0  A1             MOV    @R1,A            ON UPC-E NUMBER SYSTEM NUMBER
07DE  83             RET
                *
                *
                *
07DF  B9 2F     CHK2SIR MOV    R1,#CHARREG+6    STORE UPC-E CHECK DIGIT TO RIGHT
07E1  A1             MOV    @R1,A            OF #DDDDDD.
07E2  19             INC    R1
07E3  B1 0D          MOV    @R1,#END         STORE EOD
07E5  83             RET
                *
                *
                 IF (S-1)/(S*256)
                 ENDIF
                END
07E6            ROXII   EQU    END-BEGIN
07E6            *
                *              SPARKLE/TERMINAL INTERFACE DESCRIPTION
                *
                *
                *        BARCODE          ----------         -----------
                *       : :  : :::       :          :  LINK  :           :
                *       : :  : :::----->: SPARKLE  :<------->: TERMINAL  :
                *       : :  : :::       :          :        :           :
                *                         ----------         -----------
                *
                *SPARKLE        IS THE HAND HELD BARCODE READER.
                *
                *TERMINAL       IS ANY DEVICE WHICH WILL RECEIVE THE DECODED
                *               BARCODE TRANSMITTED BY SPARKLE.
                *
                *LINK           IS THE INTERFACE OVER WHICH DATA FLOWS BETWEEN
                *               SPARKLE AND TERMINAL.  DATA TRANSMITTED BY
                *               SPARKLE TO THE TERMINAL IS CALLED TRANSMIT
                *               DATA (TAD).  DATA TRANSMITTED BY THE TERMINAL TO
                *               SPARKLE IS CALLED RECEIVE DATA (RAD).
                *
                *
                *SPARKLE OPERATION
                *               SPARKLE READS BARCODES PLACED IN FRONT OF IT WHEN THE
                *               TRIGGER SWITCH IS DEPRESSED BY THE OPERATOR.  SPARKLE
                *               WILL THEN TURN OFF THE READY AND ERROR LIGHTS AND FLASH
                *               A BRIGHT, SHORT DURATION LIGHT TO ILLUMINATE AND READ
                *               THE BARCODE IN FRONT OF IT.  THE BARCODE MUST BE IN THE
                *               FIELD OF VIEW OF SPARKLE WHICH IS 2.5".  EACH CONTRASTING
                *               EDGE IN THE FIELD OF VIEW IS STORED AS A COUNT IN SPARKLE'S
                *               MEMORY.  SPARKLE CAN STORE 190 COUNTS.  THE COUNTS ARE
                *               STORED FROM LEFT TO RIGHT AS THE OPERATOR WOULD VIEW THE
                *               BARCODE.  IT IS IMPORTANT TO NOTE THAT ANY EXTRANEOUS EDGES
                *               TO THE LEFT OF THE BARCODE THAT ARE IN SPARKLE'S FIELD OF
                *               VIEW WILL USE UP COUNTS SUBTRACTING FROM THE STORAGE
                *               AVAILABLE FOR THE ACTUAL BARCODE'S COUNTS.
```

```
*
*
*        BARCODE         SPARKLE
*                    ----------------
*
*          :        :                 \
*          :<------:-L LIGHT SOURCE     \
*          :------:--->: SENSOR ARRAY    \
*          :        :                      \
*                    ------------          \
*                                  \         \
*          :        :                \         \
*          :<----->:                   \         \
*           FOCUS                        \         \
*          .0 TO .5"                       ----------
*
*    SPARKLE WILL TRY TO DECODE THE BARCODE.  IF SUCCESSFULL,
*    IT WILL TRANSMIT THE DECODED BARCODE TO THE TERMINAL.  IF
*    SPARKLE IS UNSUCCESSFULL OR THE TERMINAL INDICATES A BAD
*    READ THEN SPARKLE WILL RE-FLASH AND DECODE THE BARCODE
*    UPTO 20 TIMES AT A RATE OF 4 TIMES PER SECOND FOR AS LONG
*    AS THE TRIGGER SWITCH IS DEPRESSED.  AFTER A GOOD READ
*    SPARKLE WILL TURN THE READY LIGHT ON AND EMIT A SHORT BEEP.
*    AFTER AN UNSUCCESSFULL READ SPARKLE WILL TURN ON THE READY
*    AND ERROR LIGHTS - NO BEEP.  AFTER A BARCODE READ ATTEMPT
*    THE TRIGGER SWITCH MUST BE RELEASED FOR 100MS BEFORE SPARKLE
*    WILL INITIATE ANOTHER BARCODE READ CYCLE.
*
*
*LINK ELECTRICAL SPECIFICATION
*        REFER TO THE SCHEMATIC DIAGRAM FOR SPARKLE.  DATA
*        IS RECEIVED/DRIVEN BY A SN75117N OVER A BALANCED
*        2-WIRE SHIELDED, TWISTED WIRE PAIR WITH A 120 OHM
*        TERMINATION RESISTOR.  A LOW LEVEL (START BIT/SPACE)
*        IS 0V.  A HIGH LEVEL (STOP BIT/MARK) IS +5V.
*
*LINK DATA FORMAT
*        START/STOP ASYNC,
*        7 BIT ASCII,
*        EVEN PARITY,
*        1 STOP BIT,
*        1200 BAUD.
*
*
*LINK DATA PROTOCOL
*        SPARKLE SUPPORTS HALF-DUPLEX DATA COMMUNICATION, IE.,
*        IT CANNOT RECEIVE AND TRANSMIT DATA SIMULTANEOUSLY.
*        THEREFORE, THE TERMINAL MUST NOT TRANSMIT TO SPARKLE
*        WHILE SPARKLE IS TRANSMITTING A CHARACTER.  IF IT DOES,
*        THEN THE TWO DATA CHARCTERS WOULD BE WIRE-ORED CAUSING
*        AN ERROR OR MISSED CHARACTER FOR THE TERMINAL AND
```

```
*               SPARKLE.  THE LEADING EDGE OF THE RXD START BIT CAUSES
*               AN INTERRUPT TO SPARKLE WHICH CAUSES SPARKLE TO
*               PROCESS THE RECEIVED CHARACTER.  CHARACTERS WITH PARITY
*               OR FRAMING ERRORS AND CHARACTERS THAT ARE NOT PART OF
*               THE PROTOCOL SET ARE IGNORED.
*
*               THE TERMINAL CAN "LOCK-UP" SPARKLE BY HOLDING RXD LOW.
*               SPARKLE WILL REMAIN DEDICATED TO RXD (IT WILL NOT BE
*               ABLE TO CONTINUE PROCESSING OR RESPOND TO OPERATOR
*               REQUESTS) UNTIL RXD GOES HIGH.  SPARKLE DOES DISABLE
*               THE RXD INTERRUPT WHILE IT IS TRANSMITTING A
*               CHARACTER; BETWEEN CHARACTERS IT IS ENABLED.
*
*               ANY CHARACTER TRANSMITTED BY THE TERMINAL TO SPARKLE
*               WHILE THE INTERRUPT IS DISABLED WILL CAUSE AN INTERRUPT
*               WHEN ITS DATA BIT STREAM GOES LOW AFTER THE INTERRUPT
*               IS ENABLED.  THIS WILL MOST LIKELY BE DEMODULATED AS AN
*               ERROR BY SPARKLE BECAUSE OF THE LOSS OF START BIT EDGE
*               SYNCHRONIZATION.
*
*LINK PROTOCOL CHARACTER SET
*               HEX ASCII USE
*               03  ETX   RESET SPARKLE - FROM TERMINAL
*               05  ENQ   SEND ID - FROM TERMINAL
*               06  ACK   MESSAGE OK - FROM TERMINAL
*               07  BEL   POWER UP MESSAGE - FROM SPARKLE
*               0A  LF    LINE FEED - FROM SPARKLE
*               0D  CR    CARRIAGE RETURN - FROM SPARKLE
*               11  DC1   ENABLE SPARKLE - FROM TERMINAL
*               12  DC2   INITIATE READ CYCLE - FROM TERMINAL
*               13  DC3   DISABLE SPARKLE - FROM TERMINAL
*               15  NAK   MESSAGE NOT OK - FROM TERMINAL
*               30  0     ALPHANUMERIC AND SPECIAL - FROM SPARKLE
*               .   .     .
*               .   .     .
*               .   .     .
*               5A  Z     ALPHANUMERIC AND SPECIAL - FROM SPARKLE
*
*
*         POWER UP
*               WHEN POWERED UP SPARKLE WILL TURN ON THE READY AND ERROR
*               LIGHTS THEN BEEP 3 TIMES.  AFTER THIS, SPARKLE WILL
*               TRANSMIT AN ASCII BEL CHARACTER EVERY 50UMS UNTIL AN
*               ASCII ACK IS RECEIVED.  SPARKLE WILL THEN TURN OFF THE
*               ERROR LIGHT AND BE READY TO READ BARCODES.
*
*         DC1, DC3
*               TRANSMITTING A DC3 TO SPARKLE WILL DISABLE SPARKLE FROM
*               TRANSMITTING DATA OR READING BARCODES UNTIL A DC1 IS
*               RECEIVED.  ANY TIME SPARKLE IS WAITING FOR A DC1 THE READY
*               LIGHT WILL BE OFF; THE ERROR LIGHT MAY BE ON OR OFF
*               DEPENDING ON THE STATUS OF THE LAST BARCODE READ.
```

```
*
*        DC2
*                   WHEN WAITING FOR THE TRIGGER TO BE DEPRESSED, SPARKLE
*                   WILL RESPOND TO RECEIVING A DC2 THE SAME AS THE TRIGGER
*                   BEING DEPRESSED.
*
*        ETX
*                   AN ASCII ETX RECEIVED AT ANY TIME WILL CAUSE SPARKLE TO
*                   RESET THE SAME AS IF POWERED OFF THEN ON.
*
*        ENQ
*                   IF AN ENQ IS RECEIVED, SPARKLE WILL SEND A MESSAGE INDICATING
*                   THE PROGRAM NAME AND VERSION.
*
*LINK BARCODE FORMAT
*                   A DECODED BARCODE IS TRANSMITTED AS A SEQUENCE OF ASCII
*                   CHARACTERS AS FOLLOWS:
*
*
*                   DECODED BARCODE CHARACTER STREAM
*
*                           T B...B H R L
*
*                   WHERE:
*                   T IS THE BARCODE TYPE - 1 ASCII CHARACTER.
*                   B IS THE NUMERIC CONTENT OF THE BARCODE.
*                   H IS AN ASCII MODULUS 10 HASH OF T AND B.
*                   R IS AN ASCII CR.
*                   L IS AN ASCII LF.
*
*                   TYPE (T)                  FORMAT (B...B)
*                   0 = UPC SHORT             NDDDDDC
*                   1 = EAN SHORT             FNDDDDDC
*                   2 = UPC LONG              NDDDDDDDDDDC
*                   3 = EAN LONG              FNDDDDDDDDDDC
*                   4 = UPC SHORT ADDON-2     NDDDDDCAA
*                   5 = EAN SHORT ADDON-2     FNDDDDDCAA
*                   6 = UPC LONG ADDON-2      NDDDDDDDDDDCAA
*                   7 = EAN LONG ADDON-2      FNDDDDDDDDDDCAA
*                   8 = UPC SHORT ADDON-5     NDDDDDCAAAAA
*                   9 = EAN SHORT ADDON-5     FNDDDDDCAAAAA
*                   : = UPC LONG ADDON-5      NDDDDDDDDDDCAAAAA
*                   ; = EAN LONG ADDON-5      FNDDDDDDDDDDCAAAAA
*                   ? = BAD (PORTABLE ONLY)   (NO DATA)
*
*                           WHERE:
*                           N IS THE NUMBER SYSTEM DIGIT
*                           D ARE THE BARCODE DIGITS
*                           C IS THE CHECK DIGIT
*                           F IS THE EAN FLAG 1
*
```

```
*                               A ARE THE ADDON CODE DIGITS
*
*
*
*       BARCODE TRANSMISSION
*               THE DECODED BARCODE DATA STREAM IS TRANSMITTED AS A
*               CONTINUOUS CHARACTER STREAM.  AFTER SPARKLE HAS
*               TRANSMITTED THE BARCODE IT WILL WAIT FOR EITHER AN
*               ASCII ACK OR NAK FROM THE TERMINAL.  IF A VALID ACK
*               IS RECEIVED THEN SPARKLE WILL INDICATE A GOOD READ.
*               IF A NAK OR NO VALID RESPONSE IS RECEIVED WITHIN HALF
*               OF A SECOND THEN SPARKLE WILL CONSIDER THE READ TO BE
*               BAD.  IF SPARKLE IS IN THE PORTABLE MODE (TO STRAPPED
*               LOW), THEN SPARKLE WILL RE-SEND THE DATA ON A NAK AFTER
*               A 10MS DELAY RATHER THAN RE-READ THE BARCODE.
*
*
*        1         2         3         4         5         6         7
*...5....0....5....0....5....0....5....0....5....0....5....0....5....0..
*
*
* FOR                               FOR 2'S COMP VALUE IN ACCUMALATOR
*       CPL     A                   JC = A<=B; JNC A>B
*       INC     A                   FOR 2'S COMP VALUE NOT IN ACCUMALATOR
*       ADD     A,B                 JC = A<B; JNC = A=>B
* OR
*       MOV     A,B-VALUE
*       ADD     A,B
* THEN
*       JC      A<=B
*       JNC     A>B
*
* FOR
*       ADD     A,B-VALUE
* THEN
*       JC      A=>B
*       JNC     A<B
*
*
01E6    END
        CROSS REFERENCE
```

| LABEL | VALUE | REFERENCE | | | |
|---|---|---|---|---|---|
| ACK | 0006 | -172 | 599 | 601 | 1940 |
| ADDON2 | 0004 | -150 | 1866 | | |
| ADDON5 | 0008 | -151 | 1906 | | |
| ADDPTR | 0029 | -172 | 1750 | 1821 | |
| ADJ2 | 00C2 | 365 | 367 | -369 | |
| ADJ6 | 00C6 | 368 | -370 | | |

| | | | | | | | | | |
|---|---|---|---|---|---|---|---|---|---|
| ADJBX | 00C0 | 363 | -373 | | | | | | |
| ADJLP | 0087 | -362 | 372 | | | | | | |
| ADJUST | 0085 | 212 | -361 | | | | | | |
| BACKCHR | 0080 | -153 | 760 | | | | | | |
| BACKSP | 0020 | -174 | 1394 | 1474 | 1815 | | | | |
| BARBIT | 0010 | -119 | 282 | 1929 | | | | | |
| BEEP | 0800 | 220 | -1041 | 1933 | 1935 | 1937 | | | |
| BEEPEN | 0080 | -100 | 1042 | 1045 | 1410 | | | | |
| BEEPLP | 0802 | -1042 | 1049 | | | | | | |
| BEGIN | 0000 | -192 | 2017 | | | | | | |
| BEGIN2 | 0005 | 193 | -197 | | | | | | |
| BEL | 0007 | -132 | 1941 | | | | | | |
| C1EU1 | 0282 | 867 | 870 | -890 | | | | | |
| C2EU1 | 028E | 685 | -700 | | | | | | |
| C3EU1 | 02A5 | 673 | 676 | -710 | | | | | |
| C3EU7 | 02A7 | 717 | -719 | | | | | | |
| CHAD21B | 0245 | -645 | 1661 | 1692 | | | | | |
| CHAD31B | 0243 | -644 | 1691 | | | | | | |
| CHANEUR | 02DC | 555 | -1244 | 1911 | | | | | |
| CHAN | 0249 | 633 | 634 | 635 | 636 | 637 | 638 | -640 | |
| CHAN2 | 0299 | 679 | -709 | | | | | | |
| CHAN4 | 02B1 | 695 | 708 | -729 | | | | | |
| CHAN41B | 0236 | 470 | 477 | -635 | | | | | |
| CHAN6 | 02D6 | 756 | 761 | -766 | | | | | |
| CHAN61B | 0232 | 436 | 439 | 496 | 560 | -633 | | | |
| CHANAUD | 0036 | -182 | 589 | 946 | 1002 | 1155 | 1163 | 1244 | 1466 |
| CHANBEG | 0029 | -179 | 442 | 447 | 450 | 452 | 480 | 485 | 512 |
| | | 522 | 570 | 572 | 1125 | 1146 | 1428 | 1464 | 2007 |
| CHANEN1 | 02D3 | 659 | -762 | | | | | | |
| CHANENR | 02D4 | 654 | 664 | 688 | 715 | -763 | | | |
| CHANEX | 02E3 | 849 | -779 | | | | | | |
| CHANF1 | 0028 | -176 | 465 | 951 | 2001 | | | | |
| CHANI | 0247 | 644 | 645 | -646 | | | | | |
| CHANPIR | 0023 | -171 | 767 | 1461 | 1467 | | | | |
| CHANS | 0037 | -176 | 587 | | | | | | |
| CHANTYP | 0027 | -177 | 551 | 1987 | 1994 | | | | |
| CHBA13 | 03A3 | 460 | -983 | | | | | | |
| CHKAPS | 038F | -992 | 1904 | | | | | | |
| CHKEN | 03A1 | 486 | -982 | | | | | | |
| CHK2012 | 0386 | 530 | -986 | | | | | | |
| CHK23 | 0387 | 532 | -969 | | | | | | |
| CHK24 | 03AC | 534 | -980 | | | | | | |
| CHK259 | 03A6 | 530 | -985 | | | | | | |
| CHK2B1R | 07DF | 1132 | 1140 | -2007 | | | | | |
| CHP1AUB | 0355 | 756 | -689 | | | | | | |
| CHR1ADF | 0346 | 752 | -677 | | | | | | |
| CLOCK | 0001 | -113 | 250 | 256 | 259 | 263 | 265 | 272 | 276 |
| | | 290 | 1925 | | | | | | |
| CLRBACK | 05F0 | 420 | -1394 | | | | | | |
| CNTBEG | 003C | -185 | 253 | 323 | 326 | 361 | 417 | 1072 | 1026 |
| | | 1035 | | | | | | | |
| CNTEND | 0100 | -180 | 291 | | | | | | |

| | | | | | | | | | |
|---|---|---|---|---|---|---|---|---|---|
| CNTRUD | 08F9 | 299 | 352 | -1804 | | | | | |
| CNTRGND | 087E | 1582 | 1801 | 1816 | 1841 | -1852 | | | |
| CN | 0000 | -140 | 1310 | | | | | | |
| DC1 | 0011 | -120 | 1309 | | | | | | |
| DC2 | 0014 | -120 | 1970 | | | | | | |
| DC3 | 0013 | -130 | 1297 | 1299 | | | | | |
| DCHNLP2 | 04A4 | -1170 | 1170 | | | | | | |
| DEBUG | 0000 | -3 | 202 | 213 | 419 | 544 | 556 | 584 | 764 |
| | | 775 | 856 | 867 | 970 | 1160 | 1186 | 1195 | 1206 |
| | | 1220 | 1816 | 1840 | | | | | |
| DECAD2 | 0731 | -1856 | | | | | | | |
| DECADS | 0758 | -1888 | | | | | | | |
| DECADER | 077A | 1845 | 1848 | 1863 | 1867 | 1874 | 1877 | 1884 | 1894 |
| | | 1898 | 1905 | -1911 | | | | | |
| DECHKAD | 0700 | 1819 | -1827 | | | | | | |
| DECDAD2 | 071C | 1825 | -1836 | | | | | | |
| DECDAD4 | 0745 | 1854 | -1871 | | | | | | |
| DECDADR | 0780 | 542 | -1815 | | | | | | |
| DECDADT | 077E | 1869 | -1907 | | | | | | |
| DECDEHR | 01BC | 423 | 455 | 456 | 459 | 463 | 479 | 483 | 508 |
| | | 511 | 515 | 521 | -549 | | | | |
| DECDOK | 01BA | -543 | | | | | | | |
| DECDT | 01D6 | 471 | 473 | 491 | -639 | | | | |
| [illegible] | [illegible] | 215 | -418 | | | | | | |
| DECODLP | 0106 | -418 | 441 | 540 | | | | | |
| DECTAN | 0114 | 429 | -432 | | | | | | |
| DELAY | 081C | 1055 | 1057 | -1059 | | | | | |
| DELAY1 | 081A | 800 | -1058 | | | | | | |
| DELAY6 | 0816 | 234 | -1056 | | | | | | |
| DELAY8 | 0812 | -1054 | 1936 | 1938 | | | | | |
| DELP2 | 0810 | -1060 | 1064 | | | | | | |
| DELP4 | 081F | -1061 | 1063 | | | | | | |
| DELTA1 | 08AA | 857 | 862 | -1094 | | | | | |
| DELTENR | 0466 | 1100 | -1118 | | | | | | |
| DELTDA | 0464 | 1105 | 1109 | 1113 | -1115 | | | | |
| DIRAD4 | 0890 | 1080 | -1163 | | | | | | |
| DIRAD5 | 0893 | -1155 | 1890 | | | | | | |
| DIRC12 | 0879 | 1131 | -1135 | | | | | | |
| DIRCE4 | 04CB | 1216 | -1221 | | | | | | |
| DIRCHN | 04A1 | 1127 | 1148 | 1157 | -1165 | | | | |
| DIRCHNE | 04B7 | 457 | -1146 | | | | | | |
| DIRCHNZ | 0467 | 897 | 574 | -1125 | | | | | |
| DIRCLP | 04C2 | -1215 | 1220 | | | | | | |
| DIRCOMP | 04C4 | 451 | 573 | -1214 | | | | | |
| DIRERR | 04B0 | 1189 | -1198 | | | | | | |
| DIRTANS | 0373 | -925 | 1158 | | | | | | |
| DIRTANE | 0369 | -913 | 1149 | | | | | | |
| DIRTANZ | 035B | -901 | 1128 | 1138 | | | | | |
| DIRIS4 | 04B0 | 1194 | -1197 | | | | | | |
| DIRISEX | 04C0 | 1193 | -1203 | | | | | | |
| DIRISLP | 04B2 | -1191 | 1195 | 1197 | | | | | |

| | | | | | | | | | |
|---|---|---|---|---|---|---|---|---|---|
| DIPISI | 04AE | 443 | 453 | 461 | -1185 | | | | |
| DMPLP2 | 0430 | 1070 | -1074 | 1086 | | | | | |
| DMPLF4 | 0432 | -1075 | 1084 | | | | | | |
| DMPLPM | 0434 | -1076 | 1082 | | | | | | |
| DUMP6 | 043E | 1080 | -1082 | | | | | | |
| DUMPC4 | 0428 | -1069 | | | | | | | |
| DUMPCHTS | 042C | -1071 | | | | | | | |
| DUMPFX | 0448 | 1076 | -1087 | | | | | | |
| EAN | 0001 | -147 | 472 | 490 | | | | | |
| EANA | 0151 | 433 | -470 | | | | | | |
| END | 07F6 | -2016 | 2017 | | | | | | |
| ENO | 0005 | -133 | 1300 | 1302 | | | | | |
| EOD | 0909 | -143 | 554 | 774 | 1034 | 1245 | 1604 | 2016 | |
| EODPTN | 0025 | -173 | 1548 | 1605 | 1631 | 1639 | 1671 | | |
| EXP | 0167 | 484 | -486 | | | | | | |
| EXX | 0001 | -135 | 1441 | | | | | | |
| FIBIR | 07D8 | 425 | 1134 | 1142 | 1151 | -2001 | | | |
| FILT2 | 00A0 | 329 | -330 | | | | | | |
| FILT4 | 00A3 | 337 | -340 | | | | | | |
| FILT6 | 00A5 | 339 | -341 | | | | | | |
| FILTFUD | 0082 | 331 | 343 | -351 | | | | | |
| FILTER | 0088 | 211 | -323 | | | | | | |
| FILTFX | 0083 | 325 | -352 | | | | | | |
| FILTIP | 0094 | -330 | 345 | 350 | | | | | |
| FILTMAT | 00AC | 333 | -346 | | | | | | |
| FINDENR | 032F | 796 | -836 | | | | | | |
| FINDT | 0300 | 650 | -792 | | | | | | |
| FINUTIM | 0309 | -794 | 799 | | | | | | |
| FLASH | 0010 | -109 | 263 | 265 | | | | | |
| FM4C4 | 0638 | 1575 | 1576 | 1584 | -1586 | | | | |
| FMANMZ | 069F | 506 | 1624 | -1636 | | | | | |
| FMANE | 0606 | 421 | -1546 | | | | | | |
| FMANENR | 066C | 1558 | 1560 | -1626 | | | | | |
| FMANLDA | 0609 | -1551 | 1612 | 1624 | | | | | |
| FMANLP6 | 0600 | -1555 | 1564 | | | | | | |
| FMANOK | 066A | 1586 | 1605 | 1620 | -1625 | | | | |
| FMANPTR | 0924 | -170 | 416 | 502 | 1551 | 1623 | 1627 | 1638 | 1657 |
| | | 1687 | | | | | | | |
| FMBZFA | 0676 | 1643 | -1648 | | | | | | |
| FMEBZ | 0652 | 1594 | 1597 | 1603 | -1607 | | | | |
| FMZ6G | 0666 | 1616 | -1624 | | | | | | |
| GARD2 | 069F | 1698 | -1700 | | | | | | |
| GARDFMR | 06A9 | 1714 | 1721 | -1725 | | | | | |
| GETCH2 | 0546 | 1301 | -1304 | | | | | | |
| GETCHAR | 0535 | 598 | -1288 | 1945 | 1966 | | | | |
| GETCIP2 | 054A | 1298 | -1307 | 1310 | | | | | |
| GREEN | 0040 | -107 | 209 | 225 | 236 | 1925 | 1938 | 1952 | |
| GUARD | 0698 | 1652 | 1655 | 1658 | 1663 | 1671 | -1695 | | |
| HEXIAU | 0575 | 1273 | 1278 | -1283 | | | | | |
| IUNBRG | 03E6 | -1034 | 1314 | | | | | | |
| INCHAR | 0020 | -167 | 1294 | 1443 | 1923 | | | | |
| INIT | 077F | 197 | -1916 | | | | | | |

| | | | | | | | | | |
|---|---|---|---|---|---|---|---|---|---|
| INI12 | 0799 | 1942 | -1949 | | | | | | |
| INI14 | 07AC | 1947 | -1951 | | | | | | |
| INI1LP2 | 0799 | -1941 | 1950 | | | | | | |
| INI1LP4 | 079F | -1945 | 1948 | 1949 | | | | | |
| INT | 05B5 | 195 | -1410 | | | | | | |
| INTUA1 | 05C1 | 1410 | -1419 | | | | | | |
| INTUA10 | 05CF | 1424 | -1428 | | | | | | |
| INTUA14 | 05D4 | 1427 | -1432 | | | | | | |
| INTULP | 05C6 | -1424 | 1430 | | | | | | |
| INTERM | 05E9 | 1417 | 1438 | -1440 | | | | | |
| INTLP | 05B9 | -1414 | | | | | | | |
| INTMS1 | 05E8 | 1442 | -1451 | | | | | | |
| LEFLEX | 0697 | 1673 | -1675 | | | | | | |
| LEFIGHD | 0691 | 1562 | -1671 | | | | | | |
| LF | 000A | -141 | 1316 | | | | | | |
| LONG | 0002 | -149 | 470 | 472 | | | | | |
| MAD2FMR | 03D9 | 1014 | -1016 | | | | | | |
| MCHK2 | 0391 | 955 | -962 | | | | | | |
| MCHK4 | 039B | 963 | -967 | | | | | | |
| MCHKAU2 | 03C4 | -1000 | 1065 | | | | | | |
| MCHKAU5 | 0370 | -948 | 1903 | | | | | | |
| MCHKEX | 03A0 | 971 | -975 | | | | | | |
| MCHKLP2 | 0380 | 950 | -953 | 966 | | | | | |
| MCHKLP4 | 038C | -956 | 960 | | | | | | |
| MODCHK | 0382 | 461 | 489 | 537 | -951 | | | | |
| NAK | 0015 | -124 | 602 | | | | | | |
| NULL | 0000 | -137 | 1924 | | | | | | |
| OUT2 | 0572 | 1340 | -1343 | | | | | | |
| OUT4 | 0576 | 1342 | -1346 | | | | | | |
| OUT6 | 0583 | 1351 | -1354 | | | | | | |
| OUT8 | 0587 | 1353 | -1457 | | | | | | |
| OUTAREX | 03E5 | 1026 | -1032 | | | | | | |
| OUTCDAS | 0504 | -1254 | | | | | | | |
| OUTCHAR | 055B | 594 | 1029 | 1254 | 1256 | 1261 | 1265 | 1275 | 1280 |
| [illegible] | | 1317 | -1325 | 1387 | 1942 | | | | |
| OUTCLIB | 0506 | -1265 | | | | | | | |
| OUTDASM | [illegible] | -1255 | | | | | | | |
| OUTERM | 0500 | -1251 | | | | | | | |
| OUTHEX | 0512 | 1077 | -1270 | 1371 | | | | | |
| OUTID | 0551 | 1304 | -1314 | | | | | | |
| OUTLINE | 0565 | 595 | 1085 | 1087 | 1266 | -1316 | | | |
| OUTLP | 056B | -1339 | 1348 | | | | | | |
| OUTSP | 05BA | 1081 | 1083 | 1252 | -1260 | | | | |
| OUTTAB | 03DC | -1026 | 1031 | 1315 | | | | | |
| QUALHK | 06F6 | 1782 | 1790 | 1793 | -1797 | | | | |
| QUIETA | 06E1 | -1779 | 1652 | 1682 | | | | | |
| QUIETC | 06D3 | 1748 | -1759 | | | | | | |
| QUIETER | 06DE | 1759 | 1761 | 1764 | -1766 | | | | |
| QUIETL | 06BC | 1674 | -1738 | | | | | | |
| QUIETM | 06C6 | 1660 | -1747 | | | | | | |
| RAR7EHR | 00D2 | 384 | -406 | | | | | | |
| RAVSK1 | 00C9 | -379 | 685 | 713 | | | | | |

```
RAMBEG     0020     -159   166
RAMEND     0100     -160
ROMLDA     0048     -258   260   261
REXIL      07F0    -2017
READ       0030      210  -240
READ2      0060      279  -281
READ6      0070      285  -293
READEX     0084      292  -296
READLP     005B     -269   293   294
RECHANG    0004     -111   255   272   275   296  1925
RED        0070     -108   209  1925  1967  1969
RITEGND    068A     1570  1595  1610 -1663
RITGFA     0690     1665 -1667
ROMBEG     0000     -156   191
SAMPLE     0006     -110   270   271
SCAN       0007     -201   227   237
SCAN2      0008      205  -207
SCAN4      0010      217  -220
SCANLP2    0011     -210   235
SCHERM2    0029      219   222  -228
SCHERM4    0037      229   233  -236
SEND       0200      220  -583   607
SENDP4     05AC     1381 -1388
SENDREX    05AF     1379 -1390
SENDHUF    059E      586   590 -1376  1389
SENDFHR    0220      605  -612
SENDHEX    0595    -1369  1373
SENDOK     0230      600  -610
SENDR4     0227      603  -606
SENDRLP    0215     -596   609   610   611
SENHEX     0590     1370 -1374
SETAPIR    05F0    -1467  1656  1686
SETHACK    0600      449   487   569 -1674
SETCHAR    05FA      427   565 -1461
SHORT      0000     -148   490   530
SP         0020     -142  1260
STACK      0008     -165  1451
START      0002     -112   255   257   263   266
SWAP       04CC      448   486   571 -1225
SWAPEX     04DA     1233 -1240
SWAPLP     04C6    -1229  1239  1636
TABEFND    0343      654  -662
TABELP2    0328     -649   654
TABSRCH    0334      753   759  -646  1129  1139  1150  1159
THIGGER    07C8      428  1962  1974 -1980
THIGH      0020     -110  1929  1984
THYS       0021     -168   207   230
TAD        0080     -116  1336  1341  1343  1352  1354  1360  1929
TAEH       0040     -117  1332  1363
TYPEOM     07D8     1987 -1994
TYPESTR    07D0      541 -1987
VECU12     01A6      526  -536
```

| | | | | | |
|---|---|---|---|---|---|
| UECJ | 01A0 | 527 | -532 | | |
| UECA | 01AA | 529 | -534 | | |
| UECC | 01A0 | 531 | 533 | 535 | -537 |
| UECHK | 0194 | 500 | 516 | -522 | |
| UEPZ | 0179 | 490 | -502 | | |
| UELM | 0120 | 443 | -447 | | |
| UELEANL | 011F | 460 | -472 | | |
| UELE | 0130 | 440 | -457 | | |
| UPC | 0000 | -140 | 470 | 510 | |
| UPCOFA | 01DA | 560 | -575 | | |
| UPCUH | 01C0 | 509 | 519 | -565 | |
| UPCEANL | 0116 | 432 | -436 | | |
| UPCEB | 0190 | 434 | -519 | | |
| UPCEF | 016F | 435 | -494 | | |
| VECTOR3 | 0003 | -157 | 194 | | |
| VECTOR7 | 0007 | -156 | | | |
| WAIT | 07AE | 200 | -1959 | | |
| WAITLP2 | 07B0 | -1962 | 1964 | 1965 | |
| WAITOF | 07AE | -1961 | 1963 | | |
| WAITON | 07B0 | -1967 | 1975 | | |
| WAITRET | 07CA | 1971 | -1970 | | |
| ZERDEA | 00B9 | 1054 | 1057 | -1059 | |

ASSEMBLER ERRORS = 0

What we claim is:

1. In a portable bar code reader system, (a) a hand-held bar code reader unit having an elongated hand grip portion with a length and cross sectional configuration so as to be grasped with one hand, (b) said hand-held bar code reader unit having window means providing optical transmission between the interior and exterior of the hand-held bar code reader unit, said window means having a bar code sensing region externally thereof for receiving a bar code data carrier having a complete line of bar code information thereon, (c) said hand-held bar code reader unit having optical system means within said hand-held bar code reader unit for directing sufficient light energy toward said bar code sensing region so as to illuminate a complete line of bar code information on a data carrier which is spaced from the hand-held bar code reader unit, and to receive reflected light energy from such a complete line of bar code information and for generating a complete bar code signal in accordance with such complete line of bar code information without requiring any bodily movement of the hand-held bar code reader unit as a whole relative to the bar code data carrier, (d) said hand-held bar code reader unit having actuating means comprising proximity detection means for initiating a bar code reading operation while the hand-held bar code reader unit is manually held spaced from a bar code data carrier in said bar code sensing region, and said hand-held bar code reader unit being supported essentially only by one hand in grasping relation to said elongated hand grip portion without any contact of the hand-held bar code reader unit with the bar code information and without any contact between the hand-held bar code reader unit and the bar code data carrier throughout a bar code reading operation, (e) said optical system means comprising electronically triggerable substantially instant response visible light source means for supplying visible light to the bar code sensing region and said actuating means being non-manual means sensing object proximity, (f) processor means, said actuating means when it remains operated causing said processor means to effect repeated reading operations until a valid complete bar code signal is generated by said optical system means.

2. In a portable bar code reader system according to claim 1, said hand-held bar code reader unit including said electronically triggerable substantially instant response light source means and said optical system means having a weight not greater than about eight ounces.

3. In a portable bar code reader system according to claim 1, said processor means comprising control processor means in the hand-held bar code reader unit controlling said bar code reading operation, said actuating means comprising a proximity sensor for transmitting a proximity signal to said processor means.

4. In a portable bar code reader system, (a) a hand-held bar code reader unit having an elongated hand grip portion with a length and cross sectional configuration so as to be grasped with one hand, (b) said hand-held bar code reader unit having window means providing optical transmission between the interior and exterior of the hand-held bar code reader unit, said window means having a bar code sensing region externally thereof for receiving a bar code data carrier having a complete line of bar code information thereon, (c) said hand-held bar code reader unit having optical system means within said hand-held bar code reader unit for directing sufficient light energy toward said bar code sensing region so as to illuminate a complete line of bar code information on a data carrier which is spaced from the hand-held bar code reader unit, and to receive reflected light energy from such a complete line of bar code information and for generating a complete bar code signal in accordance with such complete line of bar code information without requiring any bodily movement of the hand-held bar code reader unit as a whole relative to the bar code data carrier, (d) said hand-held bar code reader unit having actuating means comprising proximity detection means for initiating a bar code reading operation while the hand-held bar code reader unit is manually held spaced from a bar code data carrier in said bar code sensing region, and said hand-held bar code reader unit being supported essentially only by one hand in grasping relation to said elongated hand grip portion without any contact of the hand-held bar code reader unit with the bar code information and without any contact between the hand-held bar code reader unit and the bar code data carrier throughout a bar code reading operation, (e) said optical system means comprising electronically triggerable substantially instant response visible light source means for supplying visible light to the bar code sensing region and said actuating means being non-manual means sensing object proximity, (f) said actuating means when it remains operated causing repeated electronic triggering of the substantially instant response visible light source means until a valid complete bar code signal is generated by said optical system means.

5. In a portable bar code reader system according to claim 4, said hand-held bar code reader unit including said electronically triggerable substantially instant response light source means and said optical system means having a weight not greater than about eight ounces.

6. In a portable bar code reader system according to claim 4, processor means comprising control processor means in the hand-held bar code reader unit controlling said bar code reading operation, said actuating means comprising a proximity sensor for transmitting a proximity signal to said processor means.

7. In a portable bar code reader system according to claim 4, processor means, said actuating means when it remains operated causing said processor means to effect repeated reading operations until a valid complete bar code signal is generated by said optical system means.

8. In a portable bar code reader system according to claim 4, programmed processor means, said actuating means when it remains operated causing said programmed processor means to effect repeated electronic triggering of the substantially instant response visible light source means until a valid complete bar code signal is generated by said optical system means.

9. In a portable bar code reader system according to claim 4, processor means, data communication means coupled with said processor means for transmitting decoded bar code data, and data terminal means in data communication with the processor means via said data communication means so as to receive decoded bar code data in accordance with a complete bar code signal, said data terminal means being conveniently carried by a user along with said bar code reader unit during bar code reading operation and displaying the decoded bar code data.

10. A portable instant bar code reader system for reading complete lines of bar code information, said reader comprising (a) a hand-held bar code reader unit having window means providing a bar code sensing region in front of said window means, said window means being arranged for receiving reflections of light from a complete line of bar code information in the bar code sensing region, (b) photodetector means positioned within said hand-held bar code reader unit for sensing light rays reflected through said window means, to generate a bar code image signal in accordance with a complete line of bar code information in said bar code sensing region, (c) optical system means within said hand-held bar code reader unit comprising an electronically triggered essentially instant response light source means for illuminating a complete line of bar code information in said bar code sensing region so as to produce the reflected light rays sensed by said photodetector means, (d) said optical system means providing a resolution and depth of focus such that a complete line of bar code information having a substantial curvature can be read by said hand-held bar code reader unit, and proximity detector means for signalling to effect triggering of the light source means, (e) electronic means for effecting a reading operation with respect to a complete line of bar code information, received by said photodetector means, for assessing the validity of the bar code represented thereby, and for automatically repeating a reading operation of the hand-held bar code reader unit in the absence of a valid code reading.

11. A portable instant bar code reader system according to claim 10, said window means providing a bar code sensing region having a width of a least about fifty millimeters.

12. A portable instant bar code reader system according to claim 11, with said optical system means providing a depth of focus of at least ten millimeters in said bar code sensing region.

13. A portable instant bar code reader system according to claim 10, with said optical system means providing a depth of focus of about ten millimeters in said bar code sensing region.

14. A portable instant bar code reader system according to claim 10, with said optical system means providing a resolution such that a complete line of bar code information having a minimum bar/space width of about 0.0075 inch can be read by said hand-held bar code reader unit.

15. A portable instant bar code reader system according to claim 10, with said optical system means providing a depth of focus of at least about three millimeters in said bar code sensing region.

16. A portable instant bar code reader system according to claim 10, with said optical system means having a reading capability for a complete line of bar code information at a distance in front of said window means such that the hand-held bar code reader unit is operative entirely clear of contact with a bar code data carrier and with the bar code information carried thereby.

17. A portable instant bar code reader system according to claim 16, with said optical system means having a reading capability for a complete line of bar code information disposed at a distance in front of said window means of at least about twenty millimeters.

18. A portable instant bar code reader system according to claim 17, with said optical system means having an optimum focal plane at about six millimeters in front of said window means.

19. A portable instant bar code reader system according to claim 10, with microprocessor means coupled with said proximity detector means for controlling electronic triggering of said light source means.

20. A portable instant bar code reader system according to claim 10, with proximity detection means supplying a logical signal for causing electronic triggering of said light source means.

21. A portable instant bar code reader system according to claim 10, with portable data terminal means coupled with said hand-held bar code reader unit.

22. A portable instant bar code reader system according to claim 21, with said portable data terminal means having valid read signalling means coupled with said hand-held bar code reader unit.

23. A portable instant bar code reader system according to claim 10, with said optical system means having an optical axis extending through said window means and having effective marginal rays extending from said window means to the bar code sensing region and diverging at angles of at least about plus and minus fifteen degrees to the optical axis.

24. A portable instant bar code reader system according to claim 23, with portable auxiliary means comprising battery means supplying operating power to said hand-held bar code reader unit.

25. A portable instant bar code reader system according to claim 24, with said hand-held bar code reader unit having a weight exclusive of said auxiliary means not substantially greater than eight ounces.

26. A portable instant bar code reader system according to claim 10, with said electronically triggered essentially instant response light source means having a substantial light output in the visible light spectrum.

27. A portable bar code reader system comprising (a) a hand-held reader unit having window means for transmitting light between the interior and exterior thereof, and having a bar code sensing region external to the window means, (b) a triggerable instant response visible light illuminating means for directing visible light energy through the window means to the bar code sensing region, and for developing a reflected light signal in accordance with visible light energy from the illuminating means which is reflected from a bar code in said bar code sensing region, and (c) system means comprising a proximity detector for triggering a reading of a complete line of bar code information in said bar code sensing region with the assistance of visible light energy from the illuminating means, and being operative to effect such reading of a complete line of bar code information without requiring any movement of the hand-held reader unit as a whole relative to a bar code data carrier carrying said complete line of bar code information, during a reading operation, (d) said system means being operative for initiating a bar code reading operation, for assessing the validity of a bar code as read, and for automatically repeating the bar code reading operation in the absence of a valid bar code signal, but terminating the bar code reading operation in response to a valid bar code signal.

28. A portable bar code reader system according to claim 27, with said system means being capable of responding to visible light energy from the illuminating means for reading a bar code with a depth of field of at least about ten millimeters.

29. A portable bar code reader system according to claim 27, with said system means being capable of reading a complete line of bar code information with substantial curvature.

30. A portable bar code reader system according to claim 27, with said system means being capable of reading a complete line of bar code information with a curvature corresponding to a bar code carrier radius approaching 1.25 inches.

31. A portable bar code reader system according to claim 30, with said system means having an optical axis extending through the window means and having marginal rays diverging from the optical axis by at least about plus and minus fifteen degrees to define a relatively wide bar code sensing region in which complete lines of bar code information of substantial curvature can be read.

32. A portable bar code reader system according to claim 31, with said system means reading bar codes of substantial curvature with minimum bar/space width of about 0.0075 inch over a depth of field of at least about three millimeters.

33. A portable bar code reader system according to claim 27, with said system means reading bar codes with minimum bar/space width of about 0.0075 inch over a depth of field of at least about three millimeters.

34. A portable bar code reader system according to claim 27, with said system means being capable of responding to visible light energy from the illuminating means for reading a bar code with a depth of field of at least about three millimeters, and reading a complete line of bar code information having a length of at least about fifty millimeters over a depth of field of at least about three millimeters.

35. A portable bar code reader system according to claim 27, with said system means being capable of responding to visible light energy from the illuminating means for reading a bar code with a depth of field of at least about ten millimeters, and reading bar codes with minimum bar/space width of about 0.0075 inch over a depth of field of about ten millimeters.

36. A portable bar code reader system according to claim 27, with said hand-held reader unit having a reading capability for bar code information having a minimum bar or space size of about 0.0075 inch over a substantial range of distances of a bar code data carrier from the hand-held reader unit.

37. A portable bar code reader system according to claim 27, with said illuminating means supplying pulses of visible light energy to said bar code sensing region.

38. A portable bar code reader system according to claim 37, with said proximity detector signalling for the pulsing of the visible light illuminating means, and computer processor means for assessing the validity of a bar code signal in accordance with bar code information read by the system means and for automatically disabling pulsing of the illuminating means in the event of a valid reading.

39. A portable bar code reader system according to claim 27, with said system means having a reading capability for a complete line of bar code information spaced from the window means by a distance of at least about twenty-five millimeters.

40. A portable bar code reader system according to claim 27, with said illuminating means supplying light pulses containing substantial light energy within the visible spectrum for developing reflected light signals until a valid bar code reading is detected.

41. A portable bar code reader system according to claim 27, with means for filtering out a long wavelength non-visible region of the spectrum of light energy from the sensing region.

42. A portable bar code reader system comprising (a) a hand-held reader unit having window means for transmitting light between the interior and exterior thereof, and having a bar code sensing region external to the window means, (b) a triggerable instant response visible light illuminating means for directing visible light energy through the window means to the bar code sensing region, and for developing a reflected light signal in accordance with visible light energy from the illuminating means which is reflected from a bar code in said bar code sensing region, and (c) system means comprising a proximity detector for triggering a reading of a complete line of bar code information in said bar code sensing region with the assistance of visible light energy from the illuminating means, and being operative to effect such reading of a complete line of bar code information without requiring any movement of the hand-held reader unit as a whole relative to a bar code data carrier carrying said complete line of bar code information, during a reading operation, (d) said illuminating means supplying pulses of visible light energy to said bar code sensing region, (e) said proximity detector signalling for the pulsing of the visible light illuminating means, and (f) computer processor means for assessing the validity of a bar code signal in accordance with bar code information read by the system means and for automatically disabling pulsing of the illuminating means in the event of a valid reading.

43. In a portable bar code reader system, (a) a hand-held bar code reader unit having a hand grip portion of configuration so as to be grasped with one hand, (b) said hand-held bar code reader unit having window means providing optical transmission between the interior and exterior of the hand-held bar code reader unit, said window means having a bar code sensing region externally thereof for receiving a bar code data carrier having a complete line of bar code information thereon, (c) said hand-held bar code reader unti having optical system means within said hand-held bar code reader unit for directing light energy toward said bar code sensing region to illuminate a complete line of bar code information on a data carrier, for receiving reflected light energy from such a complete line of bar code information and for generating a complete bar code signal in accordance with such complete line of bar code information without requiring any bodily scanning movement of the hand-held bar code reader unit relative to the bar code data carrier, (d) said hand-held bar code reader unit having actuating means comprising proximity detection means for initiating a bar code reading operation while the hand-held bar code reader unit is manually held in operative relation to a bar code data carrier in said bar code sensing region, (e) said optical system means comprising triggerable current pulse driven visible light source means essentially instantaneously responsive to an abrupt current pulse for supplying visible light to the bar code sensing region and being constructed such that light from the light source means impinging on a complete line of bar code information in the bar code sensing region during a bar code reading operation is reflected to the eye of the user manually holding the bar code reader unit in spaced relation to the bar code data carrier, and such that the illumination of the complete line of bar code information by the triggerable current pulse driven visible light source means is directly observable by the user during a bar code reading operation.

(f) said actuating means when it remains operated causing repeated triggering of the current pulse driven visible light source means until a valid complete bar code signal is generated by said optical system means.

44. In a portable bar code reader system according to claim 43, said hand-held bar code reader unit having a weight not greater than about eight ounces.

45. In a portable bar code reader system according to claim 43, said proximity detection means supplying a logical proximity signal for initiating bar code reading operation.

46. In a portable reader system, (a) a hand-held reader unit having an elongated hand grip portion with a length and cross sectional configuration so as to be grasped with one hand, (b) said hand-held reader unit having window means providing optical transmission between the interior and exterior of the hand-held reader unit, said window means having a sensing region externally thereof for receiving a data carrier having a complete line of information thereon, (c) said hand-held reader unit having optical system means within said hand-held reader unit for directing sufficient light energy toward said sensing region so as to illuminate a complete line of information on a data carrier which is spaced from the hand-held reader unit, and to receive reflected light energy from such a complete line of information and for generating a complete information signal in accordance with such complete line of information without requiring any bodily movement of the hand-held reader unit as a whole relative to the data carrier, (d) said hand-held reader unit having actuating means for initiating a reading operation while the hand-held reader unit is manually held spaced from a data carrier in said sensing region, and said hand-held reader unit being supported essentially only by one hand in grasping relation to said elongated hand grip portion without any contact of the hand-held reader unit with the information and without any contact between the hand-held reader unit and the data carrier throughout a reading operation, (e) said optical system means comprising electronically energized substantially instant response visible light source means for supplying visible light to the sensing region, (f) processor means, said actuating means when it remains operated causing said processor means to effect repeated reading operations until a valid complete information signal is generated by said optical system means, and (g) said visible light source means being deenergized between said repeated reading operations so that the visible light source means is energized substantially only as needed to effect successive actual readings of the complete line of information.

47. In a portable reader system according to claim 46, said hand-held reader unit including said electronically triggerable substantially instant response light source means and said optical system means having a weight not greater than about eight ounces.

48. In a portable reader system according to claim 47, said processor means comprising control processor means in the hand-held reader unit controlling successive triggering of the light source means in successive reading operations as needed for reading a given complete line of information.

49. In a portable reader system, (a) a hand-held reader unit having an elongated hand grip portion with a length and cross sectional configuration so as to be grasped with one hand, (b) said hand-held reader unit having window means providing optical transmission between the interior and exterior of the hand-held reader unit, said window means having a sensing region externally thereof for receiving a data carrier having a complete line of information thereon, (c) said hand-held reader unit having optical system means within said hand-held reader unit for directing light energy toward said sensing region and for illuminating a complete line of information on a data carrier which is spaced from the hand-held reader unit, and to receive reflected light energy from such a complete line of information and for generating a complete information signal in accordance with such complete line of information without requiring any bodily movement of the hand-held reader unit as a whole relative to the data carrier, (d) said hand-held reader unit having actuating means for initiating a reading operation while the hand-held reader unit is manually held spaced from a data carrier in said sensing region, and said hand-held reader unit being supported essentially only by one hand in grasping relation to said elongated hand grip portion without any contact of the hand-held reader unit with the information and without any contact between the hand-held reader unit and the data carrier throughout a reading operation, (e) said optical system means comprising electronically energized substantially instant response visible light source means for supplying visible light to the sensing region, (f) said actuating means when it remains operated causing repeated electronic energization of the substantially instant response visible light source means until a valid complete information signal is generated by said optical system means.

50. In a portable reader system according to claim 49, said hand-held reader unit including said electronically triggerable substantially instant response light source means and said optical system means having a weight not greater than about eight ounces.

51. In a portable reader system according to claim 49, processor means comprising control microprocessor means in the hand-held reader unit effecting successive triggering of said visible light source means in successive reading operations as needed for reading a given complete line of information.

52. In a portable reader system according to claim 49, processor means, said actuating means when it remains operated causing said processor means to effect repeated reading operations until a valid complete signal is generated by said optical system means.

53. In a portable reader system according to claim 49, processor means, data communication means coupled with said processor means for transmitting decoded data, and data terminal means in data communication with the processor means via said data communication means so as to receive decoded data in accordance with a complete signal, said data terminal means being conveniently carried by a user along with said reader unit during reading operation and displaying the decoded data.

54. A portable reader system for reading complete lines of information, said reader comprising (a) a hand-held reader unit having window means providing a sensing region in front of said window means, said window means being arranged for receiving reflections of light from a complete line of information in the sensing region, (b) photodetector means positioned within said hand-held reader unit for sensing light rays reflected through said window means, to generate an image signal in accordance with a complete line of information in said sensing region, (c) optical system means within said hand-held reader unit comprising an electronically energized essentially instant response light source means for illuminating a complete line of information in said sensing region so as to produce the reflected light rays sensed by said photodetector means, (d) said optical system means providing a resolution and depth of focus such that a complete line of information having a substantial curvature can be read by said hand-held reader unit, and actuating means for signalling to effect energization of the light source means, (e) electronic means for effecting a reading operation with respect to a complete line of information, received by said photodetector means, for assessing the validity of the information as received, and for automatically effecting repeated reading cycles of the hand-held reader unit in the absence of a valid reading, (f) said hand-held reader unit being operated from portable battery power, said repeated reading cycles each comprising an active reading interval when an actual reading is being effected and a non-reading interval when no actual reading is taking place, and said light source means being in a relatively low power consuming condition during the non-reading intervals in comparison to a relatively high power consuming condition of the light source means during the repeated active reading intervals.

55. A portable reader system according to claim 54, said window means providing a sensing region having a width of a least about fifty millimeters.

56. A portable reader system according to claim 55, with said optical system means providing a depth of focus of at least ten millimeters in said sensing region.

57. A portable reader system according to claim 54, with said optical system means providing a depth of focus of about ten millimeters in said sensing region.

58. A portable reader system according to claim 54, with said optical system means providing a resolution such that a complete line of information having a minimum bar/space width of about 0.0075 inch can be read by said hand-held reader unit.

59. A portable reader system according to claim 54, with said optical system means providing a depth of focus of at least about three millimeters in said sensing region.

60. A portable reader system according to claim 50, with said optical system means having a reading capability for a complete line of information at a distance in front of said window means such that the hand-held reader unit is operative entirely clear of contact with a data carrier and with the information carried thereby.

61. A portable reader system according to claim 60, with said optical system means having a reading capability for a complete line of information disposed at a distance in front of said window means of at least about twenty millimeters.

62. A portable reader system according to claim 61, with said optical system means having an optimum focal plane at about six millimeters in front of said window means.

63. A portable reader system according to claim 54, with microprocessor means coupled with said actuating means for controlling electronic triggering of said light source means.

64. A portable reader system according to claim 54, with said actuating means supplying a logical signal for causing electronic triggering of said light source means.

65. A portable reader system according to claim 54, with portable data terminal means coupled with said hand-held reader unit.

66. A portable reader system according to claim 65, with said portable data terminal means having valid read signalling means coupled with said hand-held reader unit.

67. A portable reader system according to claim 54, with said optical system means having an optical axis extending through said window means and having effective marginal rays extending from said window means to the sensing region and diverging at angles of at least about plus and minus fifteen degrees to the optical axis.

68. A portable reader system according to claim 67, with portable auxiliary means comprising battery means supplying operating battery power to said hand-held reader unit.

69. A portable reader system according to claim 68, with said hand-held reader unit having a weight exclusive of said auxiliary means not substantially greater than eight ounces.

70. A portable reader system according to claim 54, with said electronically triggered essentially instant response light source means having a substantial light output in the visible light spectrum.

71. A portable reader system comprising (a) a hand-held reader unit having window means for transmitting light between the interior and exterior thereof, and having a sensing region external to the window means, (b) an instant response visible light illuminating means for directing visible light energy through the window means to the sensing region, and for developing a reflected light signal in accordance with visible light energy from the illuminating means which is reflected from information in said sensing region, and (c) system means for triggering a reading of a complete line of information in said sensing region with the assistance of visible light energy from the illuminating means, and being operative to effect such reading of a complete line of information without requiring any movement of the hand-held reader unit as a whole relative to a data carrier carrying said complete line of information, during a reading operation, (d) said system means being operative for initiating a reading operation, for assessing the validity of information as read, and for automatically effecting repeated reading operations in the absence of a valid information signal, but terminating the reading operation in response to a valid information signal, and (e) said visible light source means being deenergized between said repeated reading operations so that the visible light source means is energized substantially only as needed to effect successive actual readings of the complete line of information.

72. A portable reader system according to claim 71, with said system means being capable of responding to visible light energy from the illuminating means for reading with a depth of field of at least about ten millimeters.

73. A portable reader system according to claim 71, with said system means being capable of reading a complete line of information with substantial curvature.

74. A portable reader system according to claim 71, with said system means being capable of reading a complete line of information with a curvature corresponding to a carrier radius approaching 1.25 inches.

75. A portable reader system according to claim 74, with said system means having an optical axis extending through the window means and having marginal rays diverging from the optical axis by at least about plus and minus fifteen degrees to define a relatively wide sensing region in which complete lines of information of substantial curvature can be read.

76. A portable reader system according to claim 75, with said system means reading bar code information of substantial curvature with minimum bar/space width of about 0.0075 inch over a depth of field of at least about three millimeters.

77. A portable reader system according to claim 71, with said system means reading bar code information with minimum bar/space width of about 0.0075 inch over a depth of field of at least about three millimeters.

78. A portable reader system according to claim 71, with said system means reading a complete line of bar code information having a length of at least about fifty millimeters over a depth of field of at least about three millimeters.

79. A portable reader system according to claim 71, with said system means reading bar code information with minimum bar/space width of about 0.0075 inch over a depth of field of about ten millimeters.

80. A portable reader system according to claim 71, with said hand-held reader unit having a reading capability for bar code information having a minimum bar or space size of about 0.0075 inch over a substantial range of distances of a bar code data carrier from the hand-held reader unit.

81. A portable reader system according to claim 71, with said illuminating means supplying pulses of visible light energy to said bar code sensing region.

82. A portable reader system according to claim 81, with said system means signalling for the pulsing of the visible light illuminating means, and computer processor means for assessing the validity of an information signal in accordance with information read by the system means and for automatically disabling pulsing of the illuminating means in the event of a valid reading.

83. A portable reader system according to claim 71, with said system means having a reading capability for a complete line of information spaced from the window means by a distance of at least about twenty-five millimeters.

84. A portable reader system according to claim 71, with said illuminating means supplying light pulses containing substantial light energy within the visible spectrum for developing reflected light signals until a valid reading is detected.

85. A portable reader system according to claim 71, with means for filtering out a long wavelength non-visible region of the spectrum of light energy from the sensing region.

86. A portable reader system comprising (a) a hand-held reader unit having window means for transmitting light between the interior and exterior thereof, and having a sensing region external to the window means, (b) an instant response visible light illuminating means for directing visible light energy through the window means to the sensing region, and for developing a reflected light signal in accordance with visible light energy from the illuminating means which is reflected from information in said sensing region, and (c) system means for triggering a reading of a complete line of information in said sensing region with the assistance of visible light energy from the illuminating means, and being operative to effect such reading of a complete line of information without requiring any movement of the hand-held reader unit as a whole relative to a data carrier carrying said complete line of information, during a reading operation, (d) said illuminating means supplying pulses of visible light energy to said sending region, (e) said system means signalling for the pulsing of the visible light illuminating means, and (f) computer processor means for assessing the validity of an information signal in accordance with information read by the system means and for automatically disabling pulsing of the illuminating means in the event of a valid reading.

87. In a portable reader system, (a) a hand-held reader unit having an hand grip portion configuration so as to be grasped with one hand, (b) said hand-held reader unit having window means providing optical transmission between the interior and exterior of the hand-held reader unit, said window means having a sensing region externally thereof for receiving a data carrier having a complete line of information thereon, (c) said hand-held reader unit having optical system means within said hand-held reader unit for directing sufficient light energy toward said sensing region and for illuminating a complete line of information on a data carrier, for recieving reflected light energy from such a complete line of information and for generating a complete information signal in accordance with such complete line of information without requiring any bodily scanning movement of the hand-held reader unit relative to the data carrier, (d) said hand-held reader unit having actuating means for initiating a reading operation while the hand-held reader unit is manually held in operative relation to a data carrier in said sensing region, (e) said optical system means comprising current pulse driven visible light source means essentially instantaneously responsive to an abrupt current pulse for supplying visible light to the sensing region and being constructed such that light from the light source means impinging on a complete line of information in the sensing region during a reading operation is reflected to the eye of the user manually holding the reader unit in spaced relation to the data carrier, and such that the illumination of the complete line of information by the current pulse driven visible light source means is directly observable by the user during a reading operation, (f) said actuating means when it remains operated causing repeated energization of the current pulse driven visible light source means until a valid complete information signal is generated by said optical system means, (g) said hand-held reader unit being operated from portable battery power, said repeated energization of the current pulse driven light source means providing respective active reading intervals in which an actual reading is being effected, and said light source means being in a deenergized state during non-reading intervals between the active reading intervals.

88. In a portable reader system according to claim 87, said hand-held reader unit having a weight not greater than about eight ounces.

89. In a portable reader system according to claim 87, said actuating means supplying a logical signal for initiating reading operating.

* * * * *